(12) United States Patent
Ol et al.

(10) Patent No.: US 10,974,814 B1
(45) Date of Patent: Apr. 13, 2021

(54) RAPID FLAP DEFLECTION FOR HIGH LIFT TRANSIENTS

(71) Applicant: Government of the United States, as represented by the Secretary of the Air Force, Wright-Patterson AFB, OH (US)

(72) Inventors: Michael V Ol, Xenia, OH (US); Alberto Medina, Fairborn, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 16/920,939

(22) Filed: Jul. 6, 2020

Related U.S. Application Data

(62) Division of application No. 15/860,913, filed on Jan. 3, 2018, now Pat. No. 10,745,107.

(Continued)

(51) Int. Cl.
*B64C 9/28* (2006.01)
*B63B 1/28* (2006.01)
(Continued)

(52) U.S. Cl.
CPC .............. *B64C 9/28* (2013.01); *B63B 1/248* (2013.01); *B63B 1/28* (2013.01); *B64C 3/48* (2013.01); *B64C 13/16* (2013.01); *B64C 13/30* (2013.01)

(58) Field of Classification Search
CPC .... B64C 9/02; B64C 9/18; B64C 9/24; B64C 9/28; B64C 13/16
See application file for complete search history.

(56) References Cited

U.S. PATENT DOCUMENTS 2,985,409 A    5/1961   Atwood et al.
3,734,432 A *   5/1973   Low .................. B64C 13/16
                                                      244/191

(Continued)

OTHER PUBLICATIONS

Barker, L., et al., "Effect of Limited Amplitude and Rate of Flap Motion on Vane-Controlled Gust Alleviation System," NASA, TN D-6733, Mar. 1972, pp. 1-43.

(Continued)

*Primary Examiner* — Philip J Bonzell
*Assistant Examiner* — Michael B. Kreiner
(74) *Attorney, Agent, or Firm* — AFMCLO/JAZ; Timothy Barlow

(57) ABSTRACT

A wing, a method of controlling lift on a wing, and a system to produce lift on a wing are provided. The wing may include a fore-element, an aft-element, a pivotable linkage that operatively connects the aft-element leading edge to the fore-element trailing edge in a span-wise direction, and an actuator. The actuator may deflect the aft-element through a predetermined deflection angle about the pivotable linkage relative to the fore-element within less than or equal to two convective periods. The method may include deflecting a span-wise flap through the deflection angle in less than or equal to two convective periods to produce high lift. The system may include a sensor to detect an input and a controller to deflect the span-wise flap of the wing by the deflection angle in not more than two convective periods based on the received input signal.

6 Claims, 49 Drawing Sheets

Related U.S. Application Data

(60) Provisional application No. 62/502,807, filed on May 8, 2017.

(51) Int. Cl.

| | | |
|---|---|---|
| *B64C 13/30* | (2006.01) | |
| *B64C 3/48* | (2006.01) | |
| *B63B 1/24* | (2020.01) | |
| *B64C 13/16* | (2006.01) | |

(56) References Cited

U.S. PATENT DOCUMENTS

| | | | | |
|---|---|---|---|---|
| 4,821,981 | A | | 4/1989 | Gangsaas et al. |
| 4,932,611 | A | * | 6/1990 | Horikawa ............ B64C 3/44 |
| | | | | 244/195 |
| 5,375,794 | A | | 12/1994 | Bleeg |
| 6,375,127 | B1 | * | 4/2002 | Appa ............ B64C 3/48 |
| | | | | 244/203 |
| 6,499,690 | B1 | | 12/2002 | Katayama et al. |
| 6,766,981 | B2 | * | 7/2004 | Volk ............ B64C 9/32 |
| | | | | 244/76 C |
| 6,772,979 | B2 | * | 8/2004 | Kubica ............ B64C 13/16 |
| | | | | 244/195 |
| 7,424,989 | B2 | * | 9/2008 | Pitt ............ B64C 13/16 |
| | | | | 244/174 |
| 7,900,877 | B1 | * | 3/2011 | Guida ............ B64C 13/16 |
| | | | | 244/199.4 |
| 8,511,620 | B2 | * | 8/2013 | Matsuda ............ B64C 9/10 |
| | | | | 244/215 |
| 8,827,644 | B2 | | 9/2014 | Behrens et al. |
| 9,162,755 | B2 | * | 10/2015 | Guida ............ B64C 23/069 |
| 9,242,723 | B2 | | 1/2016 | Wildschek |
| 9,446,837 | B2 | * | 9/2016 | Wildschek ............ B64C 13/16 |
| 9,567,066 | B2 | * | 2/2017 | Guida ............ B64C 13/16 |
| 9,573,680 | B2 | | 2/2017 | Shmilovich et al. |
| 2008/0265104 | A1 | | 10/2008 | Fabre-Raimbault et al. |
| 2011/0266399 | A1 | | 11/2011 | Blanc et al. |
| 2014/0306067 | A1 | | 10/2014 | Guida |
| 2017/0036755 | A1 | * | 2/2017 | Richardson, Jr. ......... B64C 9/38 |
| 2018/0141641 | A1 | * | 5/2018 | Griffin ............... G05D 1/0816 |

OTHER PUBLICATIONS

Rennie, R., et al., "AIAA 99-0649—Gust Alleviation Using—Trailing-Edge Flaps," 37th AIAA Aerospace Sciences, Meeting and Exhibit, Jan. 11-14, 1999 | Reno, Nevada, pp. 1-6.

Rennie, R., et al., "Experimental Measurements of Dynamic Control Surface Effectiveness," Journal of Aircraft vol. 33, No. 5, Sep.-Oct. 1996, pp. 880-887.

Phillips, E., et al., "Use of Sweeping Jets During Transient Deployment of a Control Surface," AIAA Journal vol. 51, No. 4, Apr. 2013, pp. 819-828.

Jantzen, R., et al., "Aerodynamic Force Modeling for Unsteady Wing Maneuvers," 52nd AIAA Aerospace Sciences Meeting, National Harbor, MD, Jan. 13-17, 2014, pp. 1-17.

Jantzen, R., et al., "Vortex Dynamics around Pitching Plates," Physics of Fluids, vol. 26, Issue 5, Apr. 29, 2014, pp. 1-21.

Lee, T., et al., "Unsteady Airfoil with Dynamic Leading- and Trailing-Edge Flaps," Journal of Aircraft, vol. 46, No. 3, May-Jun. 2009, Engineering Notes, pp. 1076-1081.

Lee, T., et al., "Unsteadyairfoilwithaharmonicallydeflectedtrailing-edgeflap," Journal of Fluids and Structures, vol. 27, Jul. 23, 2011, pp. 1411-1424.

Matalanis, C., et al., "Aerodynamic Evaluation of Miniature Trailing-Edge Effectors for Active Rotor Control," Journal of Aircraft, vol. 48, No. 3, May-Jun. 2011, pp. 995-1004.

Matalanis, C., et al., "Novel Aerodynamic Device for Wake Vortex Alleviation," AIAA Journal, vol. 45, No. 9, Sep. 2007, Technical Notes, pp. 2348-2450.

Matalanis, C., et al., "Wake Vortex Control Using Static Segmented Gurney Flaps," AIAA Journal, vol. 45, No. 2, Feb. 2007, pp. 321-328.

* cited by examiner

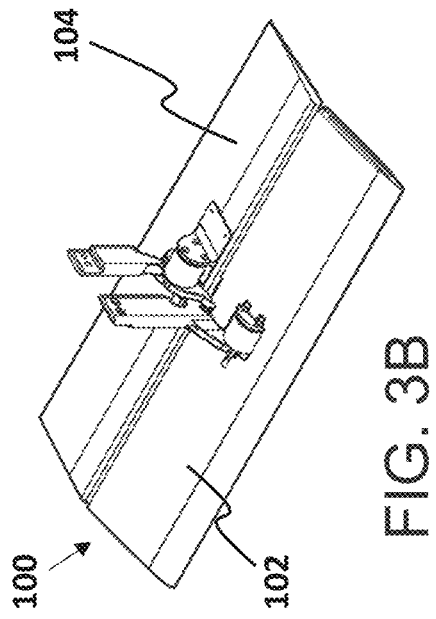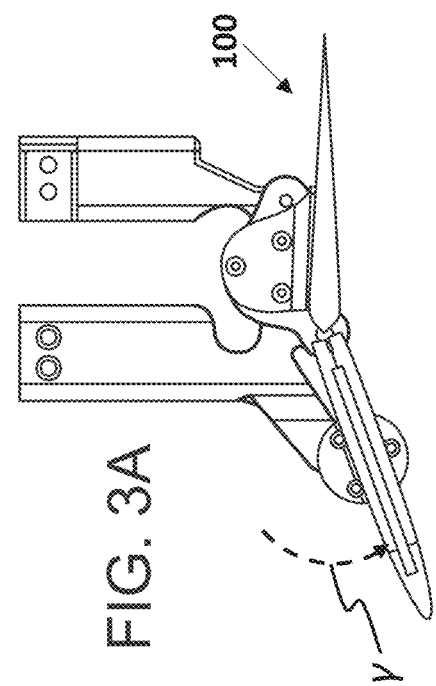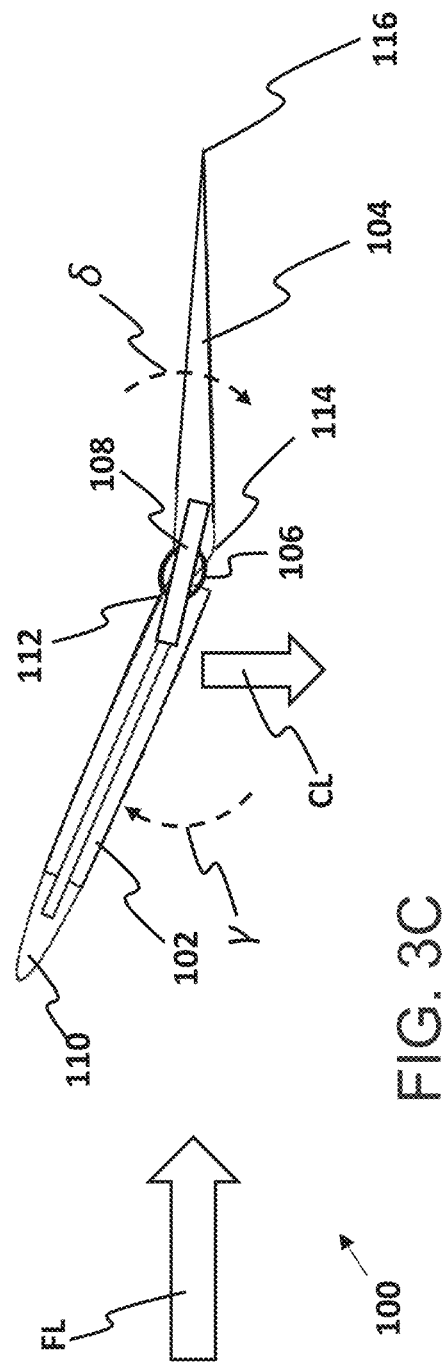

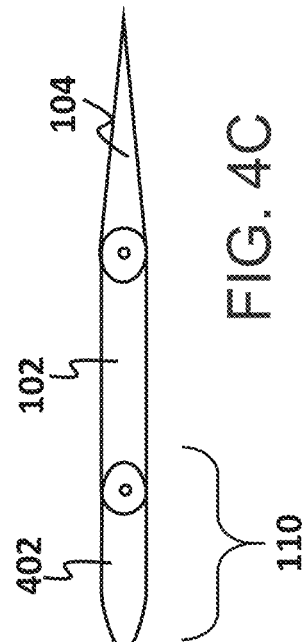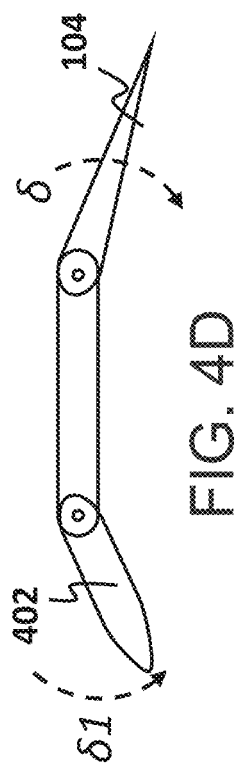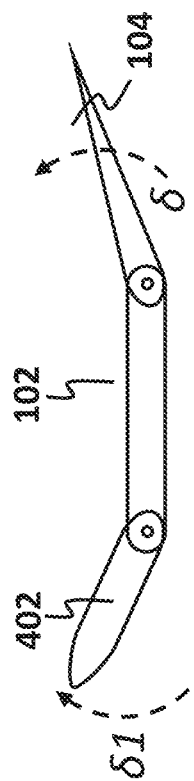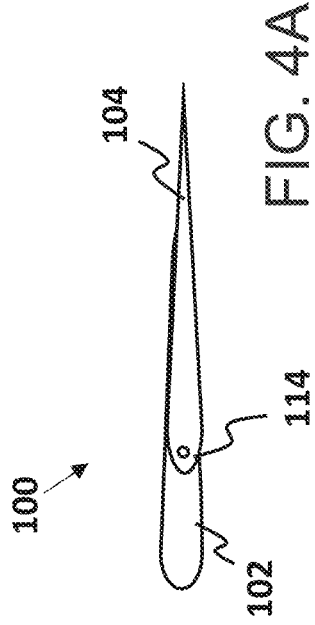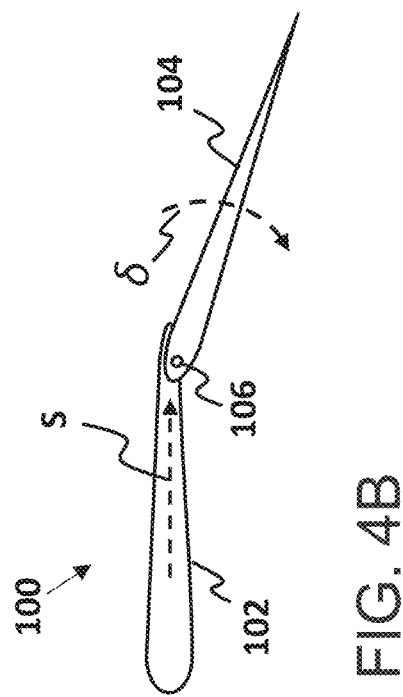

| (131) | —■— | Re = 40k: LE=20° TE= 0° to 20° to -20° to 0° |
| (132) | —✱— | Re = 80k: LE=20° TE= 0° to 20° to -20° to 0° |
| (133) | —▲— | Re = 160k: LE=20° TE= 0° to 20° to -20° to 0° |
| (134) | —●— | Re = 40k: LE=20° TE= 0° to -20° to 20° to 0° |
| (135) | —◆— | Re = 80k: LE=20° TE= 0° to -20° to 20° to 0° |
| (136) | —○— | Re = 1600k: LE=20° TE= 0° to -20° to 20° to 0° |

(131) —— Re = 40k: LE=20° TE= 0° to 20° to -20° to 0°
(132) —— Re = 80k: LE=20° TE= 0° to 20° to -20° to 0°
(133) —— Re = 160k: LE=20° TE= 0° to 20° to -20° to 0°
(134) —— Re = 40k: LE=20° TE= 0° to -20° to 20° to 0°
(135) —— Re = 80k: LE=20° TE= 0° to -20° to 20° to 0°
(136) —— Re = 1600k: LE=20° TE= 0° to -20° to 20° to 0°

(131) —— Re = 40k: LE=20° TE= 0° to 20° to -20° to 0°
(132) —— Re = 80k: LE=20° TE= 0° to 20° to -20° to 0°
(133) —— Re = 160k: LE=20° TE= 0° to 20° to -20° to 0°
(134) —— Re = 40k: LE=20° TE= 0° to -20° to 20° to 0°
(135) —— Re = 80k: LE=20° TE= 0° to -20° to 20° to 0°
(136) —— Re = 1600k: LE=20° TE= 0° to -20° to 20° to 0°

| | | |
|---|---|---|
| (131) | —✱— | Re = 40k: LE=20° TE= 0° to 20° to -20° to 0° |
| (132) | —✱— | Re = 80k: LE=20° TE= 0° to 20° to -20° to 0° |
| (133) | —✱— | Re = 160k: LE=20° TE= 0° to 20° to -20° to 0° |
| (134) | —✱— | Re = 40k: LE=20° TE= 0° to -20° to 20° to 0° |
| (135) | —✱— | Re = 80k: LE=20° TE= 0° to -20° to 20° to 0° |
| (136) | —✱— | Re = 1600k: LE=20° TE= 0° to -20° to 20° to 0° |

|       |                                        |
|-------|----------------------------------------|
| (141) | LE=20° TE= 0° to 20° freq = 2 Hz       |
| (142) | LE=20° TE= 0° to 20° freq = 1 Hz       |
| (143) | LE=20° TE= 0° to 20° freq = 0.5 Hz     |
| (144) | LE=20° TE= 0° to 20° freq = 0.25 Hz    |
| (145) | LE=20° TE= 0° to 20° freq = 0.125 Hz   |

(152) ——— LE=20° TE= 20° to 0° freq = 1 Hz
(153) ——— LE=20° TE= 20° to 0° freq = 0.5 Hz
(154) ——— LE=20° TE= 20° to 0° freq = 0.25 Hz
(155) ——— LE=20° TE= 20° to 0° freq = 0.125 Hz
(156) ——— LE=20° TE= 20° to 0° freq = 0.05 Hz (157) ——— LE=20° TE= 0° to 20° freq = 1 Hz
(158) ——— LE=20° TE= 0° to 20° freq = 0.25 Hz
(159) ——— LE=20° TE= 20° to 0° freq = 1 Hz
(160) ——— LE=20° TE= 20° to 0° freq = 0.25 Hz (165) ——— Re=40k, LE=20° TE= 0° to 20° freq = 1 Hz
(166) ——— Re=40k, LE=20° TE= 20° to 0° freq = 1 Hz
(167) ——— Re=80k, LE=20° TE= 0° to 20° freq = 2 Hz
(168) ——— Re=80k, LE=20° TE= 20° to 0° freq = 2 Hz (171) ——————— LE=20° TE= 0° to 5° freq = 1 Hz
(172) ——————— LE=20° TE= 0° to -5° freq = 1 Hz
(173) - - - - - - LE=20° TE= 0° to 5° freq = 0.25 Hz
(174) - - - - - - LE=20° TE= 0° to -5° freq = 0.25 Hz (171) ——————— LE=20° TE= 0° to 5° freq = 1 Hz
(172) ——————— LE=20° TE= 0° to -5° freq = 1 Hz
(173) - - - - - - LE=20° TE= 0° to 5° freq = 0.25 Hz
(174) - - - - - - LE=20° TE= 0° to -5° freq = 0.25 Hz

| | |
|---|---|
| (181) ———— | LE=20° TE= 0° to 10° freq = 1 Hz |
| (182) ———— | LE=20° TE= 0° to 30° freq = 1 Hz |
| (183) ———— | LE=20° TE= 0° to -10° freq = 1 Hz |
| (184) ———— | LE=20° TE= 0° to -20° freq = 1 Hz |
| (185) — — — | LE=20° TE= 0° to 10° freq = 0.25 Hz |
| (186) — — — | LE=20° TE= 0° to 30° freq = 0.25 Hz |
| (187) — — — | LE=20° TE= 0° to -10° freq = 0.25 Hz |
| (188) — — — | LE=20° TE= 0° to -20° freq = 0.25 Hz |

| | |
|---|---|
| (181) ——————— | LE=20° TE= 0° to 10° freq = 1 Hz |
| (182) ——————— | LE=20° TE= 0° to 30° freq = 1 Hz |
| (183) ——————— | LE=20° TE= 0° to -10° freq = 1 Hz |
| (184) ——————— | LE=20° TE= 0° to -20° freq = 1 Hz |
| (185) — — — — | LE=20° TE= 0° to 10° freq = 0.25 Hz |
| (186) — — — — | LE=20° TE= 0° to 30° freq = 0.25 Hz |
| (187) — — — — | LE=20° TE= 0° to -10° freq = 0.25 Hz |
| (188) — — — — | LE=20° TE= 0° to -20° freq = 0.25 Hz |

(191) ——————— LE=20° TE= 10° to 0° freq = 1 Hz
(192) ——————— LE=20° TE= -20° to 0° freq = 1 Hz
(193) - - - - - - LE=20° TE= 10° to 0° freq = 0.25 Hz
(194) - - - - - - LE=20° TE= -20° to 0° freq = 0.25 Hz
(195) ——————— LE=20° TE= 20° to 0° freq = 1 Hz
(196) - - - - - - LE=20° TE= 20° to 0° freq = 0.25 Hz

| | |
|---|---|
| (1203) ———— | LE=20° TE= 10° to 0° freq = 1 Hz |
| (1204) ———— | LE=20° TE= -20° to 0° freq = 1 Hz |
| (1205) - - - - - | LE=20° TE= 10° to 0° freq = 0.25 Hz |
| (1206) - - - - - | LE=20° TE= -20° to 0° freq = 0.25 Hz |
| (1207) ———— | LE=20° TE= 20° to 0° freq = 1 Hz |
| (1208) - - - - - | LE=20° TE= 20° to 0° freq = 0.25 Hz |

(2107) ——— LE=20° TE= 0° to 30° freq = 1 Hz
(2108) ——— LE=20° TE= -10° to 30° freq = 1 Hz
(2109) ——— LE=20° TE= -20° to 30° freq = 1 Hz
(2110) - - - - LE=20° TE= 0° to 30° freq = 0.25 Hz
(2111) - - - - LE=20° TE= -10° to 30° freq = 0.25 Hz
(2112) - - - - LE=20° TE= -20° to 30° freq = 0.25 Hz

RAPID FLAP DEFLECTION FOR HIGH LIFT TRANSIENTS

CROSS-REFERENCE TO RELATED APPLICATION(S)

This application claims the benefit of U.S. Provisional Patent Application No. 62/502,807 filed on May 8, 2017, and U.S. NonProvisional patent application Ser. No. 15/860,913 filed on 3 Jan. 2018, which are incorporated herein by reference in their entireties.

GOVERNMENT INTEREST

The invention described herein may be manufactured and used by or for the Government of the United States for all government purposes without the payment of any royalty.

BACKGROUND

Field of the Invention

The embodiments herein generally relate to a wing, a method of controlling lift on a wing, and a system to produce lift on a wing, and more particularly to a wing having a rapid flap-deflection, a method of rapid flap-deflection to control lift on a wing, and a system to rapidly deflect a flap of a wing to produce lift on the wing.

Background of the Invention

A "trailing edge flap" refers to a portion of a wing, rotor-blade, airfoil, or hydrofoil (herein collectively referred to as "wing"), which may be geometrically separate from a main wing, and may be downstream from the main wing. The trailing edge flap generally pivots about its leading edge, along a straight line extending spanwise along the wing. As the flap pivots, the spacing between its leading edge and the trailing edge of the wing's main element typically remains zero or aerodynamically small, so that flow between the wing and the flap is inhibited. This arrangement is in contrast with a slotted flap or a Fowler flap, where there is flow between the main element of the wing, and the flap.

A "leading edge flap" refers to a portion of a wing, which may be geometrically separate from a main wing, and may be upstream from the main wing. The leading edge flap generally pivots about its trailing edge, along a straight line extending spanwise along the wing. As the leading edge flap pivots, the spacing between its trailing edge and the leading edge of the wing's main element typically remains zero or aerodynamically small, so that flow between the wing and the flap is inhibited.

A conventional flap can only produce quasi-steady change in lift or pitch, which may not be sufficiently fast for maneuver or a gust-response situation. Flow control may be one way to manage these deficiencies, but may be plagued with deadband (zero lift) and initial negative transients. The approach presented below according to exemplary embodiments has neither.

The above information disclosed in this Background section is only for enhancement of understanding of the background of the disclosure and therefore it may contain information that does not form any part of the prior art nor what the prior art may suggest to a person of ordinary skill in the art.

BRIEF SUMMARY OF THE INVENTION

In view of the foregoing, a first embodiment herein provides a wing configured to produce lift in a fluid medium flow. The wing includes a fore-element, an aft-element, a pivotable linkage, and an actuator. The fore-element includes a fore-element leading edge and a fore-element trailing edge. The aft-element includes an aft-element leading edge pivotably connected in a span-wise direction to the fore-element trailing edge, and the aft-element includes an aft-element trailing edge. The pivotable linkage operatively connects the aft-element leading edge to the fore-element trailing edge, and the actuator is configured to deflect the aft-element through a predetermined deflection angle about the pivotable linkage relative to the fore-element within a predetermined time less than or equal to two convective periods. One convective period corresponds to a time it takes for the fluid medium to flow from the fore-element leading edge to the aft-element trailing edge.

In some aspects of the first embodiment, a chord length of the aft-element may be greater than 20% of a chord length of the wing. The chord length of the wing extends from the fore-element leading edge to the aft-element trailing edge, and the chord length of the aft-element extends from the aft-element leading edge to the aft-element trailing edge.

In some aspects of the first embodiment, the chord length of the wing may be longer after deflection of the aft-element through the predetermined deflection angle about the pivotable linkage relative to the fore-element than before deflection. In other aspects of the first embodiment, the chord length of the wing may be shorter after deflection of the aft-element through the predetermined deflection angle about the pivotable linkage relative to the fore-element than before deflection.

In some aspects of the first embodiment, the wing may be one of an airfoil and a hydrofoil. In some aspects of the first embodiment, the predetermined deflection angle may be greater than 1 degree. In some aspects of the first embodiment, the predetermined time may be less than or equal to one convective period.

In some aspects of the first embodiment, the fore-element leading edge may further include a deflectable leading-edge flap configured to deflect through a predetermined leading-edge deflection angle relative to the fore-element within a leading-edge predetermined time less than or equal to two convective periods.

A second embodiment herein provides a method of controlling a high lift on a wing. The method includes receiving a fluid medium flow relative to the wing along a chord length direction of the wing, and deflecting a span-wise flap of the wing by a predetermined deflection angle in a predetermined time period of less than or equal to two convective periods to produce high lift on the wing. In the method, one convective period corresponds to a time it takes for the fluid medium to flow from a leading edge of the wing to a trailing edge of the wing, the high lift occurs for a time of less than 10 convective periods and is greater than a nominal lift, and the nominal lift is established on the wing 10 convective periods or more after deflecting the span-wise flap. Also in the method, the high lift and the nominal lift are at a lift angle to the received fluid medium flow relative to the chord length direction of the wing.

In some aspects of the second embodiment, the high lift may be equal to or greater than 1.5 times the nominal lift. In some aspects of the second embodiment, the fluid medium flow may be detached from the wing prior to the deflecting the span-wise flap. In some aspects of the second embodiment, a chord length of the span-wise flap may be not less than 10% of a chord length of the wing. In some aspects of the second embodiment, the predetermined deflection angle may be greater than 5 degrees. In some aspects of the second embodiment, the span-wise flap may be at least one of a leading-edge flap and a trailing-edge flap.

In some aspects of the second embodiment, the wing may include one of a hydrofoil and an airfoil. In some aspects of the second embodiment, the fluid medium may include one of water and air.

A third embodiment herein provides a system. The system includes a sensor and a controller. The sensor is configured to detect an input and generate an input signal based on the input, wherein the input is at least one of a fluid medium flow disturbance at a wing and a wing maneuver command. The controller is configured to receive the input signal and deflect a span-wise flap of the wing by a predetermined deflection angle in a predetermined time period of less than or equal to two convective periods based on the received input signal to produce high lift on the wing. In the system, one convective period corresponds to a time it takes for the fluid medium to flow from a leading edge of the wing to a trailing edge of the wing, the high lift lasts for a time of less than 10 convective periods and is greater than a nominal lift, and the nominal lift is established on the wing 10 convective periods or more after deflecting the span-wise flap. Also in the system, the high lift and the nominal lift are at a lift angle to the relative motion of the fluid medium flow to the wing chord length.

In some aspects of the third embodiment, the predetermined deflection angle may be greater than 5 degrees. In some aspects of the third embodiment, the high lift may be equal to or greater than 1.5 times the nominal lift. In some aspects of the third embodiment, the predetermined time may be less than or equal to one convective period.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 3A, 3B, and 3C are schematic diagrams of the wing of FIG. 2 configured to produce lift in a fluid medium flow according to other embodiments herein;

FIG. 4A is a schematic diagram of another wing configured to produce lift in a fluid medium flow; and FIG. 4B is a schematic diagram of the wing of FIG. 4A having the flap deployed according to another embodiment herein. FIG. 4C is a schematic diagram of another wing configured to produce lift in a fluid medium flow; FIG. 4D is a schematic diagram of the wing of FIG. 4C having a deployed leading edge flap; and FIG. 4E is a schematic diagram of the wing of FIG. 4C having the leading edge flap deployed in an opposite direction to that shown in FIG. 4D according to another embodiment herein.

DETAILED DESCRIPTION OF THE INVENTION

Figure 1:
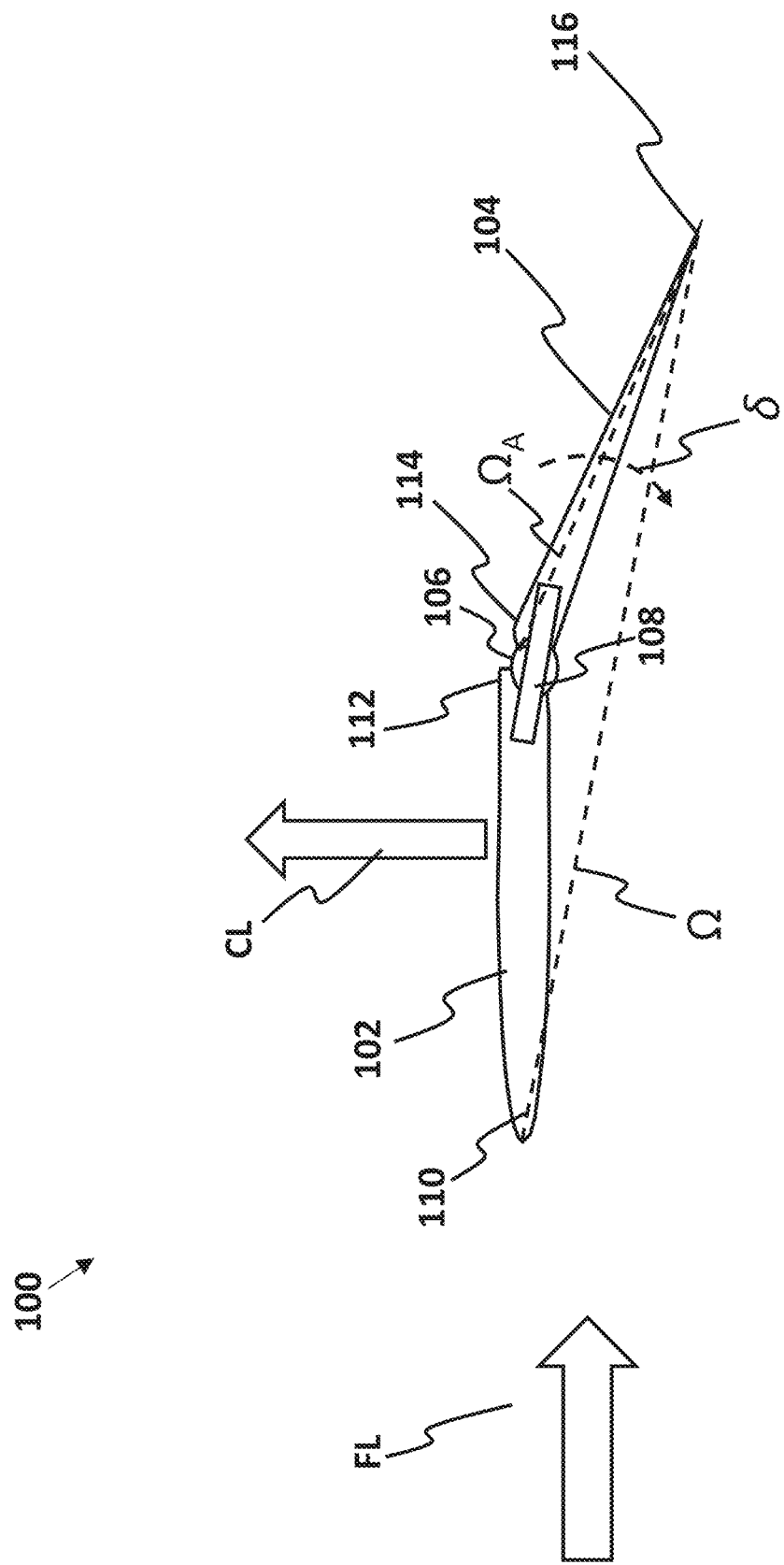
FIG. 1 is a schematic diagram of a wing configured to produce lift in a fluid medium flow according to an embodiment herein.
Figure 2:
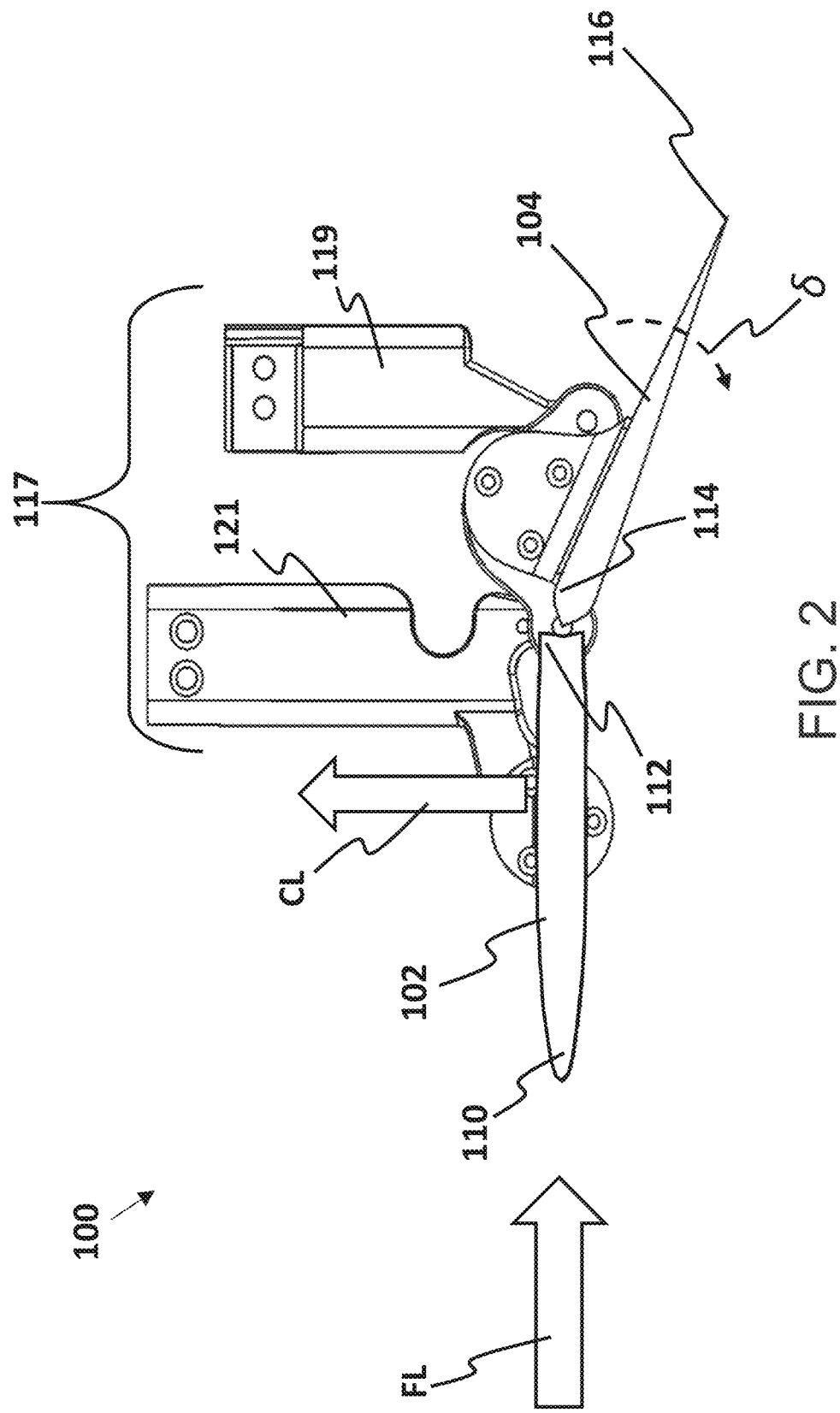
FIG. 2 is a schematic diagram of a wing configured to produce lift in a fluid medium flow according to another embodiment herein.

Embodiments of the disclosed invention, its various features and the advantageous details thereof, are explained more fully with reference to the non-limiting embodiments that are illustrated in the accompanying drawings and detailed in the following description. Descriptions of well-known components and processing techniques are omitted to not unnecessarily obscure what is being disclosed. Examples may be provided and when so provided are intended merely to facilitate an understanding of the ways in which the claimed invention may be practiced and to further enable those of skill in the art to practice its various embodiments. Accordingly, examples should not be construed as limiting the scope of what is disclosed and otherwise claimed.

It will be understood that when an element or layer is referred to as being "on", "connected to", or "coupled to" another element or layer, it can be directly on, directly connected to, or directly coupled to the other element or layer, or intervening elements or layers may be present. In contrast, when an element or layer is referred to as being "directly on", "directly connected to", or "directly coupled to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

As used herein, unless expressly stated otherwise, "operable" refers to able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

In the drawings, the size and relative sizes of layers and regions may be exaggerated for clarity. Referring now to the drawings, and more particularly to FIGS. 1 through 6, where similar reference characters denote corresponding features consistently throughout, there are shown exemplary embodiments of a wing having a rapid flap-deflection, a method of rapid flap-deflection to control lift on a wing, and a system to rapidly deflect a flap of a wing to produce lift on the wing.

Typically, a flap may be deflected in a quasi-steady manner; flap motion from initial position to final position may be at least 10 times slower than a convective time, with respect to the wing. The convective time, which is more fully explained below, corresponds to the time it takes for the fluid medium, e.g. air or water, to flow from the leading edge to the trailing edge of the wing. Quasi-steady actuation refers to actuation from beginning of motion to end of motion over a time frame of about 10 convective times or greater. Quasi-steady actuation may change the steady-state value of the lift coefficient or pitching moment of the wing. For example, quasi-steady actuation of a high lift device, such as a leading edge or trailing edge flap, may change the steady-state value of the lift coefficient or pitching moment of the wing. For example, quasi-steady actuation of a trailing edge control surface such as an aileron or an elevator may change the steady-state value of the lift coefficient or pitching moment of the wing. The aileron refers to a hinged surface in a trailing edge of an airplane wing used to control lateral balance. The elevator refers to a hinged flap on a horizontal stabilizer of an aircraft, typically, one of a pair, used to control the motion of the aircraft about its lateral axis.

In a dynamic stall, flow separation from the wing leading edge may occur, along with concomitant sudden and unwanted transients in lift coefficient and pitching moment. The wing may not be readily amenable to flow control once the dynamic stall process has begun, because flow response to flow control is typically slower than the dynamic stall process itself. A method to address such unwanted transients may include attenuation or delay of dynamic stall by point-actuation, deployed while the airfoil is yet at low angle of attack. The point-actuation scheme is intended to preclude incipient flow separation by seeding the leading-edge region with the right frequency-content of energy before the attained angle of attack becomes high. However, such an approach does not address how to produce desired transients in lift coefficient or pitching moment coefficient, once flow separation has already occurred.

In rotorcraft applications, small-chord (~0.01c), rapidly-actuated so-called Miniature Trailing Edge Effectors (MITEs), have been proposed for attenuation of dynamic-stall hysteresis loops. Trading frequency for chord-length, there have been attempts at fast-flap actuation to attenuate dynamic stall for rotorcraft applications. A 30%-chord dynamic flap on a NACA-0021 airfoil has been considered, executing a deflection from 0 degrees to 30 degrees incidence in approximately 2.5-5 convective times, assisted by sweeping-jet flow control near the flap hinge. Others have considered a 25%-chord dynamic flap on a NACA-0015 airfoil in dynamic stall (sinusoidal pitch), with a flap linear deflection trajectory and deflection time of approximately 3-5 convective times. Additional experiments on fast flap-deflections for attenuation of unwanted lift transients in dynamic stall have been performed, as well as in fixed-wing gust response, in the latter case using scheduled flap deflection to negate lift transients due to an imposed flow perturbation. It was found that fast flap deflection increases the quasi-steady flap effectiveness. That is, deleterious effects of flow separation, which were measured in a static survey of flap incidence, were attenuated during dynamic flap deflection.

Until now, there have been two main alternative methods pursued to provide flow control in the dynamic stall, referred to as unsteady flow control. The first may be referred to as fluidic flow control, where an array of pointwise actuators, e.g. synthetic jets, sweeping jets, plasma dielectric barrier discharge, suction/blowing slots, vibrating ribbons, vortex generators, etc., may be used to reattach a separated flow over an airfoil, producing an increase in lift. This can be effective, in terms of net gain in lift, for a given input of power. However, the increase in lift comes after a transient, during which the lift increment may be zero or negative. Accordingly, the technique may be of limited use when the objective is gust rejection or rapid maneuver. Also, the method does not provide how to produce a negative lift increment, if one is desired.

The second approach also utilizes a mechanical trailing edge flap, similar to rotorcraft application described above. One variant features a very small chord-fraction flap, also moving quickly. This can produce increments in lift and/or pitching moment, but because it does not move a large amount of fluid, its effectiveness may be limited, especially in separated flow. Another variant is a larger chord-fraction flap, moving at moderate speed, and which may provide lift response following inviscid theory, even if flap deflection angles are large. However, it may not achieve transients beyond the attached-flow steady state maximum because the motion rate may not be sufficiently high. In exemplary embodiments of the current disclosure, the flap motion rate may be some ten times higher.

Unsteady flow control, for example, by periodic excitation by actuators at a local region or a set of local regions on a surface of a wing (referred to as "point-actuation"), aims to increase the lift coefficient by operating, for example, a separated shear layer. The pointwise actuators may respond within one or two convective times, or may respond at a much faster timescale than one convective time. However, passage from initiation of actuation to attainment of its ameliorating effect on the separated flow, can occur over many convective times. That is, the aerodynamic response may be too slow. From the viewpoint of flight mechanics of an aircraft, there is a timescale, in convective time, associated with either a maneuver, or in the complementary case, of responding to an incoming disturbance such as a gust. Wherever a flowfield disturbance is comparable to the convective time, or in maneuvers such as dynamic soaring, the necessary aerodynamic response may be on the order of 2× convective time, one convective time, or even faster.

The disclosed method is a method for negating an undesired lift transient or for producing a desired one. In the exemplary embodiments, the time to actuate the flap, in moving it from an initial position to a final, may be comparable to 2× the convective time, and may even be less than the convective time in order to produce high lift transients. Such a rapid flap deflection may address high lift transients or provide flight control for aggressive maneuver or gust mitigation within time periods on the order of the convective time, i.e. within the time that it takes the ambient flow to traverse from the wing's leading edge to its trailing edge. The convective time corresponds to the time it takes for the fluid medium, e.g. air or water, to flow from the leading edge to the trailing edge of the wing. For a fluid flow speed of U, and a characteristic chord length of c, the convective time is c/U, and the dimensionless convective time, t, can be written as tU/c, where for example, t is in seconds, U is in meters per second, and c is in meters.

Embodiments of the present invention can implement a trailing-edge or leading-edge flap that deflects to a predetermined angle at a rate of about 2× the convective time, 1× the convective time, or even a fraction of the convective time. The result of such rapid flap deflection is an increase in the lift coefficient (CL) well beyond lift achieved by quasi-steady actuation. The lift increment may be positive for flap positive pivot direction or negative for flap negative pivot direction. For example, with the flow FL moving from left to right in FIGS. 1 and 2 and the flap 104 pivoting downward (positive) through a deflection angle δ, a positive (upward) lift CL can be produced. Conversely, the lift increment may be negative (downward) for flap negative pivot direction (upward) (not pictured). The effect is substantially the same, whether the fore-element 102 of the wing 100 is at zero incidence (see FIGS. 1 and 2) or at ±20 degrees incidence (y) at the beginning of deflection (FIGS. 3A, 3B, and 3C). The flap positive (or negative) pivot direction is to distinguish the direction of flap actuation. From a deflection angle of 0 degrees, if the flap 104 is deflected in the flap positive pivot direction then an immediate positive increment in lift is produced. Here flap positive pivot direction can also refer to a deflection of the flap in a direction that promotes positive camber of the wing 100. The wing 100 with the flap 104 in a planar (non-deflected) state, may be symmetrical and have zero camber. Once deflected, the deflected geometry amounts to a non-zero camber. In these embodiments, the high rate of the flap deflection in the flap positive pivot direction or flap negative pivot direction provides the immediate aerodynamic response.

An exemplary embodiment relates to the action of a wing trailing edge flap element (aft-element) 104 of, e.g. an aircraft wing, marine-craft hydrofoil, helicopter rotor blade, wind-turbine blade, or the like. The exemplary embodiment relates to rapid-flap actuation to produce large transients in the attained aerodynamic lift coefficient and pitching moment coefficient of the wing. The exemplary embodiment may be used effectively on aircraft, watercraft, and terrestrial or aquatic energy-extraction rotating machinery. For aircraft, fast motion of the flaps with respect to the convective time typically entails slow flight speed for fixed wing aircraft, or relatively slow rotor rotation speed for helicopters. For watercraft or wind/water turbines, where motion of the hydrofoil or rotor-blade through the fluid medium is itself relatively slow, i.e., the flight-surface chord divided by indicated cruise-speed is an appreciable fraction of a second, flaps may be deflected quickly with respect to the time that it takes the fluid flow FL to traverse from the wing's leading edge 110 to its trailing edge 116, i.e., the convective time.

An embodiment is directed to an apparatus to rapidly reposition a conventional trailing edge flap 104, such that flap deflection negates aerodynamic force disturbances encountered in flight. In other embodiments, similar arrangements for negating hydrodynamic force disturbances in a water environment are contemplated. An actuator 108, such as an electric linear motor may be connected to the main wing elements (fore element 102) and corresponding flap elements 104 (e.g., aft-element), coupled via a pivotable linkage 106, to actuate the flaps. This arrangement enables flap motion at rates faster than one convective time, i.e., the time taken by the ambient flow to traverse from the wing's leading edge to its trailing edge.

In an exemplary embodiment, a wing 100 may be configured to produce lift CL in a fluid medium flow FL. Referring to FIGS. 1, 2, and 3A-C, the wing 100 may include a fore-element 102, an aft-element 104 (e.g., flap), a pivotable linkage 106 operatively connecting in a spanwise direction the aft-element's leading edge 114 to the fore-element's trailing edge 112, and an actuator 108. The fore-element may include a fore-element leading edge 110 and the fore-element trailing edge 112. The aft-element 104 may include the aft-element leading edge 114 pivotably connected to the fore-element trailing edge 112, and an aft-element trailing edge 116. The actuator 108 may be configured to deflect the aft-element 104 through a predetermined deflection angle $\delta$ about the pivotable linkage 106 relative to the fore-element 102 within a predetermined time less than or equal to two convective periods. The predetermined deflection angle $\delta$ may be based on amount of lift required to execute a flight maneuver or mitigate a flow disturbance. The predetermined deflection time may be based on amount of lift required to execute a flight maneuver or mitigate a flow disturbance. The greater the deflection angle and/or the faster the deflection time, the greater the resulting lift. As described previously and here with reference to FIG. 1, a convective period corresponds to the time it takes for the fluid medium to flow from the fore-element leading edge 110 to the aft-element trailing edge 116.

The wing 100 may have a predetermined chord length $\Omega$. The chord length $\Omega$ of the wing 100 extends from the fore-element leading edge 110 to the aft-element trailing edge 116 (FIG. 1). The aft-element chord length $\Omega A$ extends from the aft-element leading edge 114 to the aft-element trailing edge 116. In embodiments of the present invention, the aft-element chord length $\Omega_A$ may be greater than 10% of the wing chord length $\Omega$. For example, the aft-element chord length $\Omega_A$ may be greater than 20% of the wing chord length $\Omega$, the aft-element chord length $\Omega_A$ may be greater than 30% of the wing chord length $\Omega$, the aft-element chord length $\Omega_A$ may be greater than 40% of the wing chord length $\Omega$, or the aft-element chord length $\Omega_A$ may even be about 50% of the wing chord length $\Omega$.

As can be seen in FIG. 1, while the aft-element 104 may have a constant chord length $\Omega_A$, the wing chord length $\Omega$ may change with the deflection angle of the aft-element 104. When the aft-element 104 is a trailing edge flap and when the deflection angle $\delta$ is zero, the wing chord length $\Omega$ is at a maximum. As the absolute value of the deflection angle $\delta$ increases, the wing chord length $\Omega$ decreases. In other words, the wing chord length $\Omega$ may be longer after deflection of the aft-element 104 through a predetermined deflection angle $\delta$ about the pivotable linkage 106 relative to the fore-element 102 than before deflection when the deflection angle $\delta$ has decreased. In the opposite deflection angle direction, the wing chord length $\Omega$ may be shorter after deflection of the aft-element 104 through a predetermined deflection angle $\delta$ about the pivotable linkage 106 relative to the fore-element 102 than before deflection when the deflection angle $\delta$ has increased.

FIG. 4A is a schematic diagram of another wing 100 configured to produce lift in a fluid medium flow; and FIG. 4B is a schematic diagram of the wing 100 of FIG. 4A having the flap 104 deployed, according to another embodiment herein. In FIGS. 4A and 4B, the flap leading edge 114 may extend along a direction "S" in addition to rotating about the pivotable linkage 106. In this embodiment, the wing chord length $\Omega$ may be longer after deflection of the aft-element 104 through a predetermined deflection angle $\delta$ about the pivotable linkage 106 relative to the fore-element 102 than before deflection when the deflection angle $\delta$ has increased.

As mentioned previously, embodiments of wing 100 may include an airfoil, a hydrofoil, a rotor-blade, or the like. The deflection angle $\delta$ of the aft-element 104 about the pivotable linkage 106 relative to the fore-element 102 may be zero when the chord of the wing aligns with the chord of the fore-element and the chord of the aft-element. An increase in the deflection angle $\delta$ may be positive in one direction and negative in an opposite direction (not depicted) for ease of description, but is not intended to be limiting. The predetermined deflection angle $\delta$ of the aft-element 104 about the pivotable linkage 106 relative to the fore-element 102 may be greater than 1 degree. For example, the predetermined deflection angle $\delta$ may be greater than 5 degrees, greater than 10 degrees, greater than 15 degrees, greater than 20 degrees, greater than 30 degrees, or even greater than 40 degrees, and in a positive or negative direction. For example, a deflection angle $\delta$ of 20 degrees may include any of a deflection of the aft-element 104 about the pivotable linkage 106 relative to the fore-element 102 from an angle of positive 20 degrees to an angle of zero degrees, from zero degrees to an angle of positive 20 degrees, from an angle of negative 20 degrees to an angle of zero degrees, from zero degrees to an angle of negative 20 degrees, from an angle of positive 10 degrees to an angle of positive 30 degrees, from an angle of negative 10 degrees to an angle of negative 30 degrees, from an angle of positive 10 degrees to an angle of negative 10 degrees, from an angle of positive 1 degree to an angle of negative 19 degrees, and so on.

The predetermined deflection angle $\delta$ of the aft-element 104 about the pivotable linkage 106 relative to the fore-element 102 may be sufficient to depart from linear lift theory. While not wishing to be bound by theory, Theodoren's linearized theory of lift is the use of the small angle approximation which, may be a good approximation of up to 10 degrees, e.g., 0.17 radians or approximately equal to sin (0.17). However, aerodynamically, a given airfoil at angle of attack of 10 degrees may already be subject to non-linearities. Although the typical airfoil may enter critical stall near 12-15 degrees angle of attack, non-linearities may become visible in the CL curve of the airfoil near 7 degrees (for a symmetric airfoil).

As mentioned above, the actuator 108 may be configured to deflect the aft-element 104 through the predetermined deflection angle $\delta$ within a predetermined time less than or equal to two convective periods. It will be appreciated that the predetermined time less than two convective periods includes any of a time period that is less than or equal to one convective period, and less than or equal to a fraction of one convective period. For example, the predetermined time may be less than or equal to half of a convective period, or even less than or equal to a quarter of a convective period.

In some embodiments, the fore-element leading edge 110 may include a deflectable leading-edge flap 402 configured to deflect through a predetermined leading-edge deflection angle $\delta 1$ relative to the fore-element 102 within a leading-edge predetermined time less than or equal to two convective periods as shown in FIGS. 4C-4E.

The fore-element 102 leading edge flap 402 chord length may be greater than 10% of the fore-element 102 chord length. For example, leading edge flap 402 chord length may be greater than 20% of the fore-element 102 chord length, the fore-element leading edge flap 402 chord length may be greater than 30% of the fore-element 102 chord length, the fore-element leading edge flap 402 chord length may be greater than 40% of the fore-element 102 chord length, or the fore-element leading edge flap 402 chord length may even be about 50% of the fore-element 102 chord length.

The predetermined leading-edge deflection angle δ1 relative to the fore-element 102 may be greater than 40 degrees. For example, the predetermined leading-edge deflection angle δ1 may be greater 30 degrees, greater than 20 degrees, greater than 15 degrees, greater than 10 degrees, greater than 5 degrees, or even greater than 1 degree.

The leading-edge predetermined time may be less than or equal to two convective periods. For example, the leading-edge predetermined time may be less than or equal to one convective period, or the leading-edge predetermined time may even be less than or equal to a fraction of one convective periods. For example, the leading-edge predetermined time may be less than or equal to half of a convective period, or even less than or equal to a quarter of a convective period.

Figure 5:
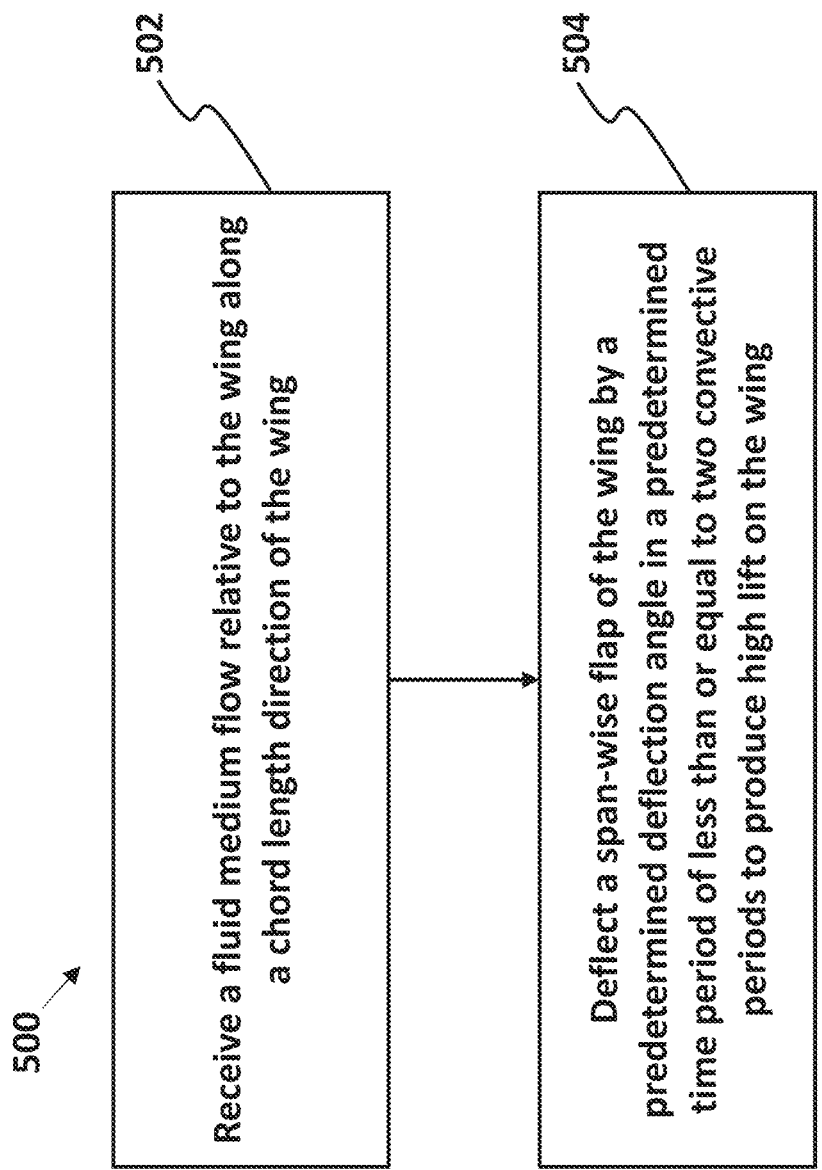
FIG. 5 is a flow diagram of a method of controlling a high lift on a wing according to an embodiment herein.

According to another embodiment, a method 500 of controlling a high lift on the wing is provided as shown in FIG. 5 with reference to FIGS. 1-4E. The method 500 may include receiving a fluid medium flow relative to the wing along a chord length direction of the wing (502). For example, an airfoil or rotor blade moving through air, or a hydrofoil moving through water, may receive the fluid medium flow relative to the wing along the chord length direction of the wing. The method may include deflecting a span-wise flap of the wing by a predetermined deflection angle in a predetermined time period of less than or equal to two convective periods to produce high lift on the wing (504). The span-wise flap may be, for example, the above described aft-element trailing edge flap 104 or the fore-element leading edge flap 402.

In the method, the high lift may occur for a time period of less than 10 convective periods and may be greater than a nominal lift. The nominal lift may be established on the wing ten (10) convective periods or more after deflecting the span-wise flap in a steady fluid flow FL. The high lift and the nominal lift may be at a lift angle to the received fluid medium flow relative to the chord length direction of the wing. For example, for the wing having fluid medium flowing over and under the wing, the high lift and the nominal lift may be in a direction pointing upward for positive lift or in a direction pointing downward for negative lift. The high lift may be beneficial and while the high lift may last for up to ten (10) convective times after flap deflection has completed, an additional benefit may be that an instantaneous lift peak persists during or near the scheduled flap deflection, i.e., during the rapid flap deflection. For example, the instantaneous lift peak may mitigate a gust disturbance or provide a flight maneuver. The rapid flap deflection may produce an instantaneous or near instantaneous lift peak of up to about 50% more lift than the nominal lift. The nominal lift refers to the lift from flow over the wing without significant disturbances in the medium flow when the wing is in a steady state and the flap is not deflecting. In some embodiments, the high lift may be equal to or greater than 1.5 times the nominal lift.

In the method, the fluid medium flow may be initially attached to the wing, and when the flap is deflected at a high rate the flow may remain attached to the wing. This can remain true for high incidence angles (i.e., high angles of attack), while the flap is moving to the deflection angle, and shortly after the deflection angle is reached. That is, rapid flap-deflection may cause a lag in flow separation for configurations where flow would otherwise separate from the wing. However, rapid flap-deflection may also provide a beneficial lift transient when the fluid medium flow is initially separated from the wing. That is, the rapid actuation of the flap can provide lift whether or not the initial flowfield condition is separated. For example, in a wing having a trailing edge flap, the fore-element of the wing may be initially at a low angle of attack, such as in line with the fluid medium flow whereas the aft-element may be at a zero deflection angle such that the fluid medium flow is attached to the wing and rapid-flap deflection produces high lift. For another example, the fore-element may be at a high incidence angle with respect to the fluid medium flow (i.e., high angle of attack) and the aft-element may be at a high deflection angle such that the fluid medium flow is detached from the wing and a rapid flap-deflection may still produce high lift. For another example, the fore-element may be initially at a high angle of attack and the aft-element may be at a low deflection angle such that the fluid medium may be attached to or detached from the wing and a rapid flap-deflection may produce high lift. For even another example, the fore-element may be initially at a low angle of attack, such as in line with the fluid medium flow, the aft-element may be at a high deflection angle, and the flow may be detached from or attached to the wing followed by a rapid flap-deflection to produce high lift. That is, the flow may be detached from the wing prior to the deflecting of the span-wise flap and surprisingly, still produce high lift by rapid flap deflection.

While not wishing to be bound by theory, chord length, deflection angle, and deflection time may be understood to be related as follows. The initial spike in lift that persists for the duration of flap motion may be a combination of non-circulatory forces, i.e., the force applied to the airfoil by the fluid as the airfoil accelerates the surrounding fluid and circulatory forces generated by virtue of the flap's rotation. The former may be considered directly proportional to the acceleration profile of the flap and the geometric length of the flap. The direction of the resulting force applied to the flap by the fluid in this process may also be dependent on the orientation of the flap, i.e., the flap deflection angle. The latter circulatory force generated by virtue of rotating the flap may be considered directly proportional to the speed at which the flap rotates. The speed at which the flap rotates may be considered dependent on the flap deflection amplitude and the temporal duration of the flap motion.

After the completion of flap motion, the final deflection angle may influence the interactions between transient phenomena formed during flap deflection (vortices) and the airfoil. How vortices, for example, formed at the leading element's leading edge impinge on the flap as they convect downstream are considered to affect the time history that follows the completion of motion. The emphasis on convection time (or period) conveys that motions are executed at rates faster than it takes an element of fluid to travel from the leading edge of the airfoil to the trailing edge of the airfoil. Doing so provides the function that enables excitation of a host of unsteady features conducive to lift enhancement.

The chord length of the span-wise flap may be greater than or equal to 10% of a chord length of the wing to achieve the described high lift due to the rapid flap deflection. For example, the chord length of the flap may be greater than or equal to 20% of a chord length of the wing, the chord length of the flap may be greater than or equal to 30% of a chord length of the wing, the chord length of the flap may be greater than or equal to 40% of a chord length of the wing, or the chord length of the flap may even be equal to about 50% of a chord length of the wing.

The predetermined deflection angle may be greater than 1 degree to achieve the described high lift due to the rapid flap deflection. For example, the predetermined deflection angle may be greater than 5 degrees, greater than 10 degrees, greater than 15 degrees, greater than 20 degrees, greater than 30 degrees or even greater than 40 degrees. The span-wise flap may be a leading-edge flap or a trailing-edge flap. The wing may be a hydrofoil or an airfoil. The fluid medium may be water or air.

Figure 6:
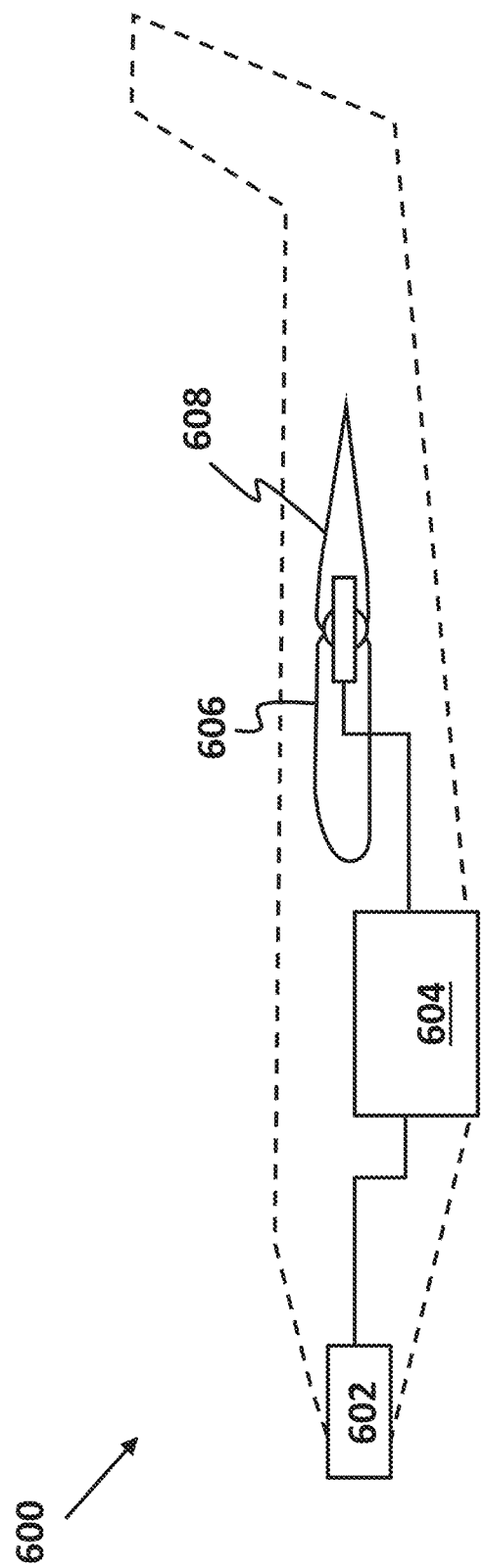
FIG. 6 is a schematic diagram illustrating a system according to an embodiment herein.

In another exemplary embodiment, a system is provided. As shown in FIG. 6, the system 600 may include a sensor 602 and a controller 604. The sensor may detect an input and generate an input signal based on the input. The input may be a fluid medium flow disturbance at a wing 606 such as created by a gust or turbulence, or a wing maneuver command. A wing maneuver command may include flight control commands for maneuvering an aircraft.

The controller 604 may be configured to receive the input signal and deflect the span-wise flap 608 of the wing by the predetermined deflection angle in the predetermined time period of less than or equal to two convective periods based on the received input signal to produce high lift on the wing. The span-wise flap may be, for example, the above described aft-element 104 or the fore-element leading edge flap 402. The high lift may last for a time of less than 10 convective periods and may be greater than a nominal lift. The nominal lift may be established on the wing 10 convective periods or more after deflecting the span-wise flap. The high lift and the nominal lift can be at a lift angle to the relative motion of the fluid medium flow to the wing chord length.

The predetermined deflection angle may be greater than 1 degree. For example, the predetermined deflection angle may be greater than 5 degrees. For example, the predetermined deflection angle may be greater 10 degrees, greater than 15 degrees, greater than 20 degrees, greater than 30 degrees, or even greater than 50 degrees.

In the system, the high lift may be up to about 50% greater than the nominal lift. In some embodiments, the high lift may be equal to or greater than about 1.5 times the nominal lift.

In the system, the predetermined time may be less than or equal to two convective periods. For example, the predetermined time may be less than or equal to one convective period, or the predetermined time may even be less than or equal to a fraction of one convective periods. For example, the predetermined time may be less than or equal to half of a convective period, or even less than or equal to a quarter of a convective period.

The following examples illustrate particular properties and advantages of some of the embodiments of the present disclosure. Although these are examples of reduction to practice of the present disclosure and confirmation that the principles described in the present disclosure are therefore valid, they should not be construed as in any way limiting the scope of the disclosure.

In one example, a water tunnel was used to document high-frequency deflection of trailing edge flaps for flight surfaces, e.g. aircraft wings, empennages, and comparable devices for waterborne craft. It was discovered that, depending on deflection rate and amplitude, large transients could be produced in the lift-coefficient and pitching moment-coefficient, whether or not the base-flow (before deflection was initiated) was attached or separated. Thus, the disclosed apparatus, method, and system can be used to produce lift in a post-stall environment as well as in a non-stalled environment. In either case, the objective was to produce a large aerodynamic force or moment on-demand, which may be used for maneuvering of the craft or to mitigate the effect of undesirable transients, such as gusts or turbulence.

As illustrated in FIGS. 2, 3A, 3B, and 3C, a wing 100 having a NACA-0006 section and having a 50%-chord trailing-edge flap was used. Observations and measurements were made in a water tunnel of rectangular test section, 45 cm wide and 60 cm high, with flow speeds of 20 cm/s to 1 m/s. A set of linear electric motors (not shown) were used to move the flap 104 via a four-bar linkage 117, with user-selectable initial and final positions, as well as motion-speed, and deflection profile.

Taking into account the relevant flow speed, U, the wing (or other flight-surface) chord, c, the flap 104 was actuated from an initial angle to a final angle rapidly, for example, at least as fast as $t=0.5*c/U$. It was discovered that these conditions yielded a transient in lift coefficient and pitching moment coefficient beyond the steady-state, in a tunable direction (positive or negative) depending on flap deflection direction (positive or negative), whether the base flow was separated or attached. That is, a transient in lift coefficient and pitching moment coefficient beyond the steady-state was produced regardless of whether the flap's initial or final deflection angle had a flow that was separated or attached. The flap motion mechanism allowed ±45-degree motion of the flap, whether the fore-element 102 was at zero degrees incidence or 20 degrees incidence to the fluid medium flow direction. The resultant lift coefficient transients were determined for a given flap deflection rate.

For aircraft, fast motion of flaps with respect to convective time may typically correspond to relatively slow flight speeds (fixed wing aircraft) or relatively slow rotor rotation speed (helicopters). For watercraft, where motion of the vehicle is itself relatively slow, i.e., the flight-surface chord divided by cruise-speed is an appreciable fraction of a second, flaps may be deflected quickly by conventional electric or hydraulic means. Hence the apparatus was installed in a water tunnel. The apparatus comprised a three-degrees of freedom of motion rig, including a triplet of H2W linear motors (H2W TECHNOLOGIES™), driven by ADVANCED MOTION CONTROLS DigiFlex® servo-drives controlled by a GALIL DMC 4040 4-channel card, with user-selected proportional/integral/derivative (PID) constants for each channel. A plastic 3D printed NACA-0006 of 200 mm chord, strengthened by spanwise carbon-fiber rods, spanning the test section with a nominally 0.5 mm gap at each wingtip, was sliced spanwise at 50% chord. The resulting fore-element 102 was rigidly connected to a plunge-rod 121 from the front vertical linear motor. The resulting aft-element or flap 104 was analogously connected to the rear vertical linear motor, but with a linkage mechanism 119 such that relative motion between the two vertical motors resulted in a pitching motion of the flap 104. In other words, the fore-element 102 was fixed, while the flap 104 was so displaced that its motion relative to the front element pivoted about the gap between the two elements. Limitation of flap incidence was ±45 degrees. Testing and observations were performed for two fore-element incidence angles of 0 degrees as being typical of attached flow, and 20 degrees as being typical of separated flow.

Lift force, drag force, and pitching-moment coefficient were measured independently for the two elements 102, 104, using an ATI INDUSTRIAL AUTOMATION NANO-25 IP68 force-balance imbedded in each element. There were no mechanical connections between the fore-element 102 and aft-element (flap) 104, so that forces respective to each were measured independently. That is, aerodynamic forces were separately measured on the fore-element 102 and the flap-element 104, while the two elements remained in aerodynamic contact.

The flap deflection-history is given by a sinusoidal waveform:

$$\delta_F(t) = \delta_0 + 0.5A(1 - \cos(2\pi f t)) \quad \text{(Equation 1)}$$

where $\delta_0$ is the initial flap angle, A is the amplitude of the sine wave, and f is the frequency in Hz. That is, A is the peak-to-peak amplitude of flap deflection. For example, if the desired flap deflection is from 5 degrees to 20 degrees, the kinematic profile will be $\delta_F(t) = 5° + 0.5 \times 15°(1 - \cos(2\pi f t))$. The actual overall flap motion is the first half of the waveform, so that the flap concludes its position at flap angle of $\delta_0 + A$. For a free-stream (fluid medium flow) speed of 200 mm/s with a 200 mm chord gives nominal chord-based Reynolds number of 40,000. Conveniently, one convective time, in chords-traveled, was also numerically one second of wall-clock time. Thus, for a frequency of 1 Hz, the realized motion occurs over 0.5 s, or one half of one convective time, tU/c=0.5. And a recorded lift-coefficient history of 10 seconds covers 10 convective times, which would be a 0.05 Hz waveform.

The focus of the experiment was to actuate the flap within a particular range of convective time, e.g. faster than two convective times. That is, the flap performed its motion over a range of angles of incidence of interest in a time no longer than it would take the free-stream to convect along a streamwise distance equal to two wing chords. An immediate aerodynamic response was generated when the flap was actuated to full deployment within two convective times, i.e., 2=tU/c, where t=c/U is the time it takes for fluid to convect over one airfoil chord. Deploying the flap through the deflection angle within two convective times provided a high lift response. However, time periods longer than two convective times did not produce the high lift response. Flap actuation through the deflection angle within fractional convective times also provided a high lift response and were also examined, as described herein.

Results

Attached Flow with Fore-Element at 0 Degrees Incidence

Figure 7A:
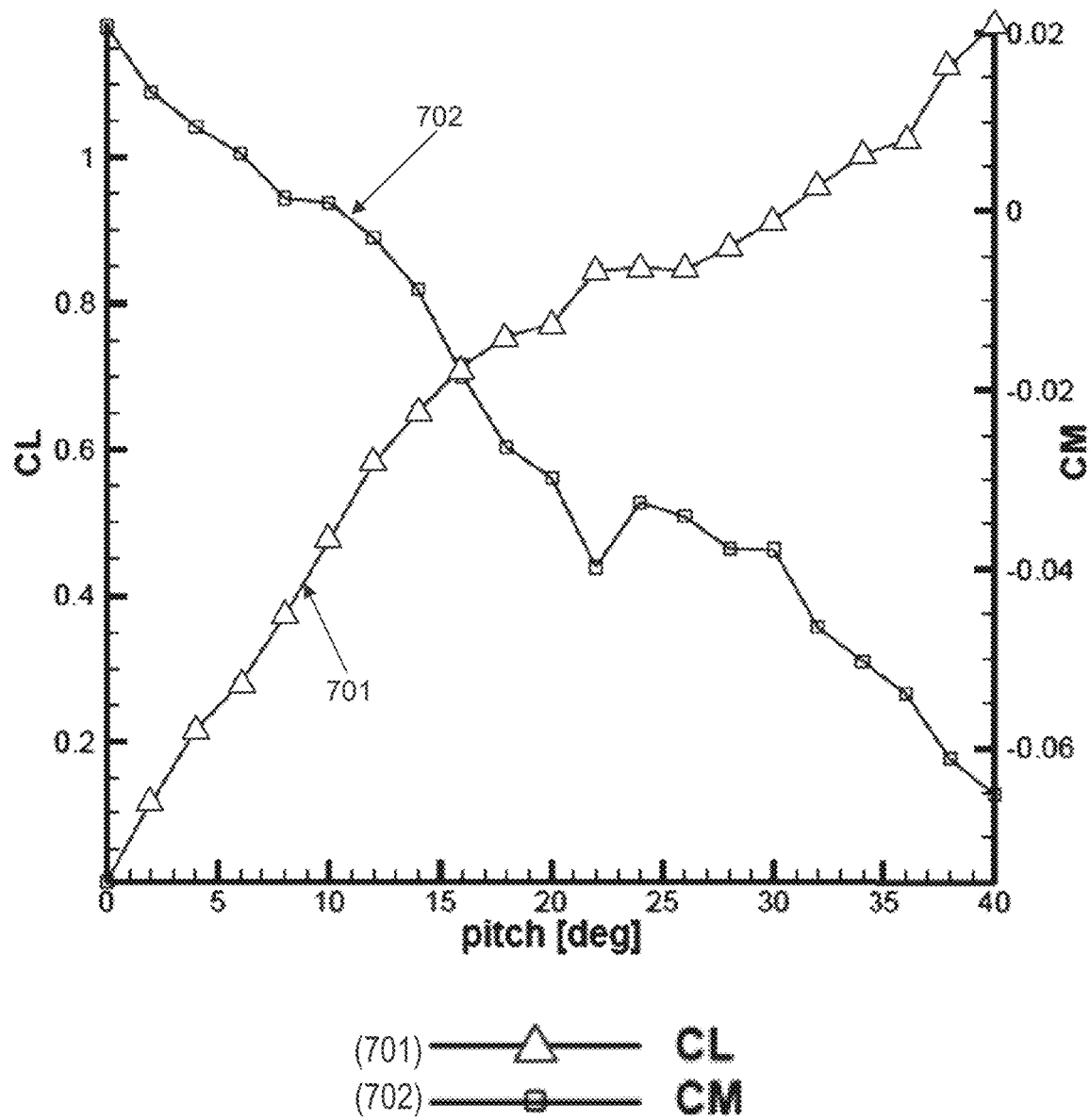
FIGS. 7A and 7B present a comparative example of static data, where the flap is deflected progressively from 0 degrees to 40 degrees, in 2-degree increments.
Figure 7B:
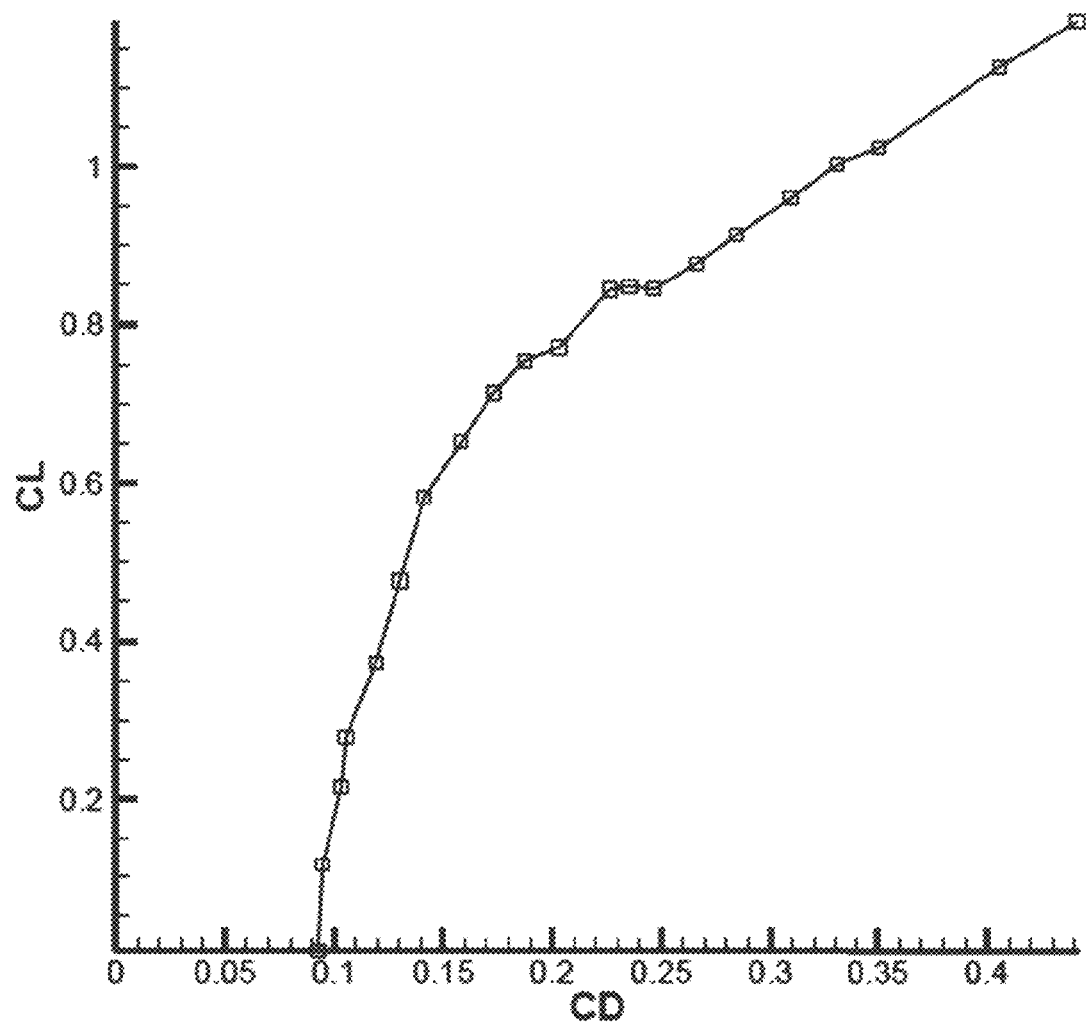

With the case of nominally attached flow, where the front element (fore-element) is at zero incidence, flow was fully attached when the flap starting-angle, ending-angle and intermediate position were all small. FIGS. 7A and 7B present a comparative example of static data, where the flap is deflected progressively from 0 degrees to 40 degrees, in 2-degree increments. Static lift coefficient (CL) 701 and pitching moment coefficient (CM) 702 are presented in FIG. 7A, and lift-drag polar (CM-CD) is presented in FIG. 7B for flap incidences from 0° to 40°. The fore-element remained at 0° throughout. All data were at Reynolds number (Re) =~40,000. FIG. 7A shows that the lift response was linear until about 15 degrees of flap deflection (CL~0.7), whereupon there was a slope-change. Lift vs. incidence angle then proceeded at the new slope for the remainder of the incidence angle range. As shown in FIG. 7B, a slope change in the drag polar was also evinced at CL~0.7. The pitching moment coefficient in FIG. 7A has a small perturbation just beyond 20 degrees incidence, but was otherwise linear across the entire extent of flap deflection angle.

Figure 8A:
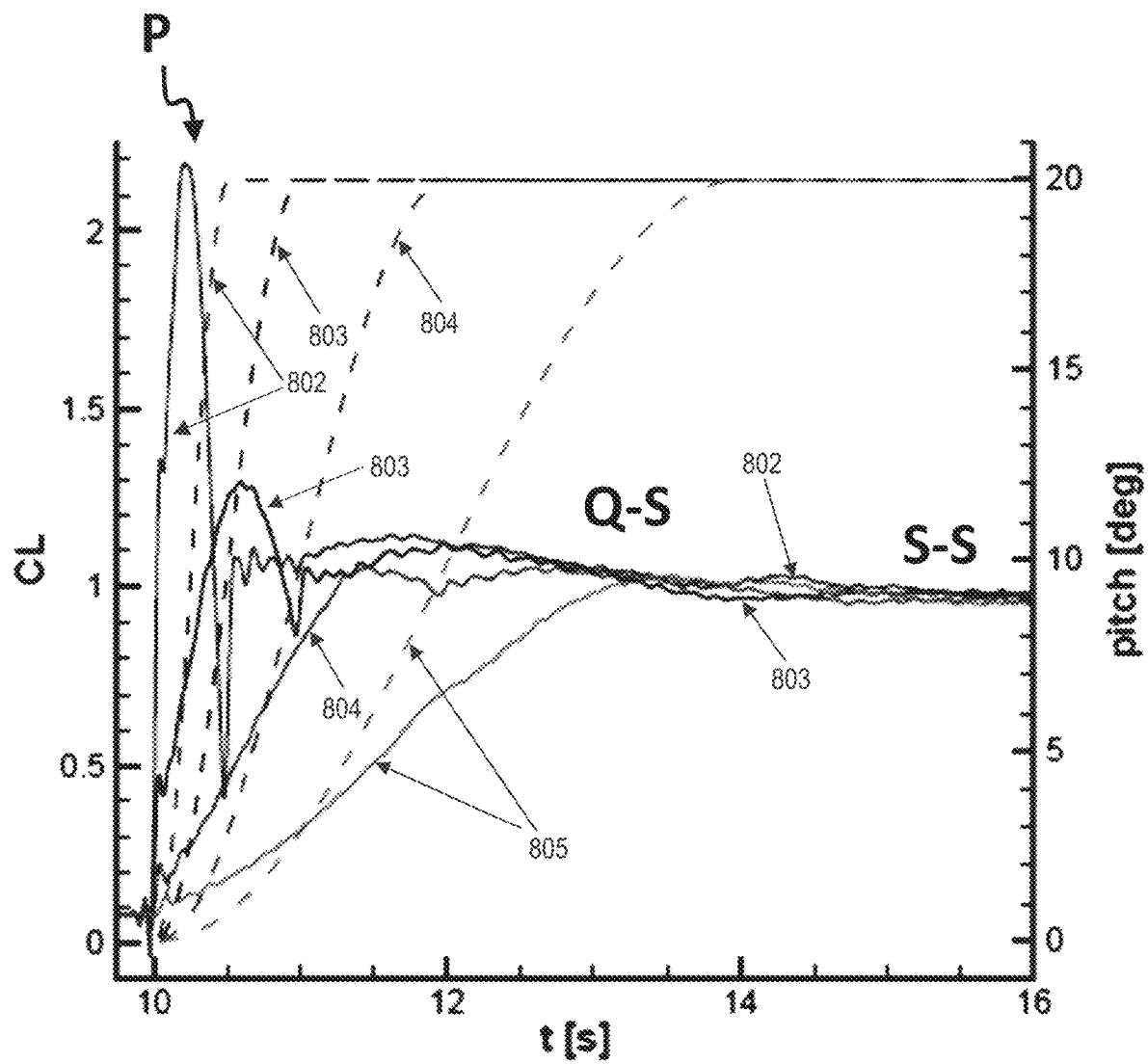
FIGS. 8A, 8B, and 8C show graphical data results of flap deflection histories from a start at 0 degrees and endpoint of 20 degrees according to embodiments herein.
Figure 8B:
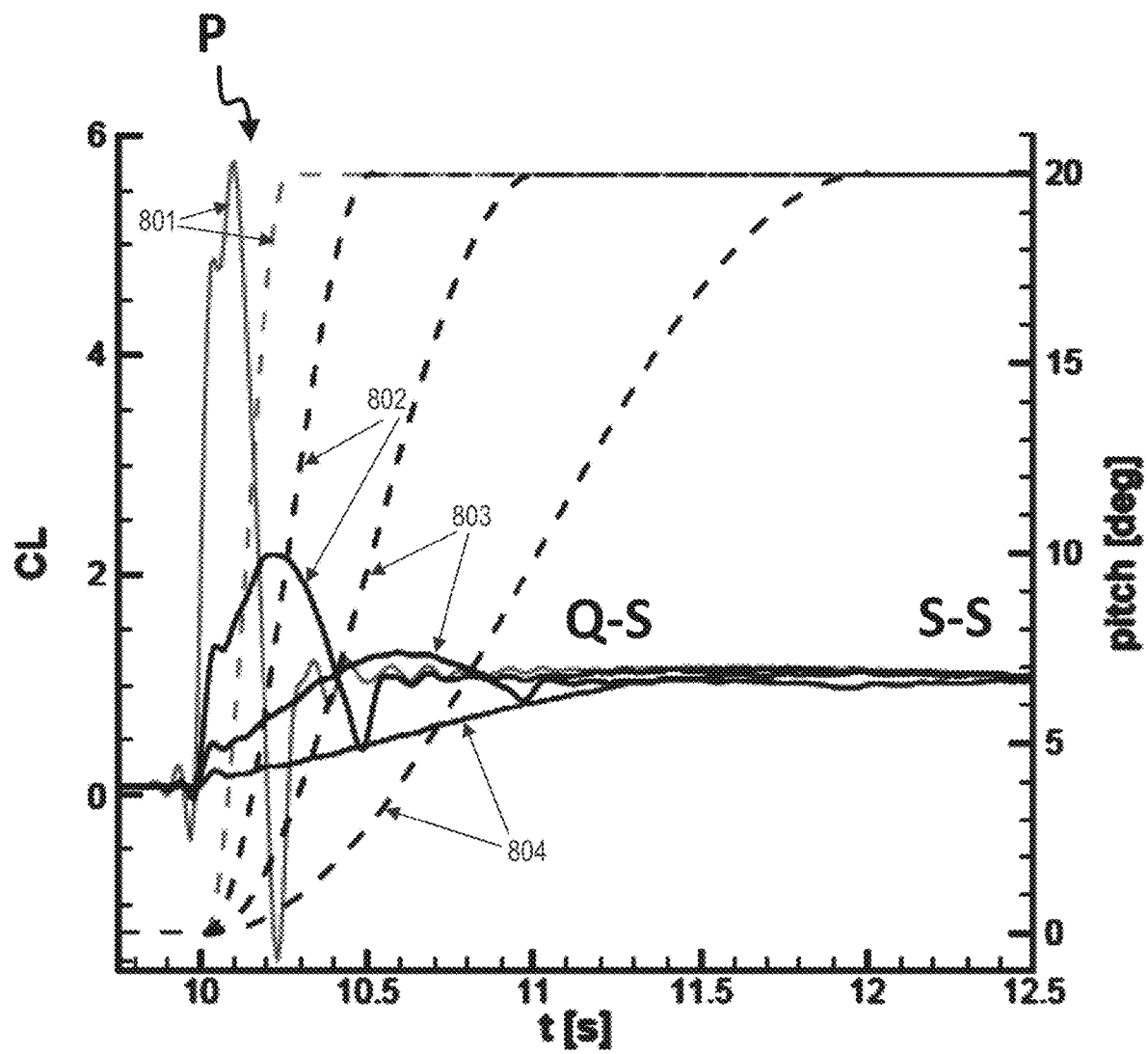
Figure 8C:
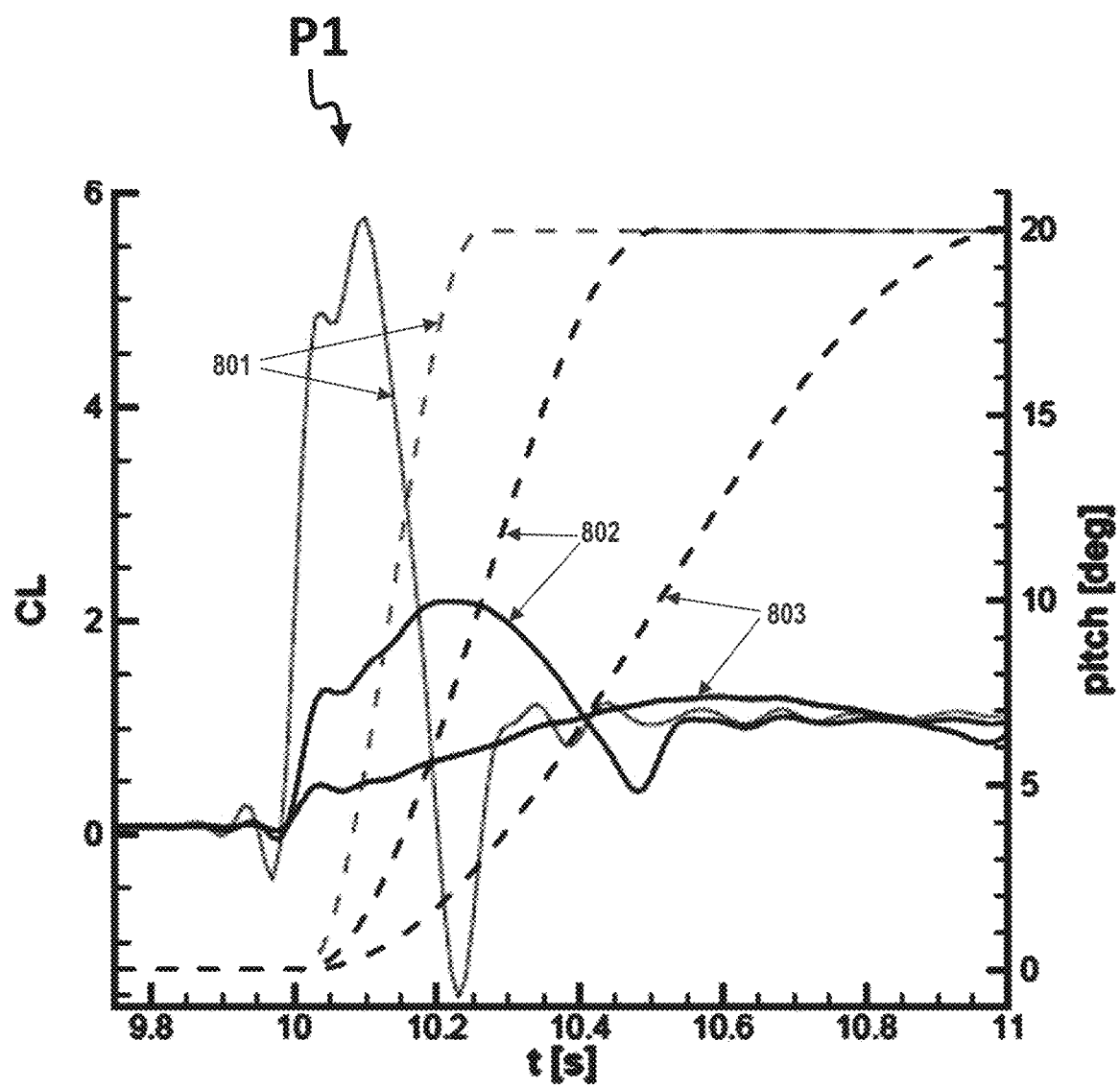
Figure 9A:
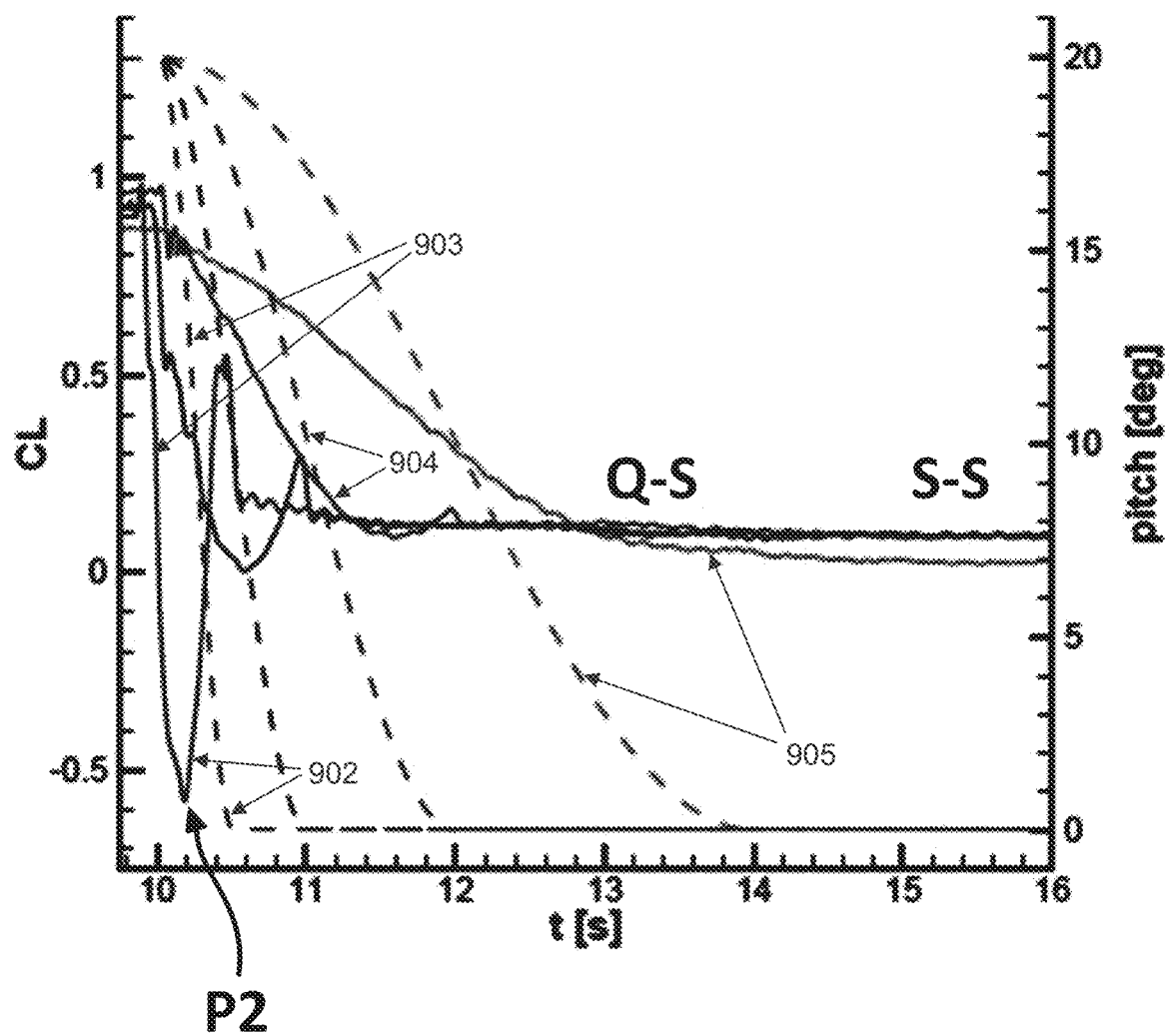
FIGS. 9A, 9B, and 9C show graphical data results of flap deflection histories from a start of 20 degrees and endpoint of 0 degrees according to embodiments herein.
Figure 9B:
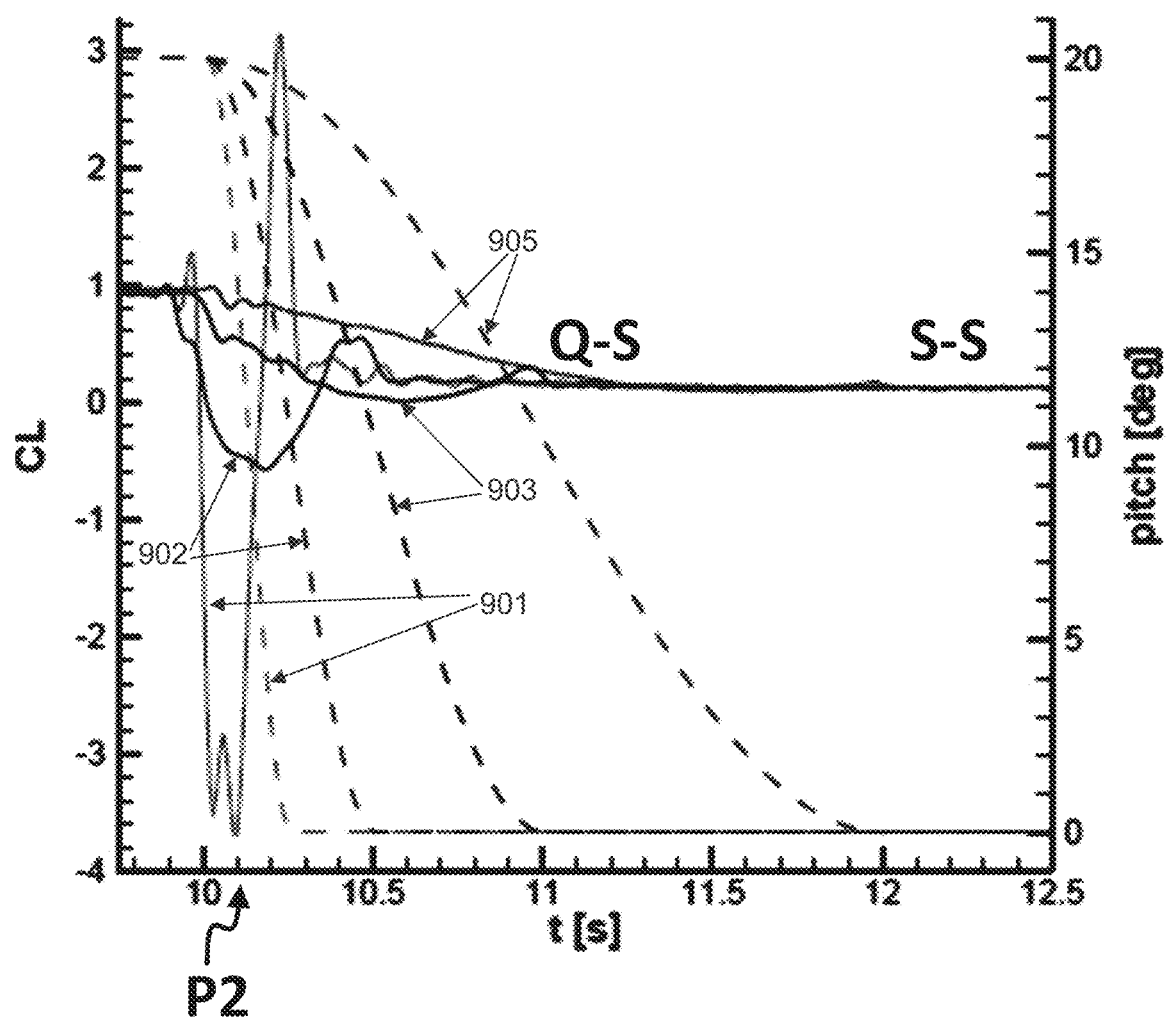
Figure 9C:
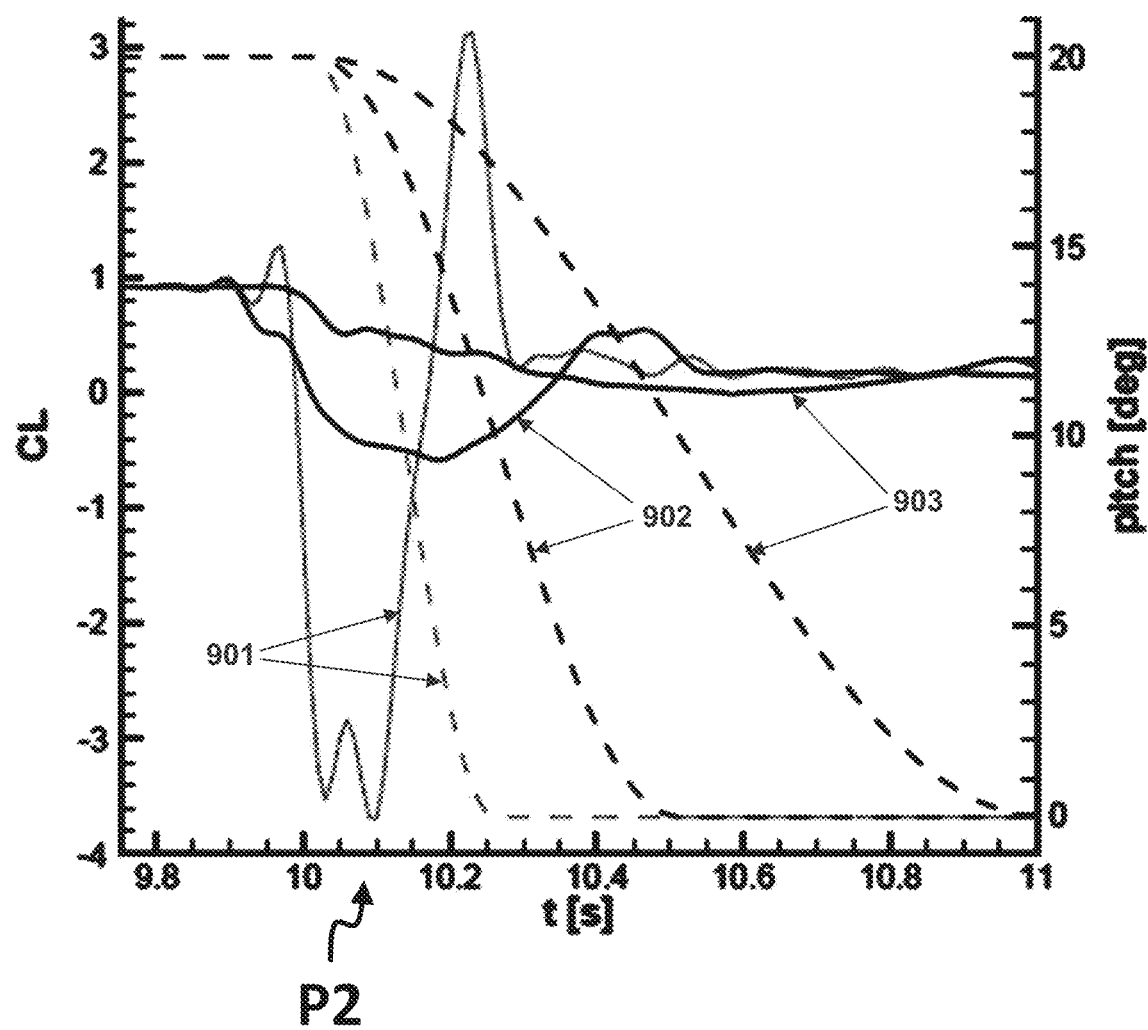

FIGS. 8A, 8B, and 8C show graphical data results of flap deflection histories from a start at 0 degrees and endpoint of 20 degrees. The leading edge of the fore-element (LE) is at 0 degrees relative to the fluid medium flow and the trailing edge of the aft element (TE) begins at 0 degrees and ends at 20 degrees as indicated in the legend by LE=0 degrees and TE=0 to 20 degrees. The dashed lines indicate flap deflection (pitch in degrees versus time) for 2 Hz (801), 1 Hz (802), 0.5 Hz (803), 0.25 Hz (804), and 0.125 Hz (805). The corresponding solid lines 801-805 indicate corresponding lift coefficient histories for the flap incidence histories. FIGS. 9A, 9B, and 9C show graphical data results of flap deflection histories from a start of 20 degrees and endpoint of 0 degrees. The leading edge of the fore-element (LE) is at 0 degrees relative to the fluid medium flow and the trailing edge of the aft element (TE) begins at 20 degrees and ends at 0 degrees as indicated in the legend by LE=0 degrees and TE=20 to 0 degrees. The dashed lines indicate flap deflection (pitch in degrees versus time) for 2 Hz (901), 1 Hz (902), 0.5 Hz (903), 0.25 Hz (904), and 0.125 Hz (905). The corresponding solid lines 901-905 indicate corresponding lift coefficient histories for the flap incidence histories. These results demonstrate complementary cases; the former case (FIGS. 8A-8C) begins in attached flow and concludes in separated flow, at least in terms of flow about the flap (the fore-element being at zero incidence). The latter, complementary, case (FIGS. 9A-9C) begins with the flap in separated flow, and concludes with flow reattachment. Lift coefficient history is plotted in overlay with flap incidence history. Flap motion begins at a wall-clock-time of 10 seconds, and the delay, if any, is shown between motion commencement and lift response. Frequencies plotted were for 2, 1, 0.5, 0.25, 0.125, and 0.05 Hz (FIG. 10B (1003)). Referring to Equation 1, these frequencies correspond to a start-to-finish flap deflection time of 0.25, 0.5, 1, 2, 4, and 10 convective times. The ten (10) convective time case is shown as approaching the quasi-steady limit as can be confirmed by comparison with classical flapped airfoil theory.

In FIGS. 8A through 8C and FIGS. 9A through 9C, there is a prominent spike or peak "P" in lift coefficient in some proportion to the flap deflection rate. The peak in lift coefficient is higher in amplitude than the steady-state lift value, and for the highest deflection-rates it is followed by a peak in the opposite direction, due to added-mass effects. FIG. 8A shows a long time-basis omitting the fastest motion, 2 Hz (801), FIG. 8B shows a medium time-basis omitting the slowest motion (805), and FIG. 8C shows a short time-basis omitting the two slowest motions (804), (805). Note different scales of ordinate in FIG. 8A compared to FIGS. 8B and 8C, the 2 Hz motion (801) has such a lift-spike P1 that it overwhelms the other cases. In going from the fastest to the slowest flap deflection history, peaks attenuate, and lift response approaches steady-state. Because the flap is moving from larger incidence angle to smaller in FIGS. 9A-9C, showing flap beginning at 20° incidence and ending at 0° incidence, the pitch-rate is negative, and hence so is the lift spike P2.

Figure 10A:
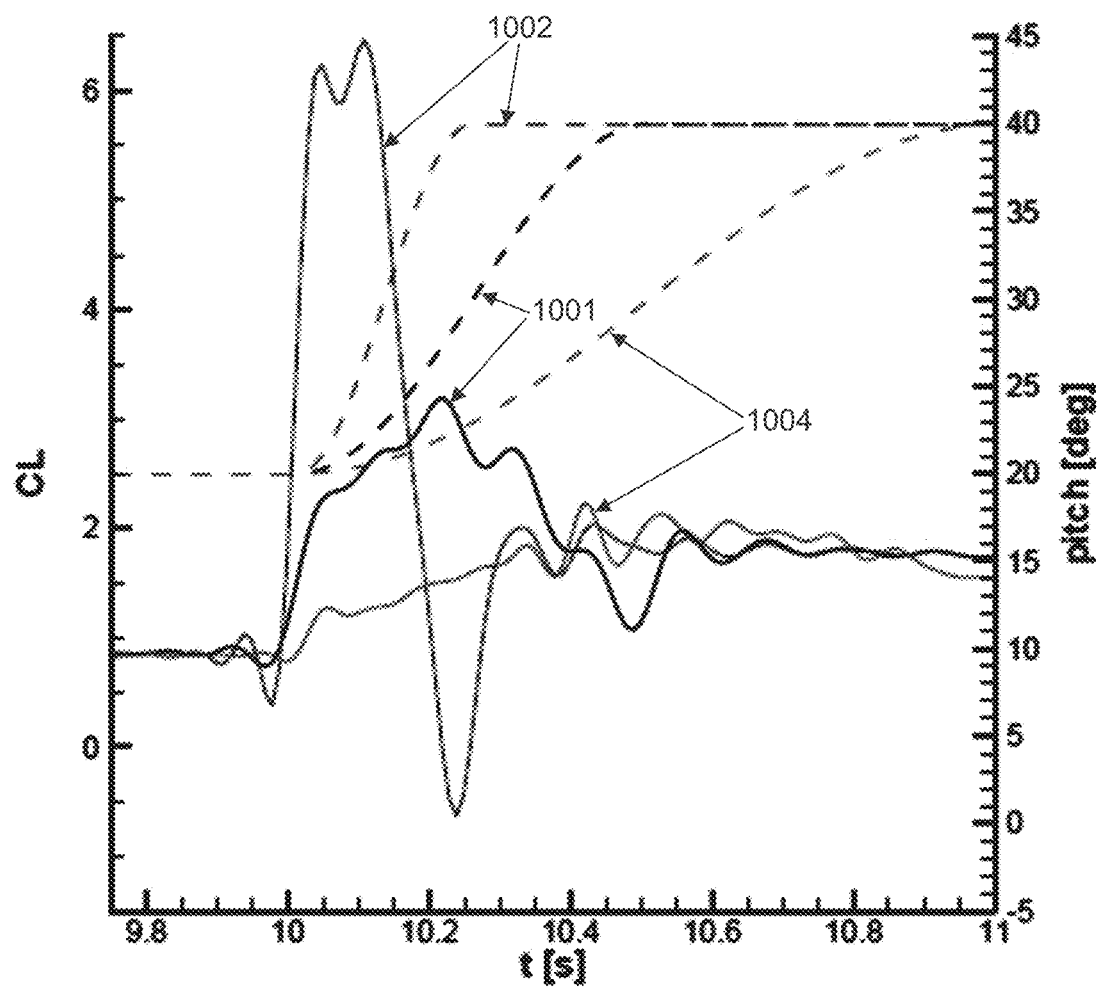
FIGS. 10A and 10B, show graphical data results of flap deflection histories where the flap begins at $\delta_0=20°$ incidence, and ends its motion at angle $\delta_0+A=40°$ according to embodiments herein.
Figure 10B:
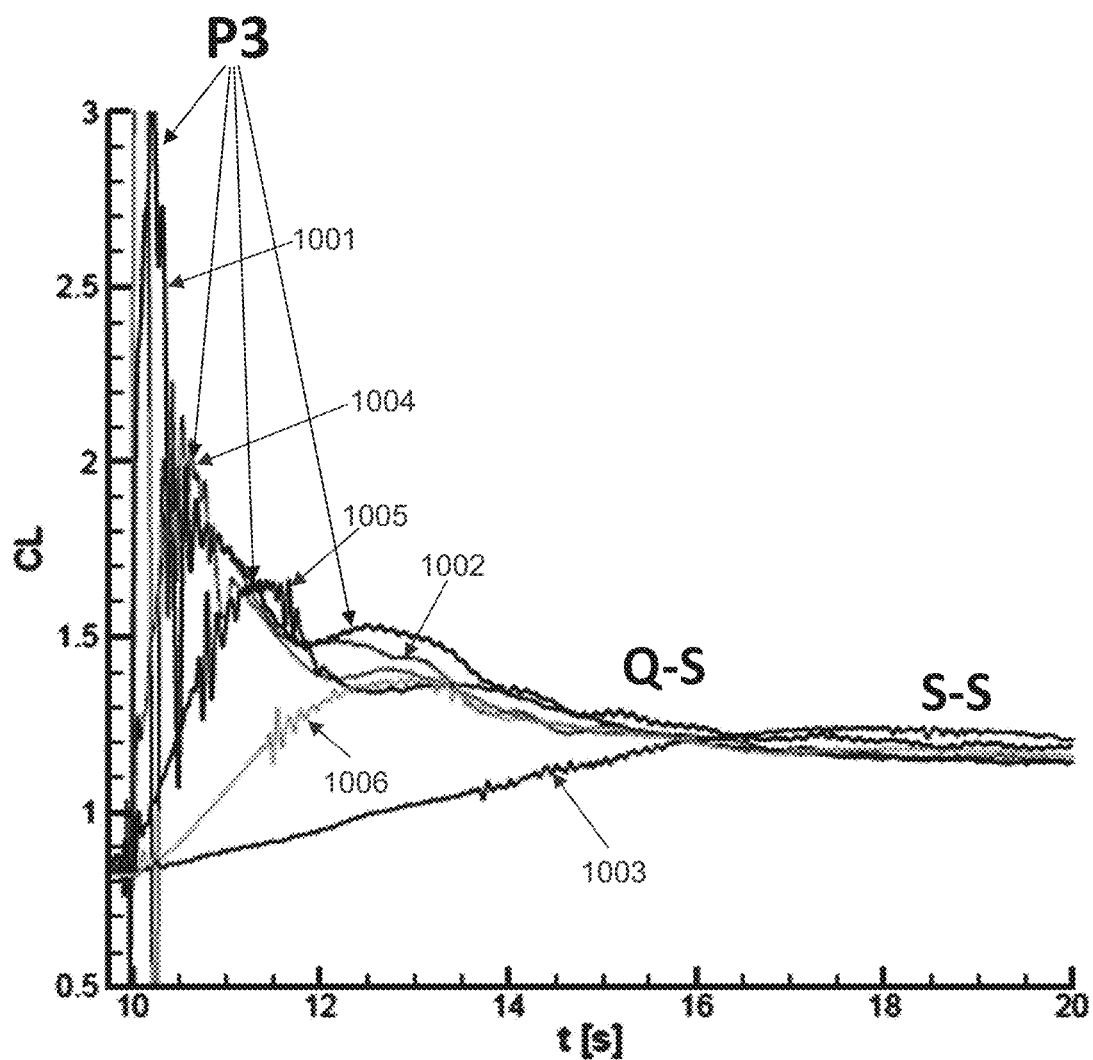

FIGS. 8A through 8C and 9A through 9C show the results for moderate flap deflection angles, bounded by 20 degrees (A=20 degrees). In FIGS. 10A and 10B, which also show a parameter study of deflection frequency, the flap begins at $\delta 0 = 20°$ incidence, and ends its motion at angle $\delta_0 + A = 40°$. The leading edge of the fore-element (LE) is at 0 degrees relative to the fluid medium flow and the trailing edge of the aft element (TE) begins at 20 degrees and ends at 40 degrees as indicated in the legend by LE=0 degrees and TE=20 to 40 degrees. The dashed lines indicate flap deflection (pitch in degrees versus time) for 2 Hz (1002), 1 Hz (1001), 0.5 Hz (1004), 0.25 Hz (1005), 0.125 Hz (1006), and 0.05 Hz (1003). The corresponding solid lines 1001-1006 indicate corresponding lift coefficient histories for the flap incidence histories. The fluid medium flow is horizontal and the flap deflection angles were also with reference to the horizontal, thus the deflected angle and the angle of incidence are the same. The instantaneous lift-responses and rate-dependent peaks in lift P3 are shown overshooting the quasi-steady value Q-S for 2 Hz (1002), 1 Hz (1001), 0.5 Hz (1004), 0.25 Hz (1005), 0.125 Hz (1006). It is also shown that the higher the final flap incidence angle, the more separated the flow, and the longer the relaxation-time to steady-state S-S. Relaxation time to steady-state S-S is shown to take about 10 convective times in FIG. 10B.

Figure 11A:
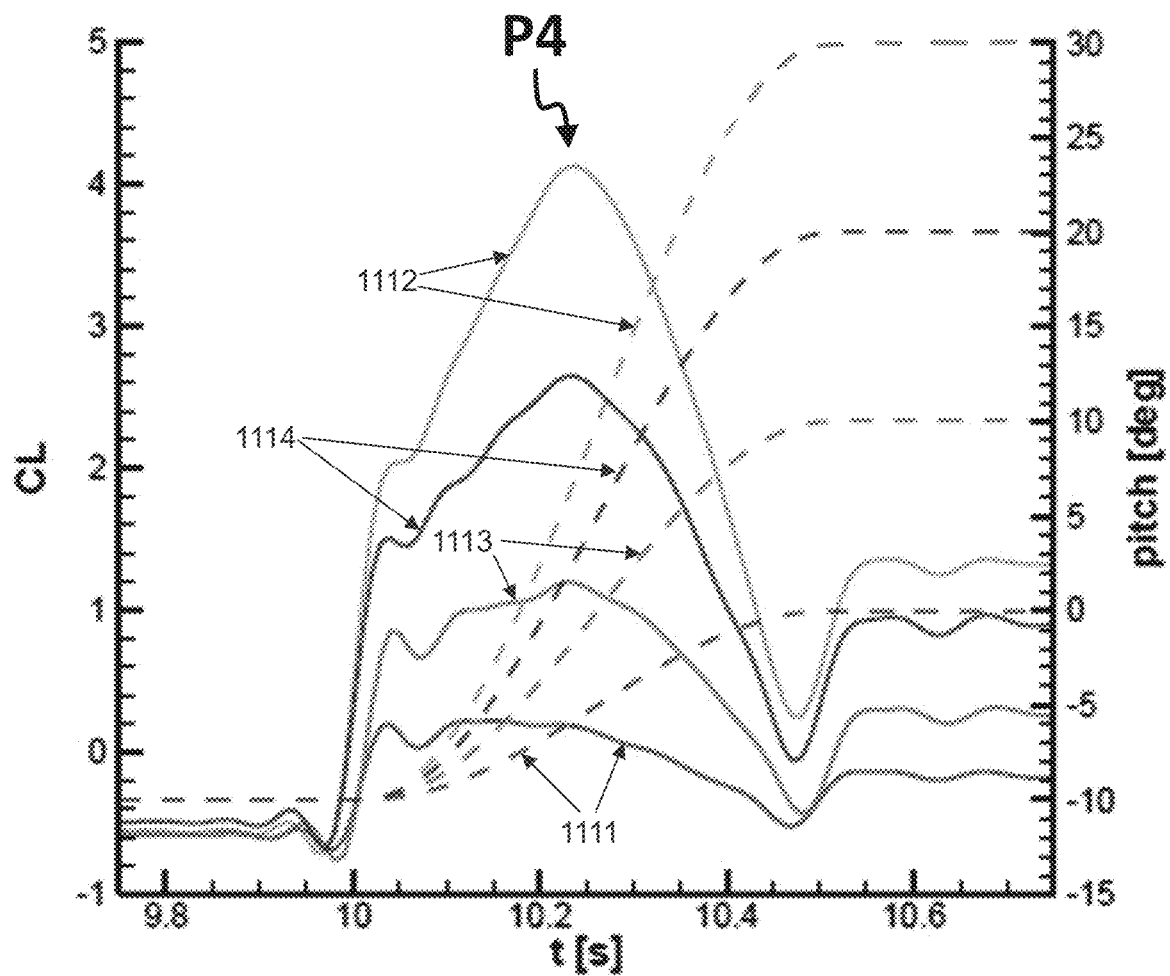
FIG. 11A shows 1 Hz and 0.5 convective time actuation results for lift
Figure 11B:
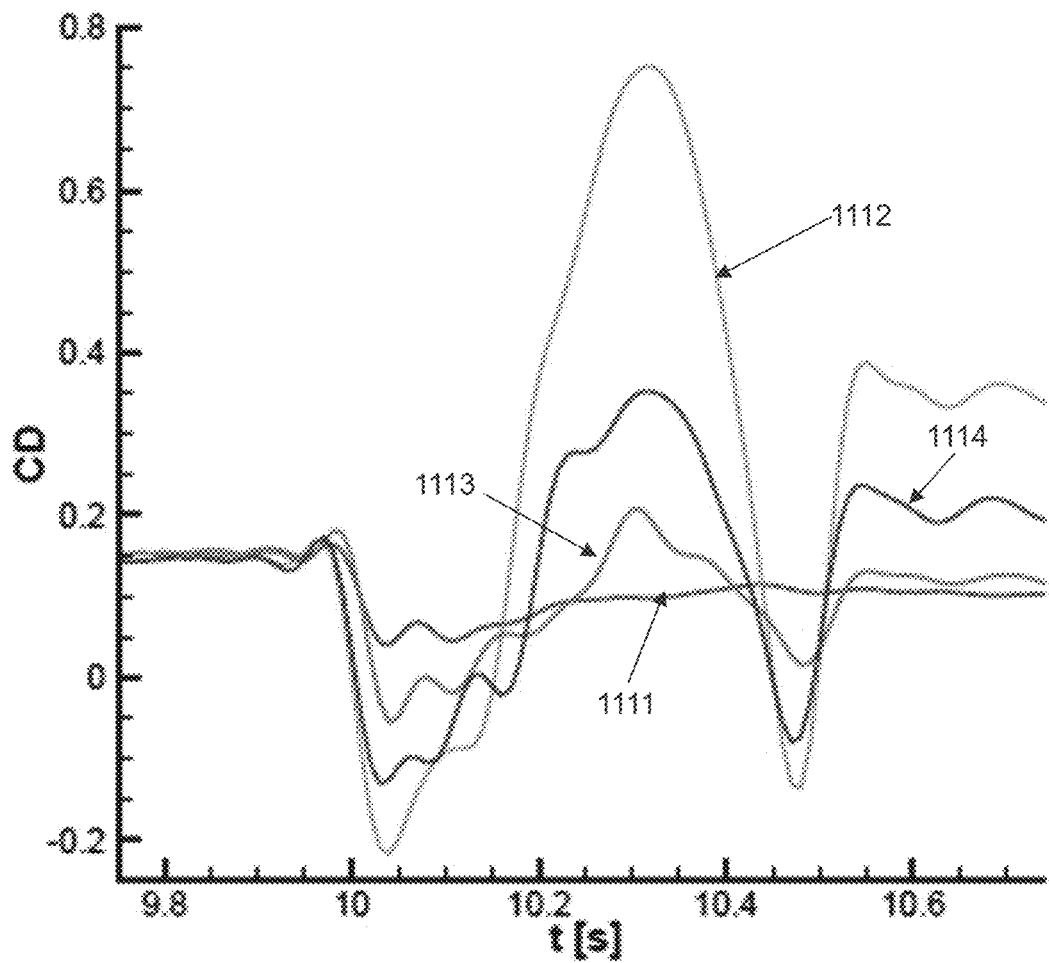
FIG. 11B shows 1 Hz and 0.5 convective time actuation results for drag according to an embodiment herein.

FIGS. 11A and 11B show 1 Hz or 0.5 convective time actuation results for both lift (CL) and drag (CD), respectively. The flap initial angle was $\delta_0=-10$ degrees, wherein the flow past the flap before commencement of motion was on the verge of separation. The final angle $\delta_0+A$ ranged from 0 to 30 degrees. The dashed lines indicate flap deflection (pitch in degrees versus time) at 1 Hz as indicated in the legend by LE=0 degrees and TE=−10 to 0 degrees (1111), TE=−10 to 30 degrees (1112), TE=−10 to 10 degrees (1113), and TE=−10 to 20 degrees (1114). The corresponding solid lines 1111-1114 indicate corresponding lift coefficient histories in FIG. 11A and the corresponding drag coefficient histories in FIG. 11B for the flap incidence histories. The aerodynamic response shows an instantaneous lift-response P4 proportional to the flap deflection angle magnitude.

Figure 12A:
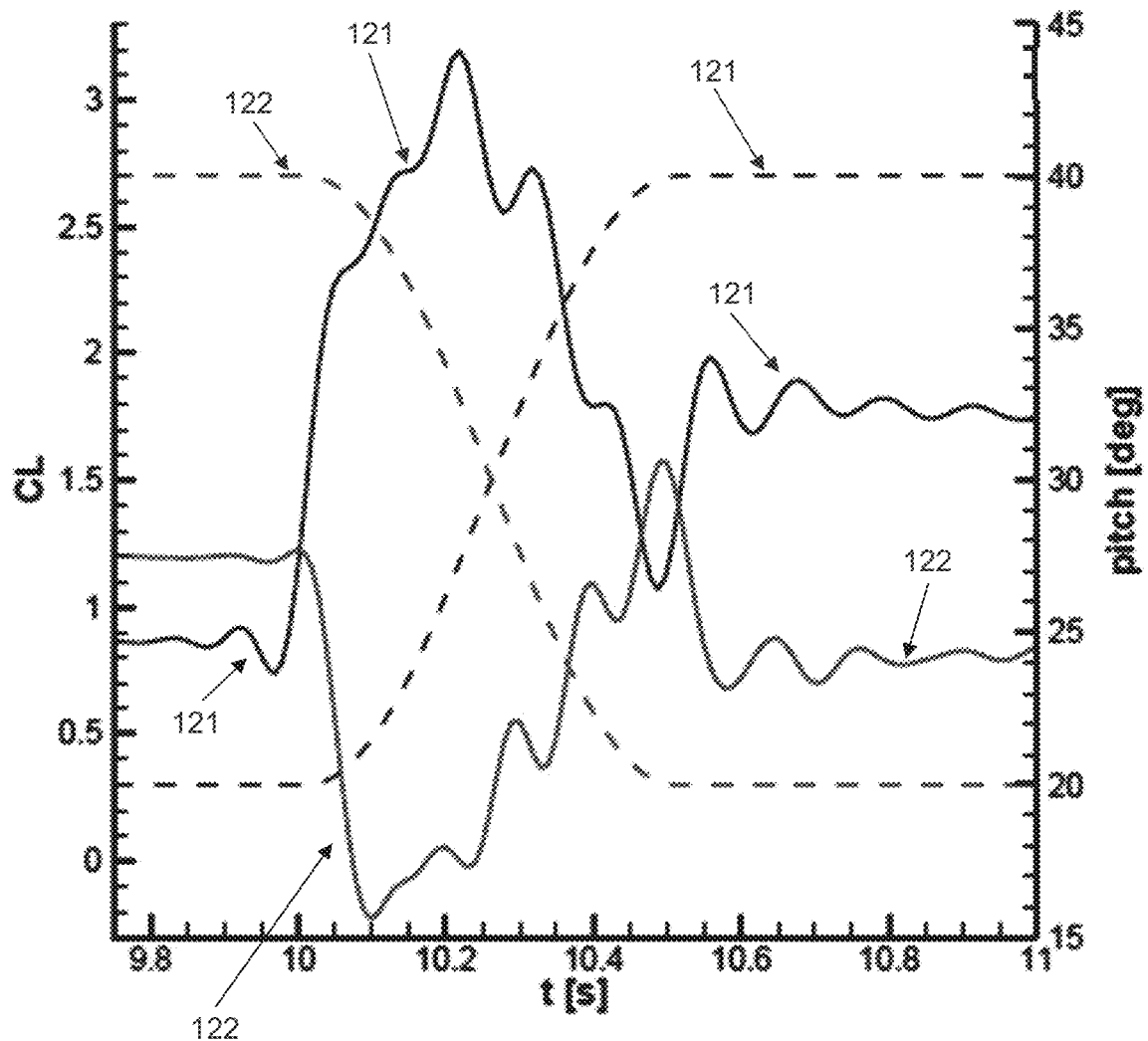
FIGS. 12A, 12B, 12C, and 12D are graphical data plots of 1 Hz cases showing the symmetry between starting at $\delta_0$ and concluding at $\delta_0+A$ versus starting at $\delta_0+A$ and concluding at $\delta_0$ according to embodiments herein.

FIGS. 12A, 12B, 12C, and 12D are graphical data plots of 1 Hz cases showing the symmetry between starting at $\delta_0$ and concluding at $\delta_0+A$ versus starting at $\delta_0+A$ and concluding at $\delta_0$. FIG. 12A shows flap deflection starting at 20° incidence, concluding at 40°, and vice versa. The dashed lines indicate flap deflection (pitch in degrees versus time) at 1 Hz as indicated in the legend by LE=0 degrees and TE=20 to 40 degrees (121), and TE=40 to 20 degrees (122). The corresponding solid lines 121, 122 indicate corresponding lift coefficient histories for the flap incidence histories.

Figure 12B:
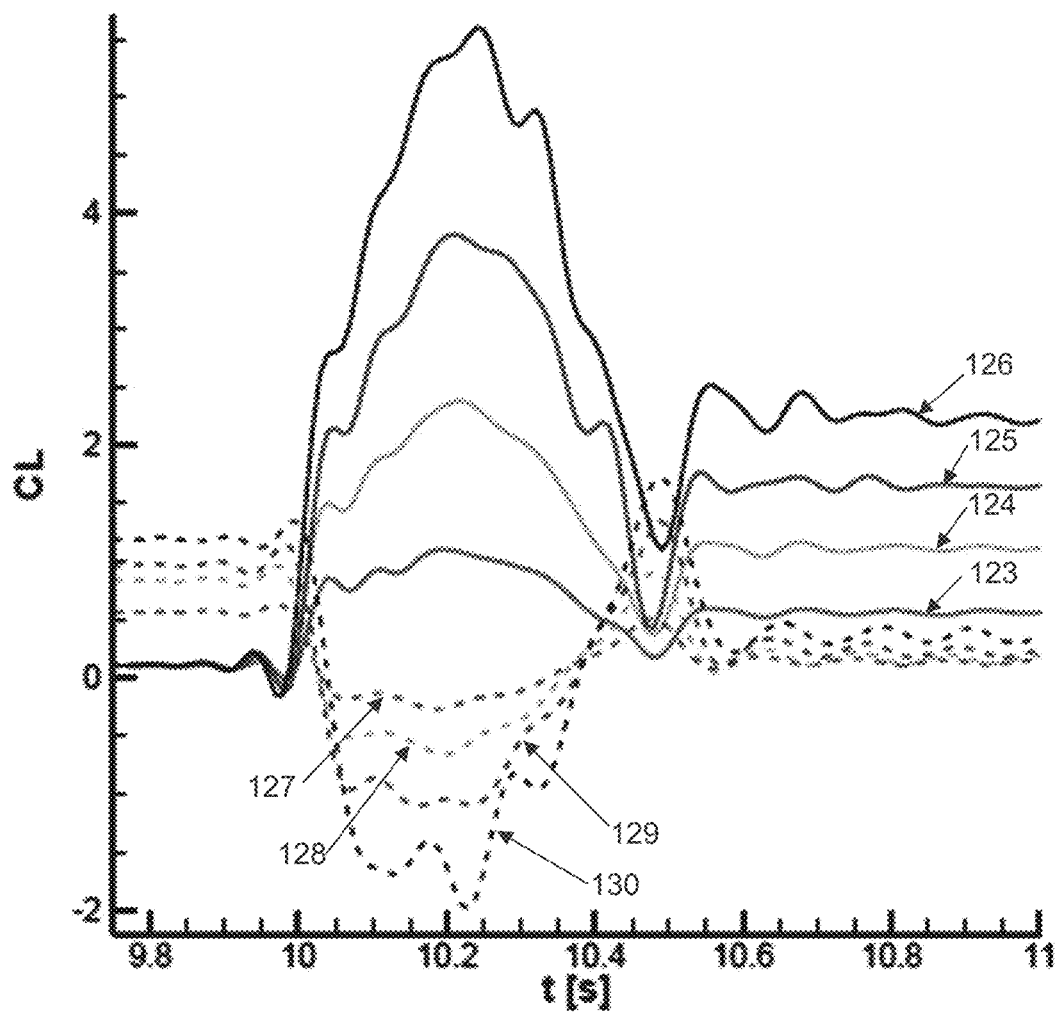
Figure 12C:
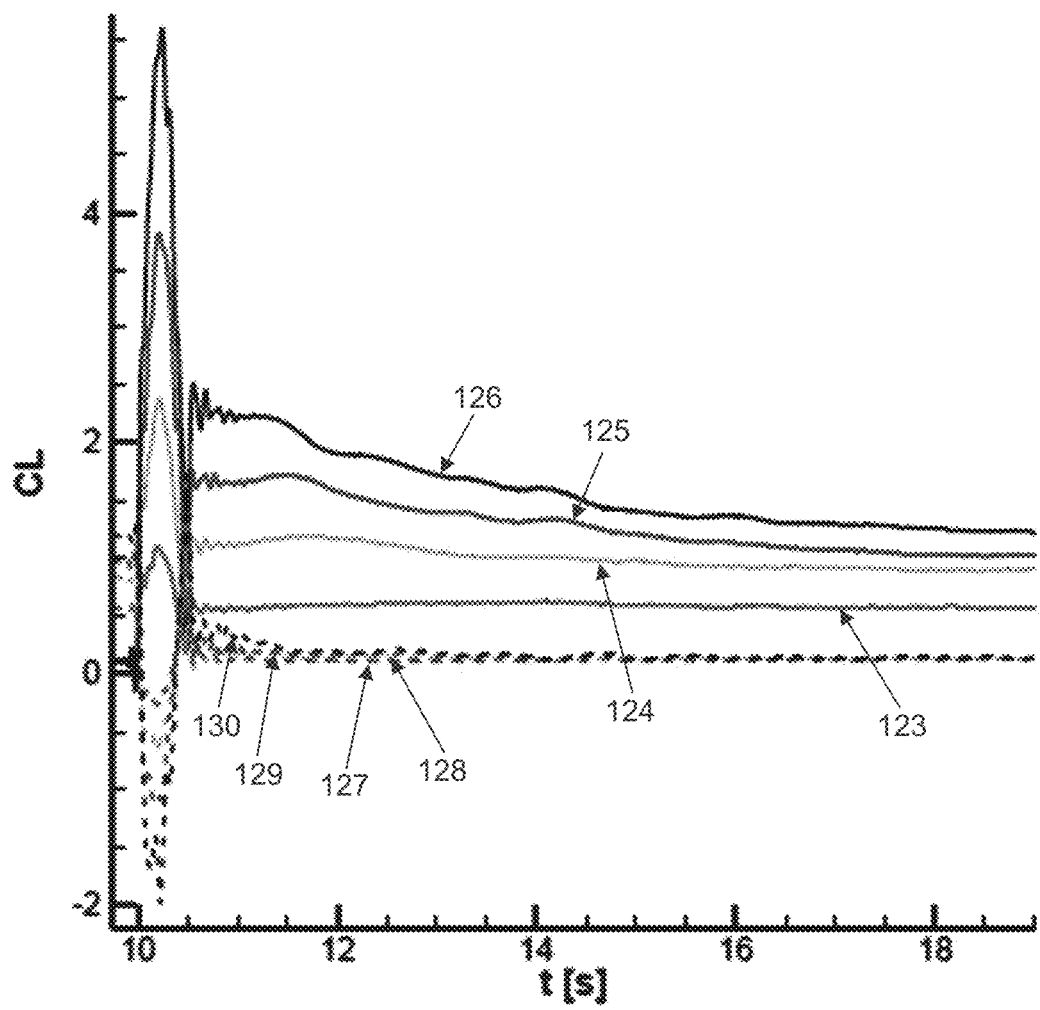
Figure 12D:
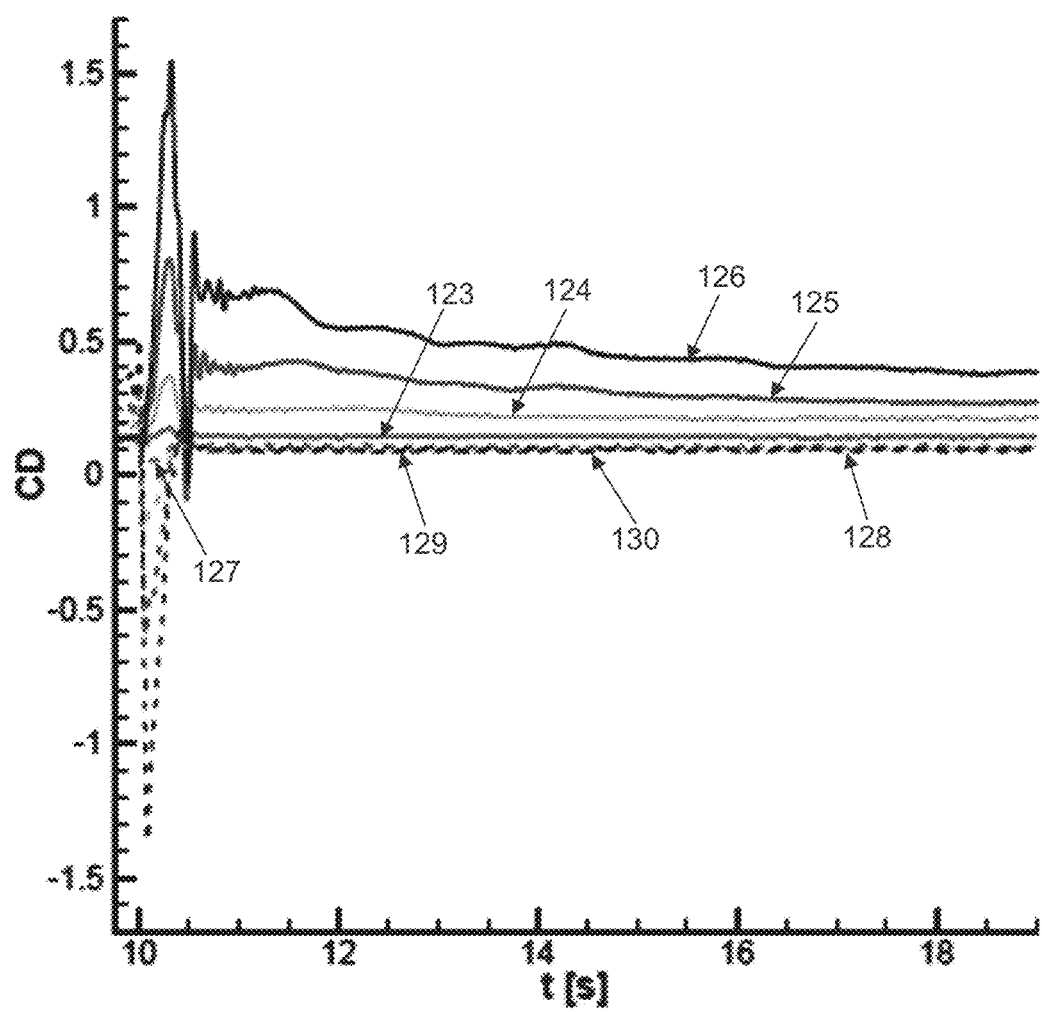

FIGS. 12B, 12C, and 12D show flap deflections from 0 to 10, 20, 30 and 40 degrees, and vice versa at 1 Hz. Drag coefficient (CD) is shown in FIG. 12D, and lift coefficient (CL) is shown in FIGS. 12A, 12B, and 12C. FIG. 12B shows a short time basis, as compared to the long time bases shown in FIGS. 12C and 12D for the same cases. The solid lines as indicated in the legend are LE=0 degrees and TE=0 to 10 degrees (123), TE=0 to 20 degrees (124), TE=0 to 30 degrees (125), TE=0 to 40 degrees (126). The dashed lines as indicated in the legend are LE=0 degrees and TE=10 to 0 degrees (127), TE=20 to 0 degrees (128), TE=30 to 0 degrees (129), and TE=40 to 0 degrees (130).

The results shown in FIGS. 7A through 12D demonstrate that the lift response upon rapid flap actuation was immediate, and the post-motion transient was extensive, for example, on the order of 10 convective times.

Separated Flow with Fore-Element at 20 Degrees Incidence

A case where the fore-element (LE) was fixed at 20° incidence, representative of fully separated flow, was examined. Regardless of whether the flap moves across a high amplitude of its own incidence, the overall flow was separated (FIGS. 3A and 3B illustrate the fore-element at 20° incidence). As with the attached flow with fore-element at 0 degrees incidence cases discussed above, the static data for the separated flow with fore-element at 20 degrees incidence case is presented where the flap was stepped slowly through a sequence of incidence angles. FIGS. 13A, 13B, 13C, and 13D consider three Reynolds numbers (Re) of 40K, 80K, and 160K and two directions of flap traversal, both starting and ending at zero, including trailing-edge of aft-element moving up first and trailing-edge of aft-element moving down first. The experiments explored the hysteresis and its variation with Re. The flap incidence range was ±20°.

Figure 13A:
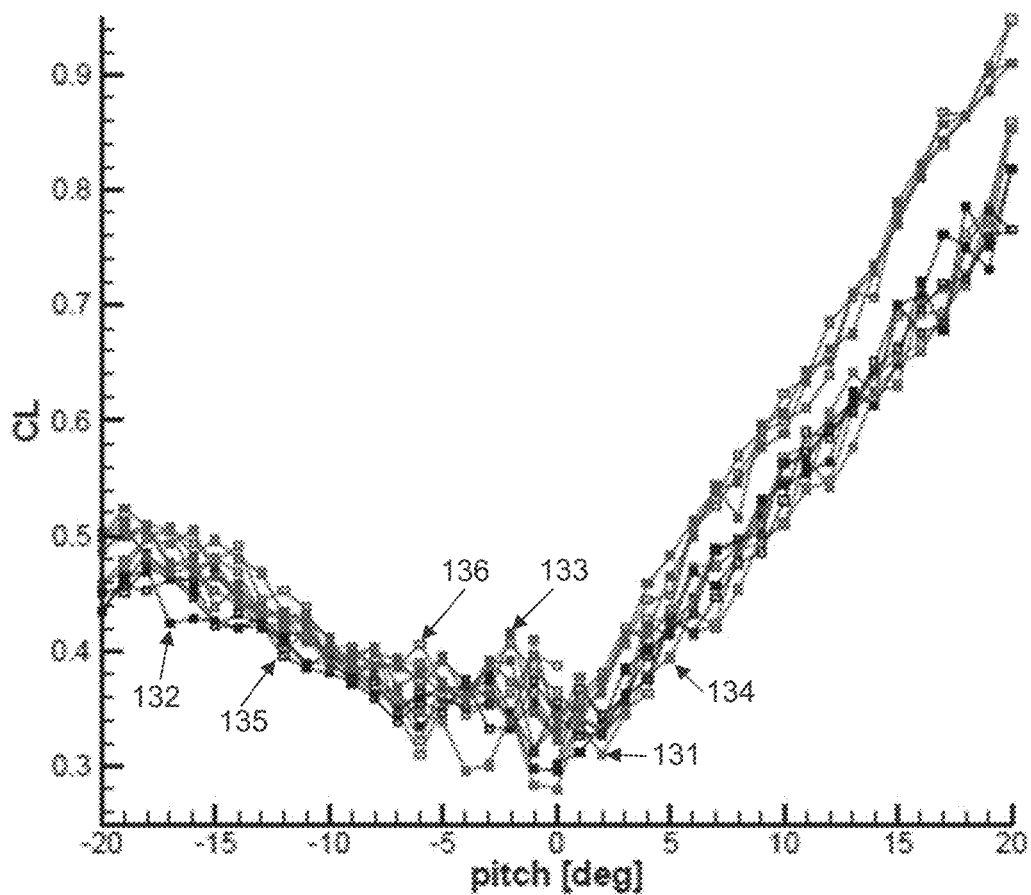
FIGS. 13A, 13B, 13C, and 13D present three Reynolds numbers (Re) of 40K, 80K, and 160K and two directions of flap traversal, both starting and ending at zero, including trailing-edge of aft-element moving up first and trailing-edge of aft-element moving down first according to embodiments herein.
Figure 13B:
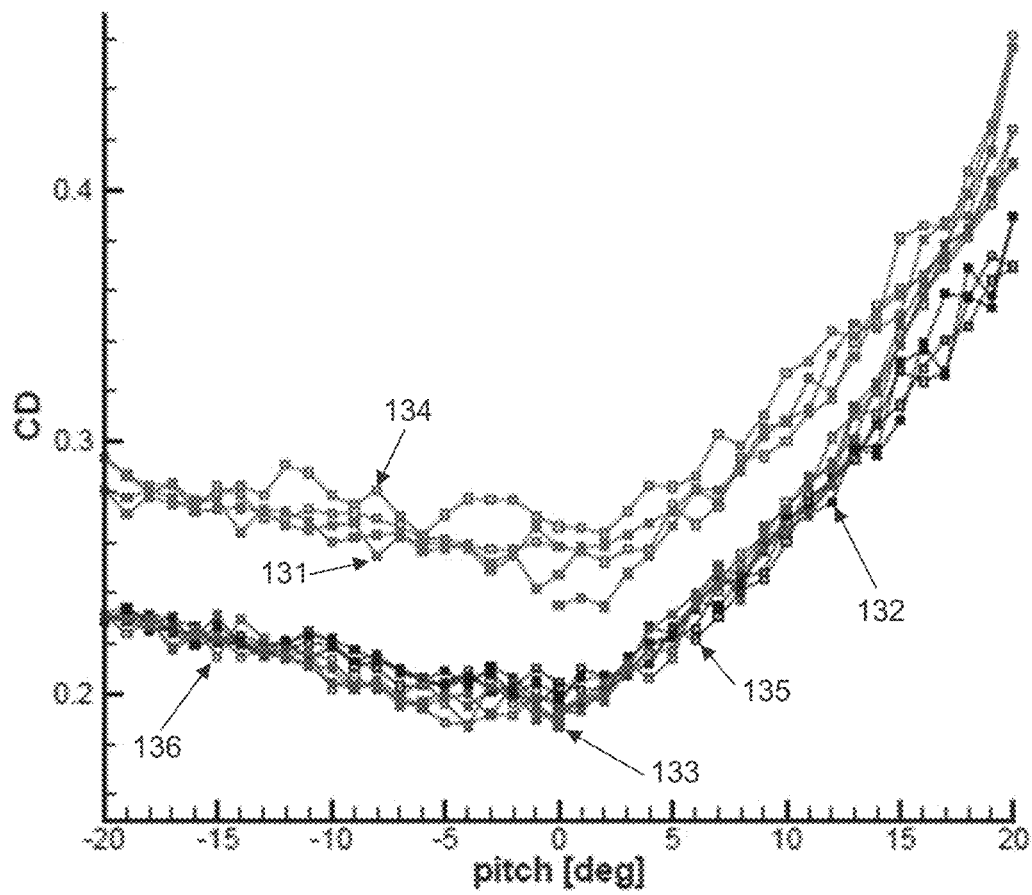
Figure 13C:
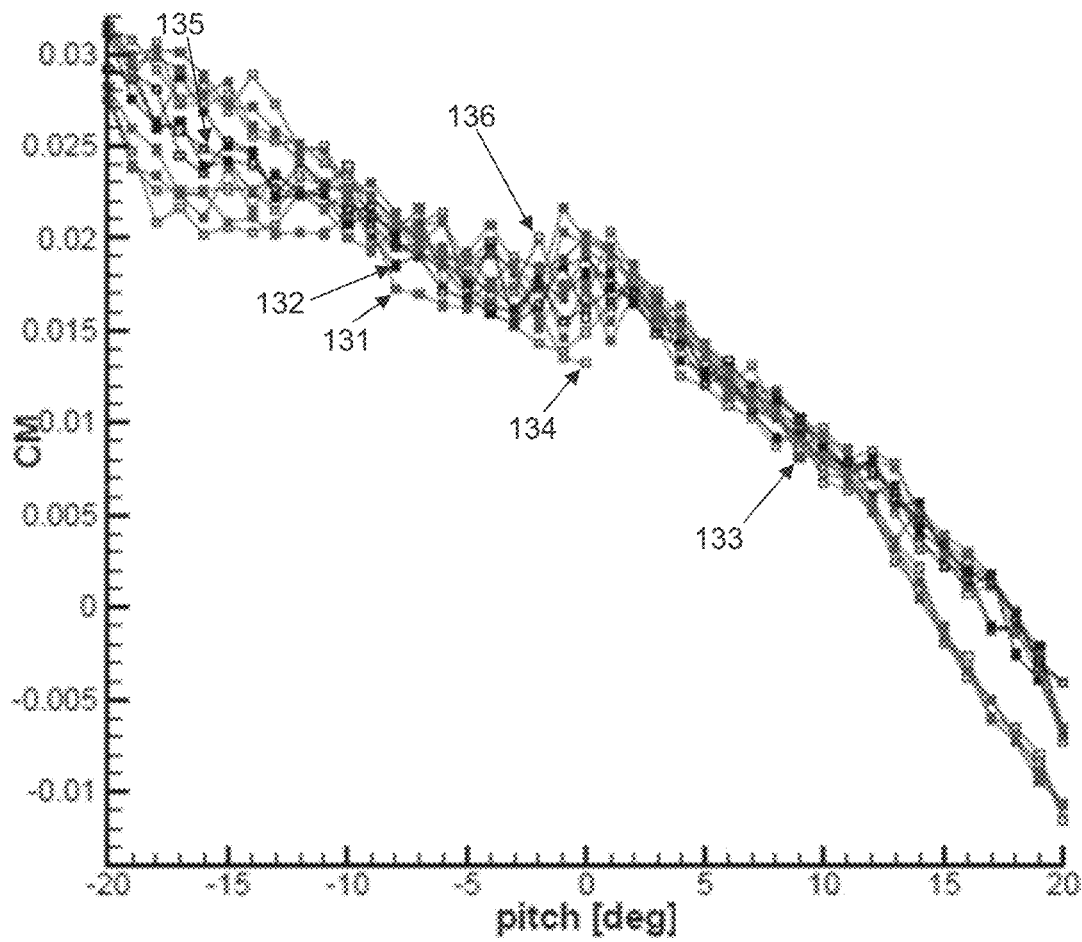
Figure 13D:
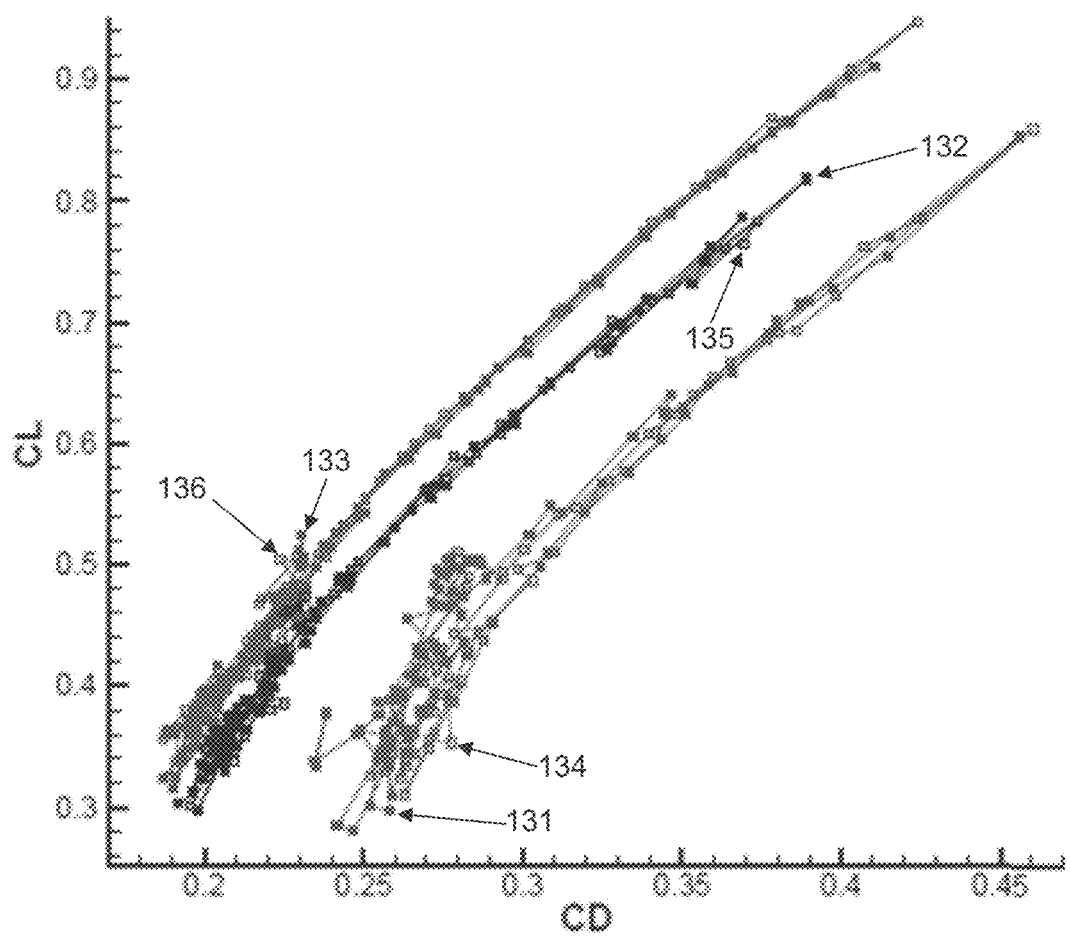

FIGS. 13A, 13B, 13C, and 13D show graphical data plots for static sweep of flap deflection in two directions: (1) begins at 0°, moves to +20°, then down to −20°, and back up to 0° (solid symbols); and (2) begins at 0°, moves to −20°, then up to +20°, and back down to 0° (open symbols). The Re survey is shown for Re=40,000 (131), (134), Re=80,000 (132), (135) and Re=160,000 (133), (136). FIG. 13A shows the lift versus flap angle, FIG. 13B shows the drag versus flap angle, FIG. 13C shows the pitching moment versus flap incidence angle, and FIG. 13D shows the drag polars.

Moderate hysteresis was found in drag for Re=40,000, but not for other Re=80,000 or 160,000. Because the fore-element was itself at 20° (LE), +20° and −20° flap-deflection (TE) was not symmetric in aerodynamic response. Indeed, there was a saturation in lift and drag for negative flap deflection angles (as shown to the left of 0 degrees pitch in FIGS. 13A and 13B). On the other hand, for positive flap deflections, the lift response was linear from 0° all the way to 20°. Lift coefficient at 20° flap deflection was close to its value (~0.7) at the slope-change-point when the fore-element was at zero incidence (FIGS. 7A and 7B).

Figure 14A:
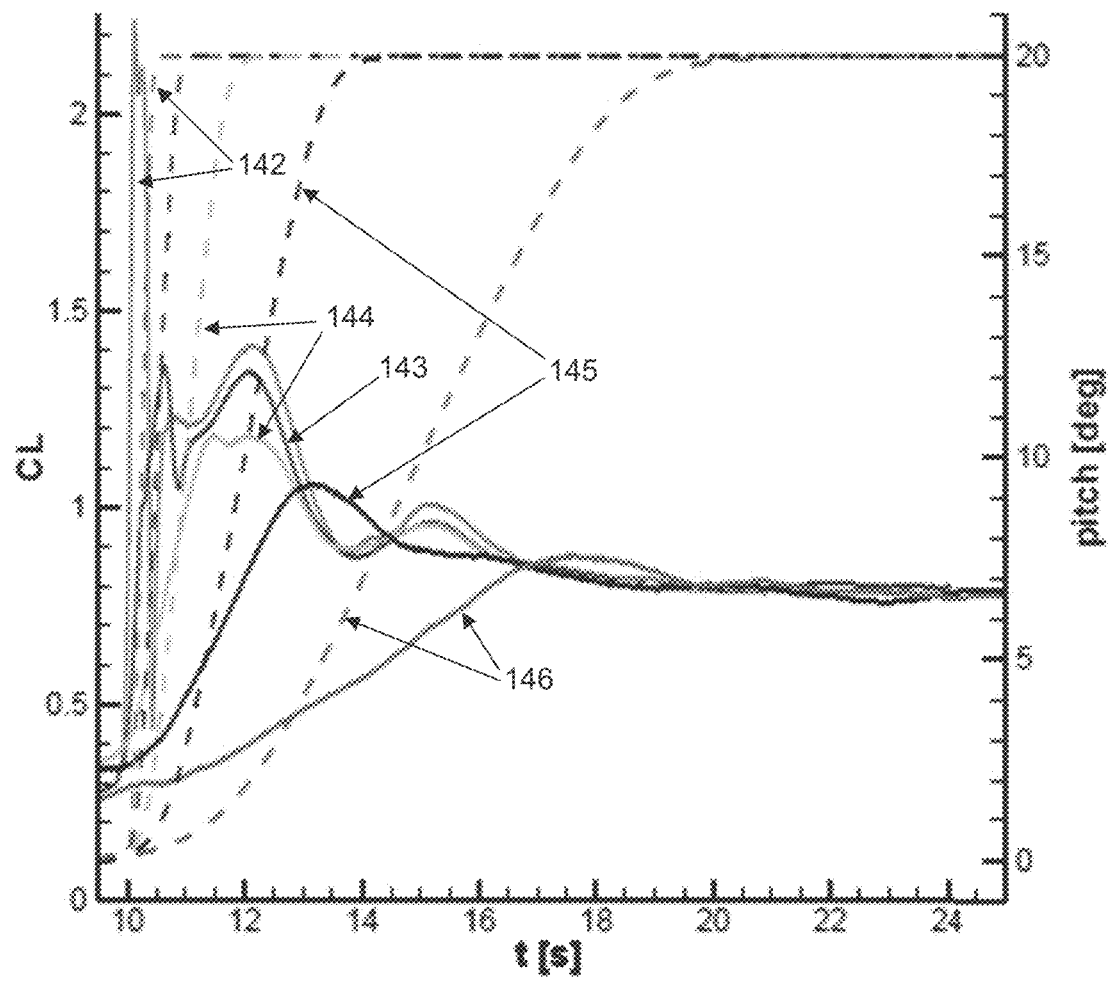
FIGS. 14A, 14B, and 14C present flap frequencies where the flap began at 0° and ended at 20° according to embodiments herein.
Figure 14B:
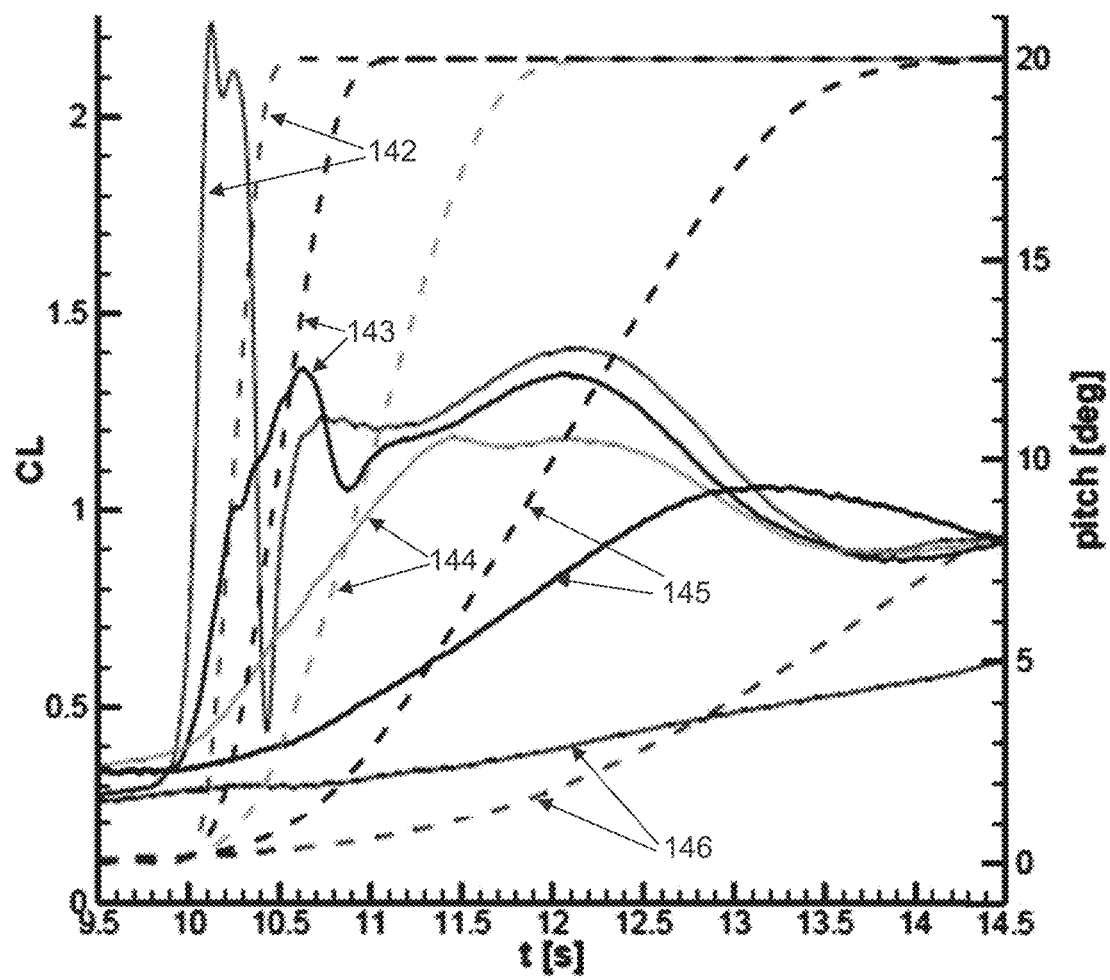
Figure 14C:
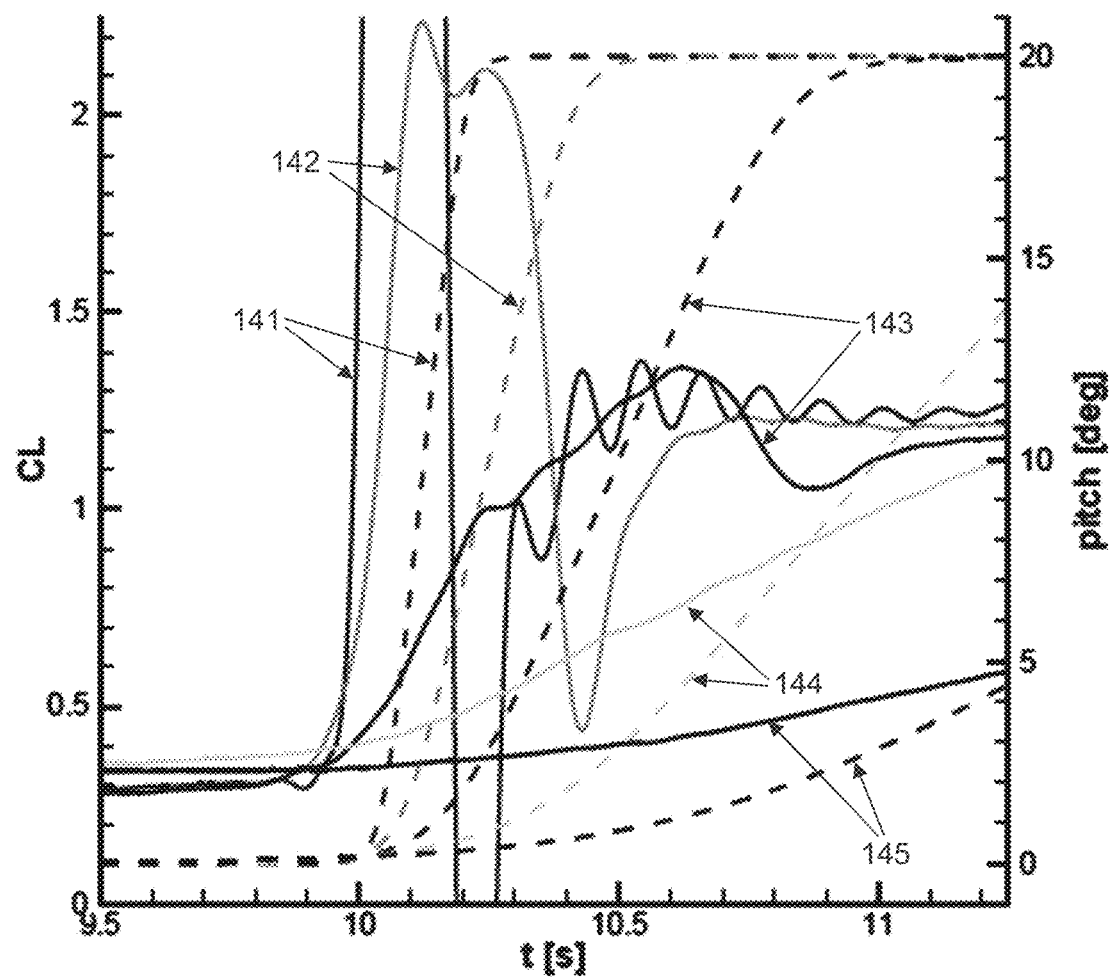

Next, the effect of frequency for dynamic flap deflection was considered for the leading edge of the fore-element at 20° (LE=20°). As with the survey for the fore-element at zero incidence angle (LE=0), the principal parameter-study of flap frequency consisted of cases where the flap trailing edge (TE) began at 0° and ended at 20° as shown in FIGS. 14A, 14B, and 14C as LE=20° TE=0° to 20° for the frequencies from 2 Hz to 0.05 Hz, and vice versa in FIGS. 15A, 15B, 15C, and 15D where the flap trailing edge (TE) began at 20° and ended at 0° (TE=20° to 0°) for the frequencies from 2 Hz to 0.05 Hz. As with the fore-element at zero incidence, response to flap deflection was immediate, and the sign of flap-motion produced a respectively-signed lift peak.

FIGS. 14A, 14B, and 14C show graphical data plots of seven different values of motion-rate for deflecting the flap from 0° to 20°, line (141) corresponds to 2 Hz, line (142) corresponds to 1 Hz, line (143) corresponds to 0.5 Hz, line (144) corresponds to 0.25 Hz, line (145) corresponds to 0.125 Hz, and line (146) corresponds to 0.05 Hz. The solid lines (141), (142), (143), (144), (145), (146) are the lift coefficient history read on the left-hand ordinate and the corresponding dashed lines (141), (142), (143), (144), (145), (146) are the flap incidence history read on the right-hand ordinate. FIGS. 14A, 14B, and 14C show different selections of time-base for the same data-set, from long (FIG. 14A) to medium (FIG. 14B) to short (FIG. 14C), with the short case (FIG. 14C) showing the 2 Hz motion (141), but not the 0.05 Hz motion (146). Lift amplitude of the 2 Hz (141) case exceeded the displayed ordinate-range in the short plot.

Figure 15A:
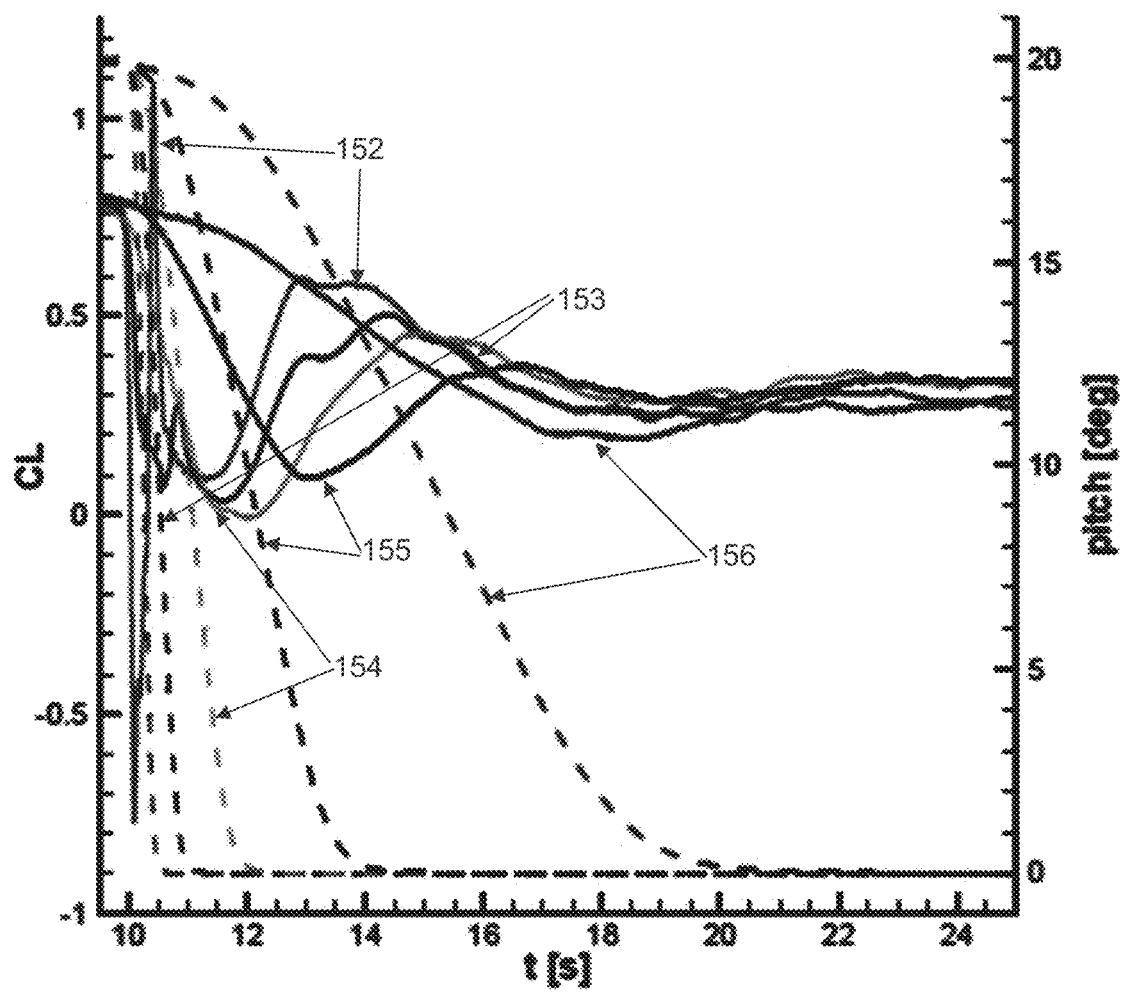
FIGS. 15A, 15B, 15C, and 15D present flap frequencies where the flap began at 20° and ended at 0° according to embodiments herein.
Figure 15B:
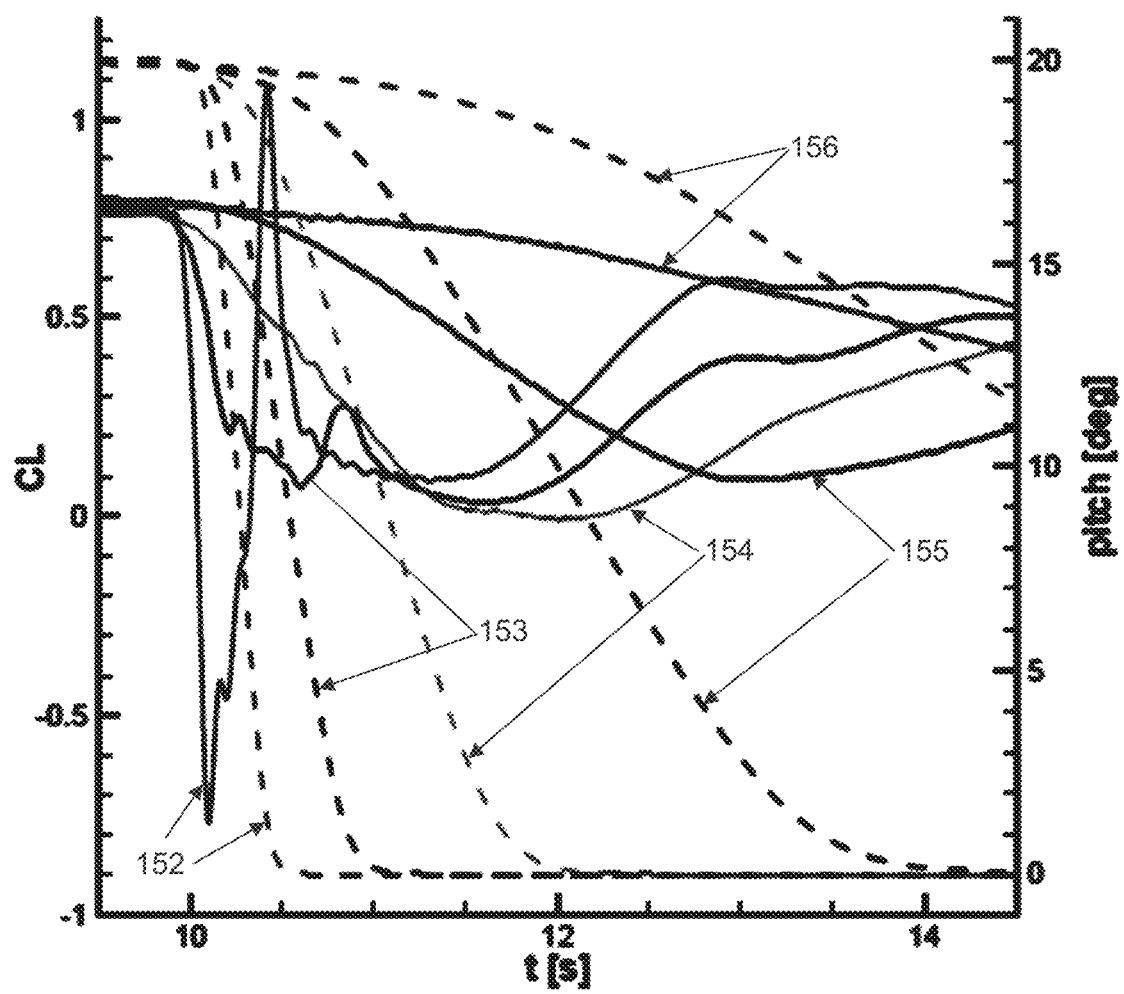
Figure 15C:
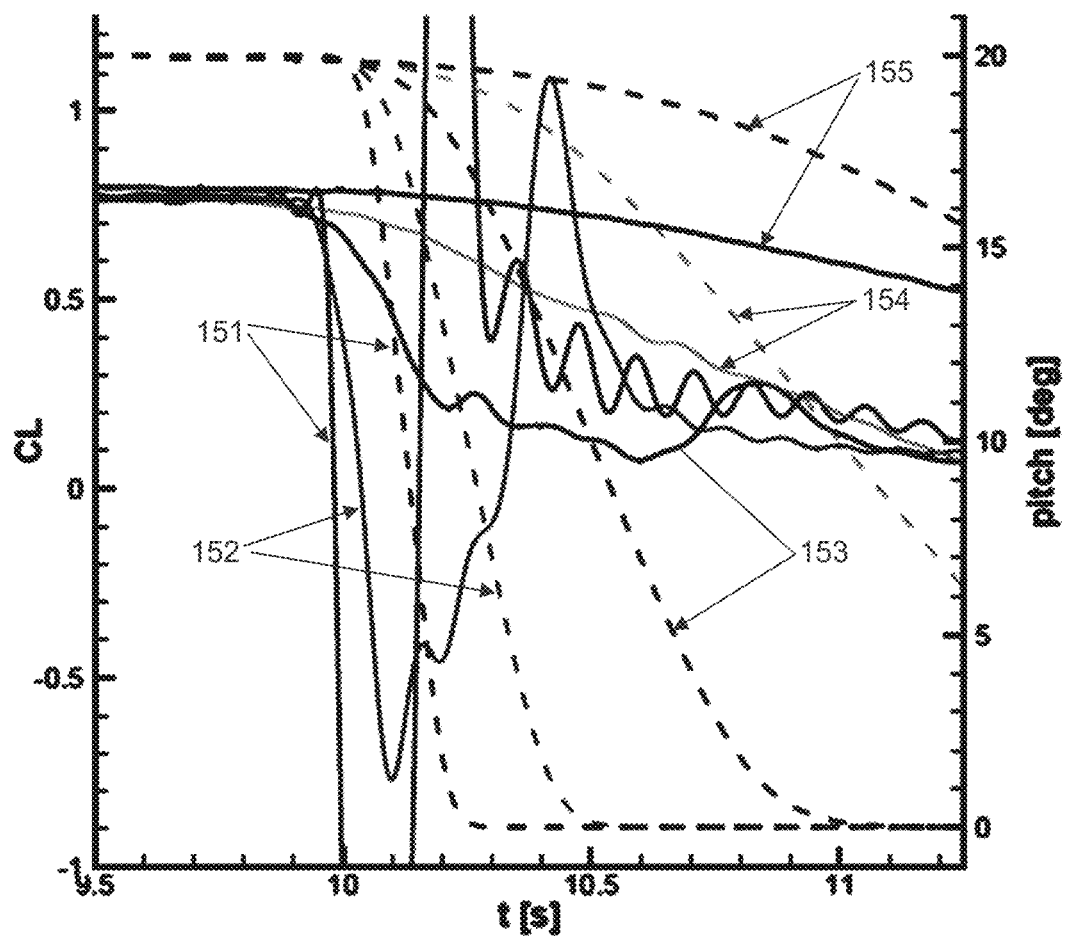
Figure 15D:
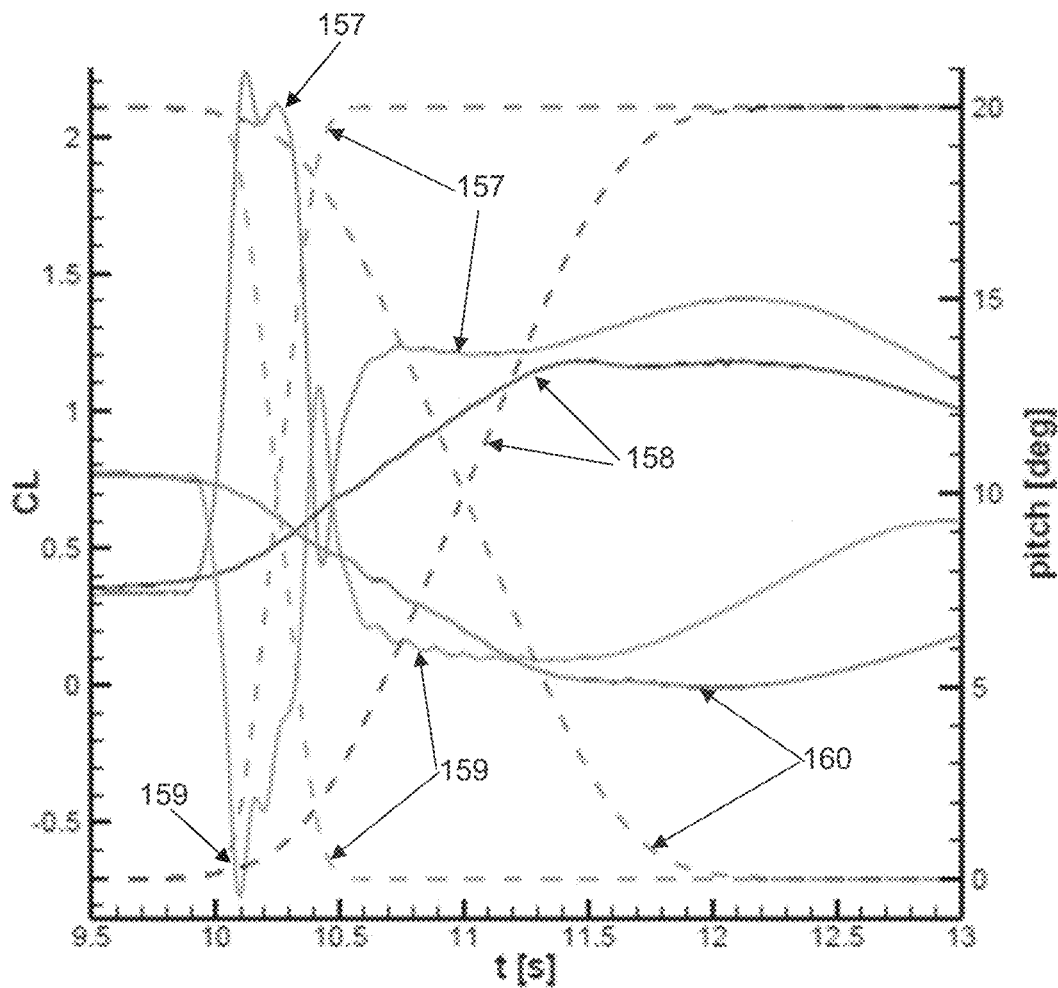

FIGS. 15A, 15B, 15C, and 15D show graphical data plots of seven different values of motion-rate for deflecting the flap from 20° to 0°, line (151) corresponds to 2 Hz, line (152) corresponds to 1 Hz, line (153) corresponds to 0.5 Hz, line (154) corresponds to 0.25 Hz, line (155) corresponds to 0.125 Hz, and line (156) corresponds to 0.05 Hz. The solid lines (151), (152), (153), (154), (155), (156) are the lift coefficient history read on the left-hand ordinate and the corresponding dashed lines (151), (152), (153), (154), (155), (156) are the flap incidence history read on the right-hand ordinate. FIGS. 15A, 15B, 15C, and 15D show different selections of time-base for the same data-set, from long (FIG. 15A) to medium (FIG. 15B) to short (FIG. 15C), with the short case (FIG. 15C) showing the 2 Hz motion (151), but not the 0.05 Hz motion (156), and long (FIG. 15A) and medium (FIG. 15B) omitting the 2 Hz motion (151). The 2 Hz data (151) exceeded the displayed ordinate-range in the short plot, (FIG. 15C). FIG. 15D shows a comparison of 0°-20° and 20°-0° flap deflections for f=1 Hz and 0.25 Hz, to demonstrate symmetry. Line (157) indicates LE=20°, and TE=0° to 20° motion at 1 Hz, line (158) indicates LE=20°, and TE=0° to 20° motion at 0.25 Hz, line (159) indicates LE=20°, and TE=20° to 0° motion at 1 Hz, and line (160) indicates LE=20°, and TE=20° to 0° motion at 0.25 Hz. The solid lines (157), (158), (159), (160) indicate lift coefficient history read on the left-hand ordinate and the corresponding dashed lines (157), (158), (159), (160) indicate corresponding flap incidence history read on the right-hand ordinate.

Figure 16A:
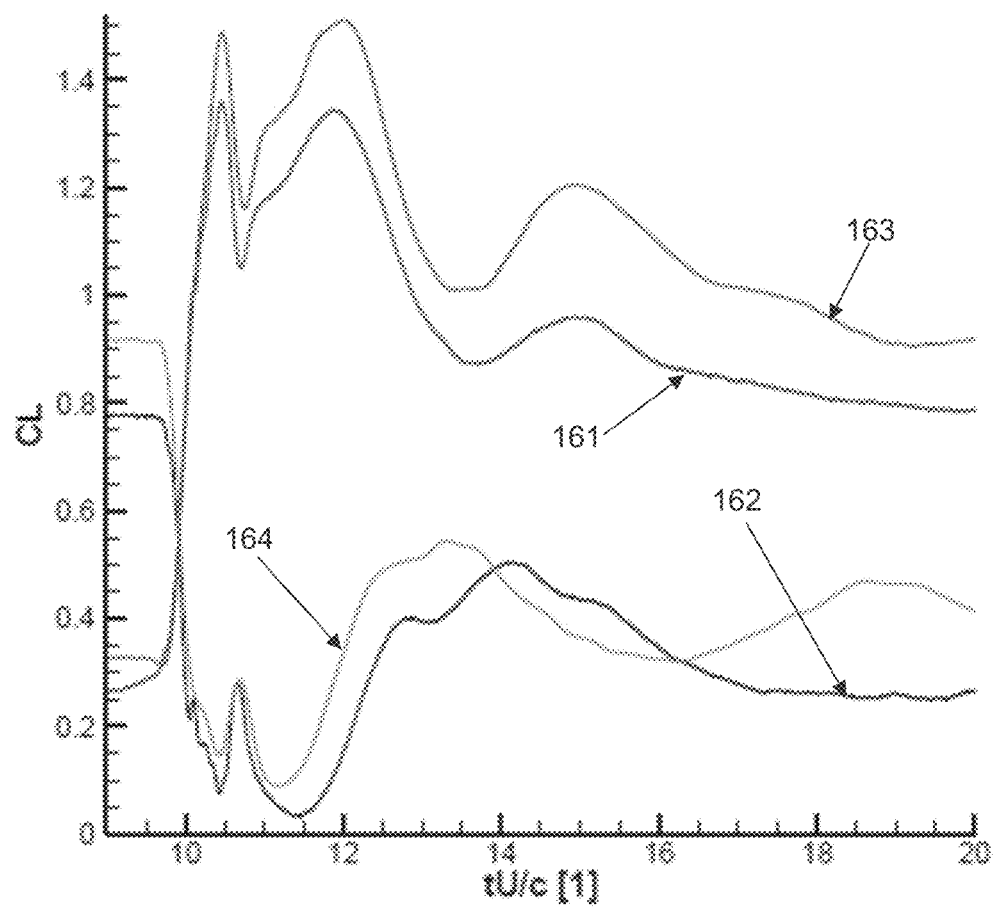
FIGS. 16A and 16B are graphical plots of Reynolds number (Re) survey of 0°-20° and 20°-0° flap deflection cases, plotted against convective time according to embodiments herein.
Figure 16B:
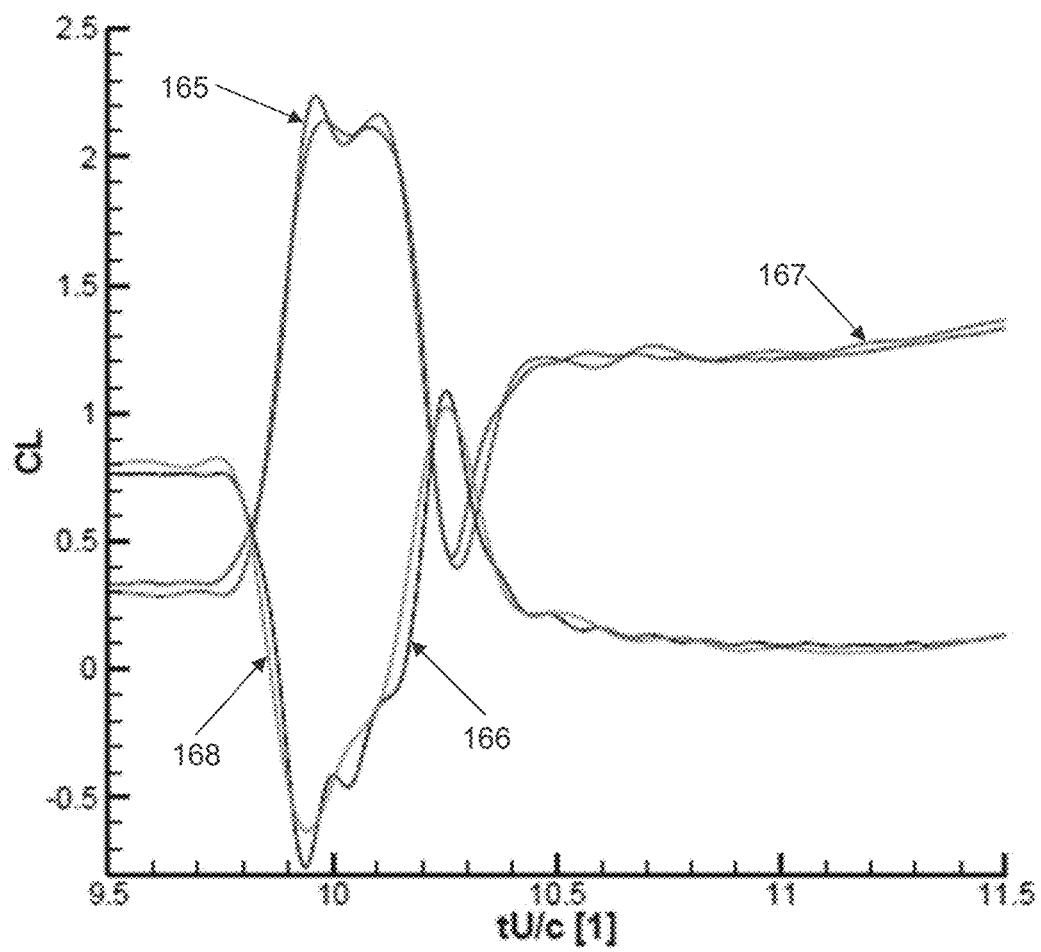

In the foregoing dynamic force-plots, wall-clock-time, in seconds, was the same as convective time, in chords, because the wing total chord was 20 cm, and the flow speed was 20 cm/s. In FIGS. 16A and 16B (and FIGS. 13A, 13B, 13C, and 13D, which are for the static case), the flow speed was not 20 cm/s, hence convective time and wall-clock-time differed. There was no discernible Reynolds number effect in lift response when the flap begins deflection, but after cessation of motion there were differences in the ensuing transients. This is consistent with the slight Re-variations in static response shown in FIGS. 13A, 13B, 13C, and 13D.

FIGS. 16A and 16B are graphical plots of Reynolds number (Re) surveys of the flap trailing edge (TE) deflection from 0° to 20° and from 20° to 0°, plotted against convective time, which was not the same as wall-clock time for Re=160K and 80K. FIG. 16A shows flap deflection over 1 tU/c and FIG. 16B shows flap deflection over 0.5 tU/c. In FIG. 16A, the lift coefficient histories are shown by solid line (161) for Re=40,000, LE=20° and TE deflection from 0° to 20° at a frequency of 0.5 Hz, solid line (162) for Re=40,000, LE=20° and TE deflection from 20° to 0° at a frequency of 0.5 Hz, solid line (163) for Re=160,000, LE=20° and TE deflection from 0° to 20° at a frequency of 2 Hz, solid line (164) for Re=160,000, LE=20° and TE deflection from 20° to 0° at a frequency of 2 Hz. In FIG. 16B, the lift coefficient histories are shown by solid line (165) for Re=40,000, LE=20° and TE deflection from 0° to 20° at a frequency of 1 Hz, solid line (166) for Re=40,000, LE=20° and TE deflection from 20° to 0° at a frequency of 1 Hz, solid line (167) for Re=80,000, LE=20° and TE deflection from 0° to 20° at a frequency of 2 Hz, solid line (168) for Re=80,000, LE=20° and TE deflection from 20° to 0° at a frequency of 2 Hz. Note Re-independence of spikes and transients during the flap motion, but Re-dependency in initial lift (FIG. 16A).

Figure 17A:
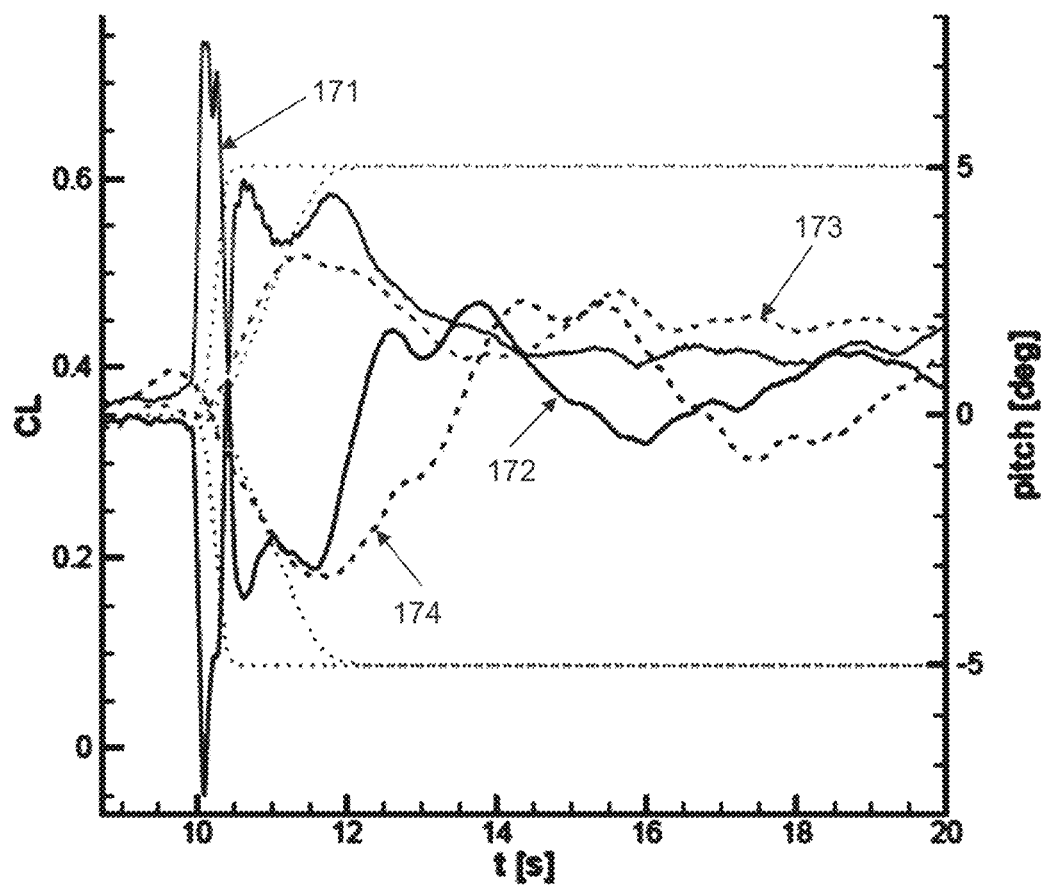
FIGS. 17A and 17B show graphical data plots of the attached flow case, where the flap begins at zero deflection and moves to +5 or −5 degrees incidence according to embodiments herein.
Figure 17B:
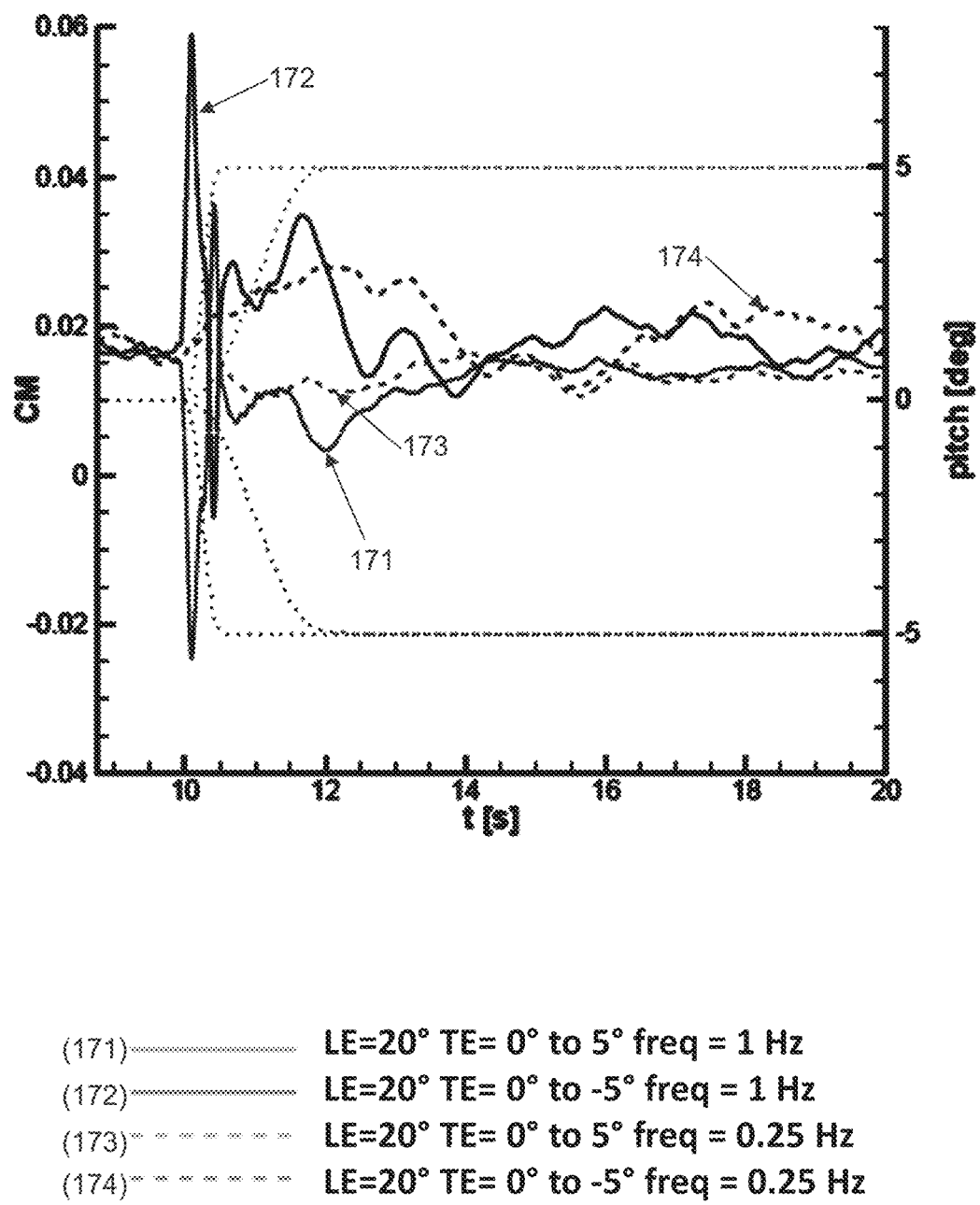

Low frequency (0.25 Hz) and high frequency (1 Hz) flap deflections of various starting and ending values were considered next, as response in lift coefficient and pitching moment coefficient to flap deflection with the for-element (LE) at 20° incidence. FIGS. 17A and 17B show graphical data plots of the attached flow case, where the flap begins at zero deflection and moves to +5° (TE=0° to 5°) or −5° (TE=0° to)−5° incidence over 0.5 tU/c (1 Hz, solid lines (171), (172)) or 2 tU/c (0.25 Hz, dashed lines (173), (174)) for lift coefficient (FIG. 17A) and pitching moment coefficient (FIG. 17B). Dotted lines show the flap deflection angle history. The spikes in lift coefficient and pitching moment coefficient for positive versus negative flap incidence-angle are nearly symmetric, despite the fore-element being at 20 degrees incidence (LE=20°). The final (approaching steady-state) lift and pitching-moment values differ for +5° (171), (173) compared to −5° (172), (174) flap incidence.

Figure 18A:
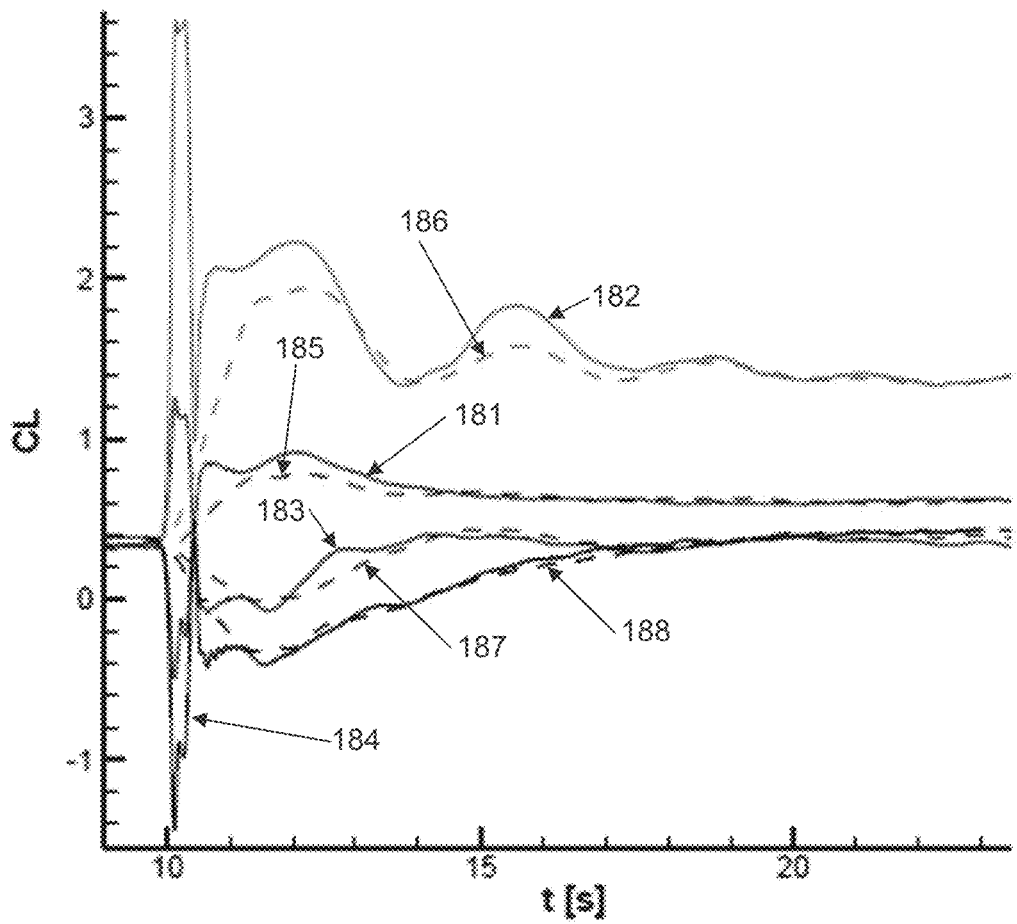
FIGS. 18A and 18B show larger final flap incidence angles than shown in FIGS. 17A and 17B according to embodiments herein.
Figure 18B:
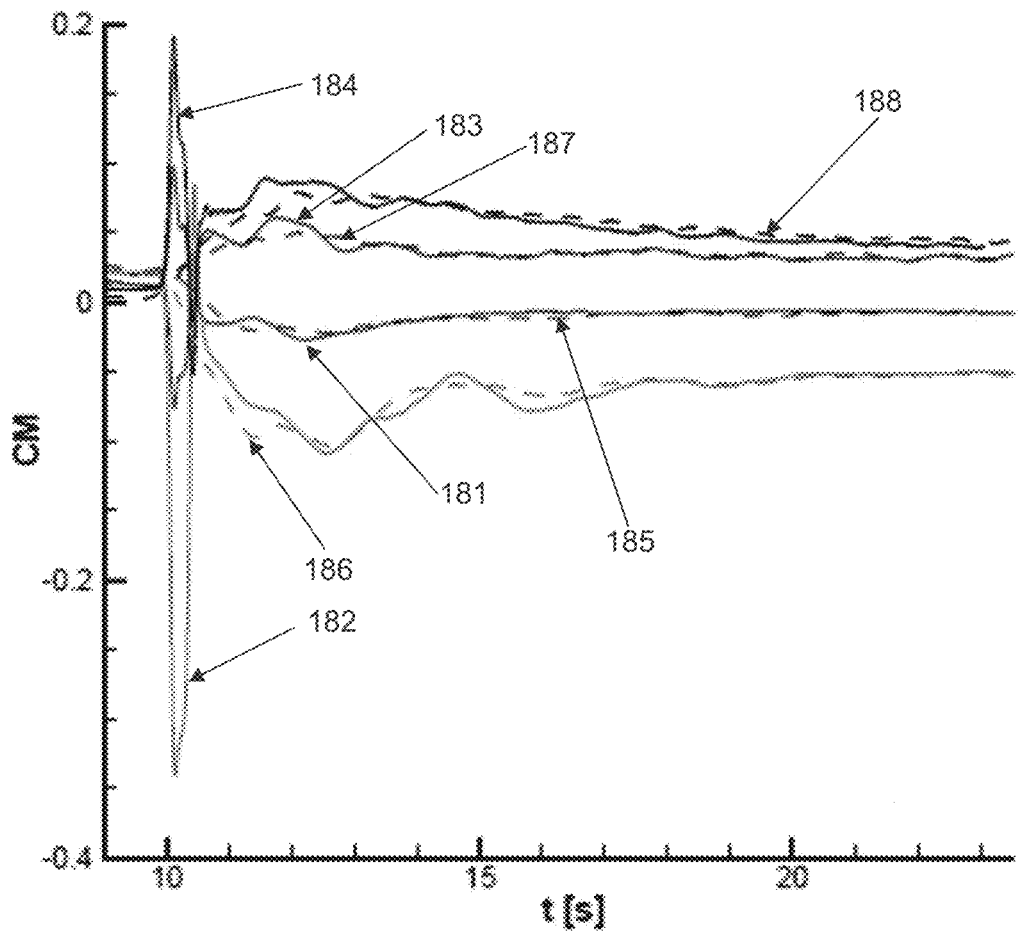

These results are extended in FIGS. 18A and 18B, reported over a longer observation-time and thus show a clearer convergence to steady-state. The sign of the end-state flap angle determines the direction of the lift spike for the 1 Hz cases depicted by solid lines (181), (182), (183), (184). For 0.25 Hz depicted by dashed lines (185), (186), (187), (188), there was insufficient dynamics to generate a lift spike. FIGS. 18A and 18B show larger final flap incidence angles than shown in FIGS. 17A and 17B. The lift coefficient histories for final flap incidence angles are shown for 10° by solid line (181) at 1 Hz and dashed line (185) at 0.25 Hz, for 30° by solid line (182) at 1 Hz and dashed line (186) at 0.25 Hz, for −10° by solid line (183) at 1 Hz and dashed line (187) at 0.25 Hz, and for −20° by solid line (184) at 1 Hz and dashed line (188) at 0.25 Hz.

Figure 19A:
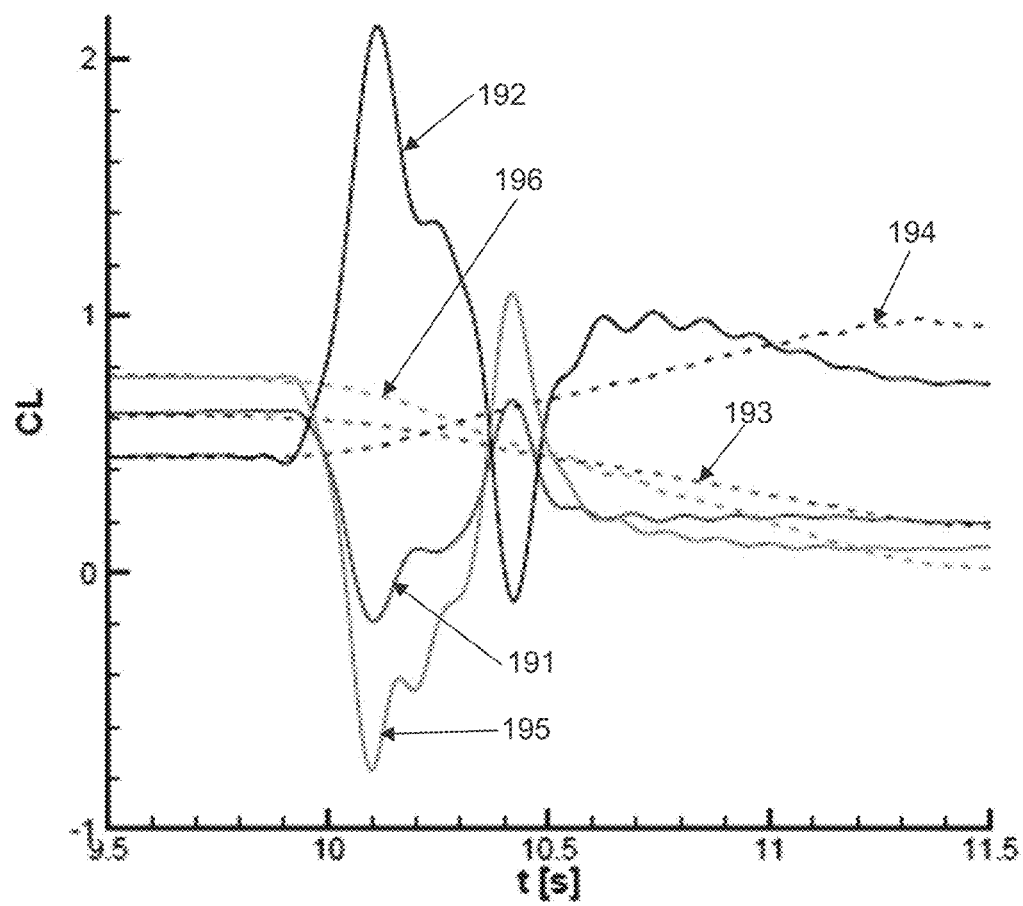
FIGS. 19A, 19B, 19C, and 19D show graphical data plots having flap starting positions at 10°, 20°, and −20°, and at zero flap incidence according to embodiments herein.
Figure 19B:
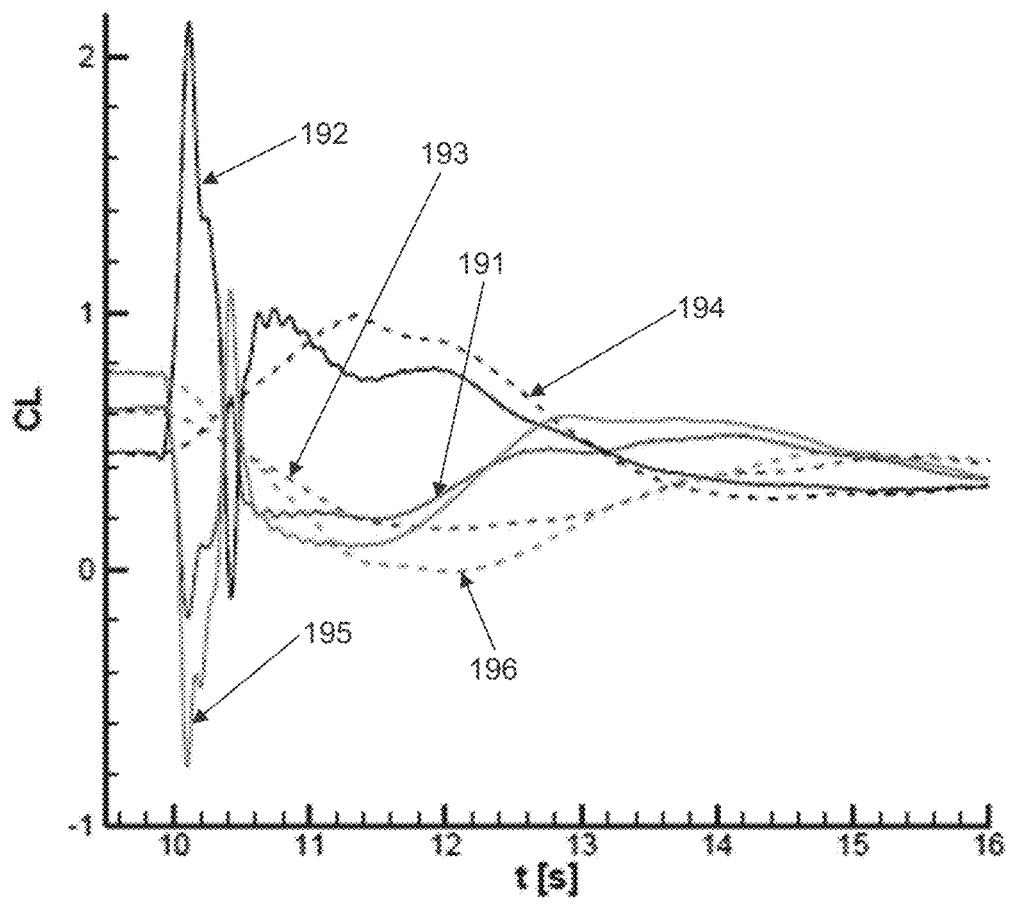

FIGS. 19A, 19B, 19C, and 19D show graphical data plots having the fore-element being at 20 degrees incidence (LE=20°) and having aft-element (flap) starting positions at 10°, 20°, and −20°, and in all cases ending at zero flap incidence. FIG. 19A shows the lift coefficient histories with time-base zoomed into early time and FIG. 19B shows the lift coefficient over a longer range. In FIGS. 19A and 19 B solid line (191) indicates the lift coefficient history for flap deflection from 10° to 0° at 1 Hz, solid line (192) indicates the lift coefficient history for flap deflection from −20° to 0° at 1 Hz, solid line (195) indicates the lift coefficient history for flap deflection from 20° to 0° at 1 Hz, dashed line (193) indicates the lift coefficient history for flap deflection from 10° to 0° at 0.25 Hz, dashed line (194) indicates the lift coefficient history for flap deflection from −20° to 0° at 0.25 Hz, and dashed line (196) indicates the lift coefficient history for flap deflection from 20° to 0° at 0.25 Hz.

Figure 19C:
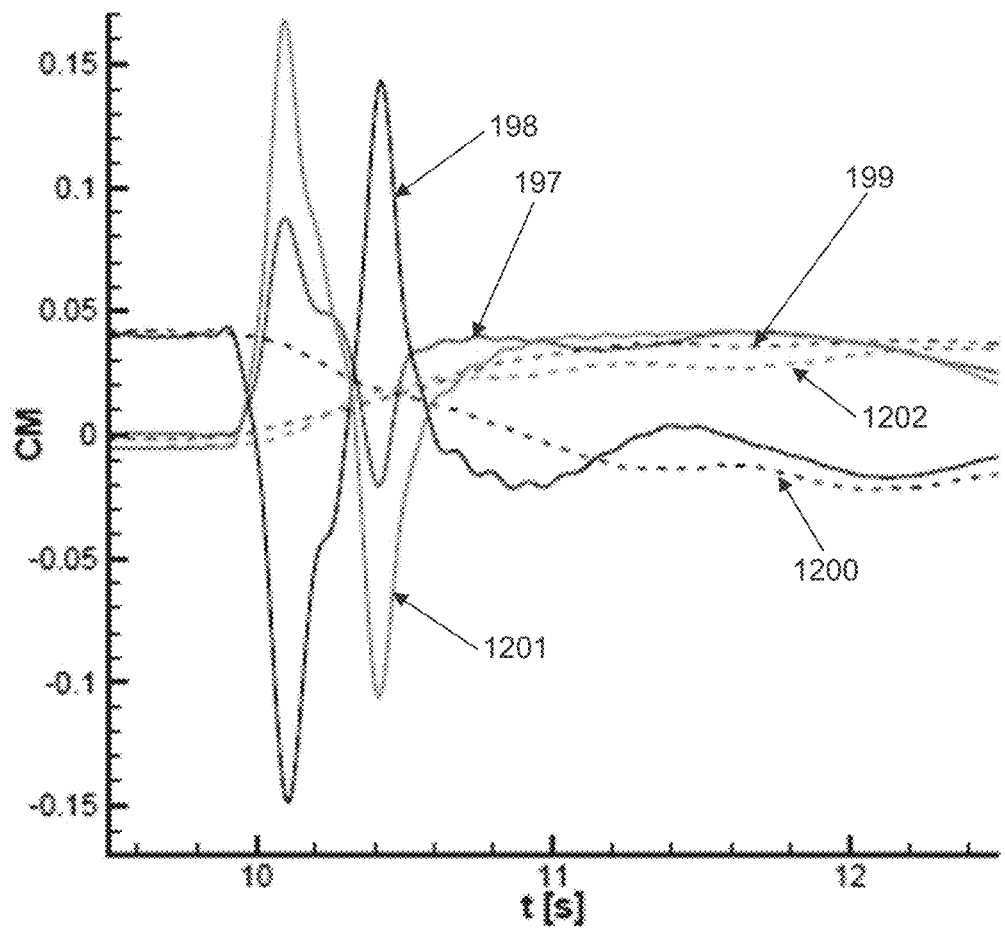
Figure 19D:
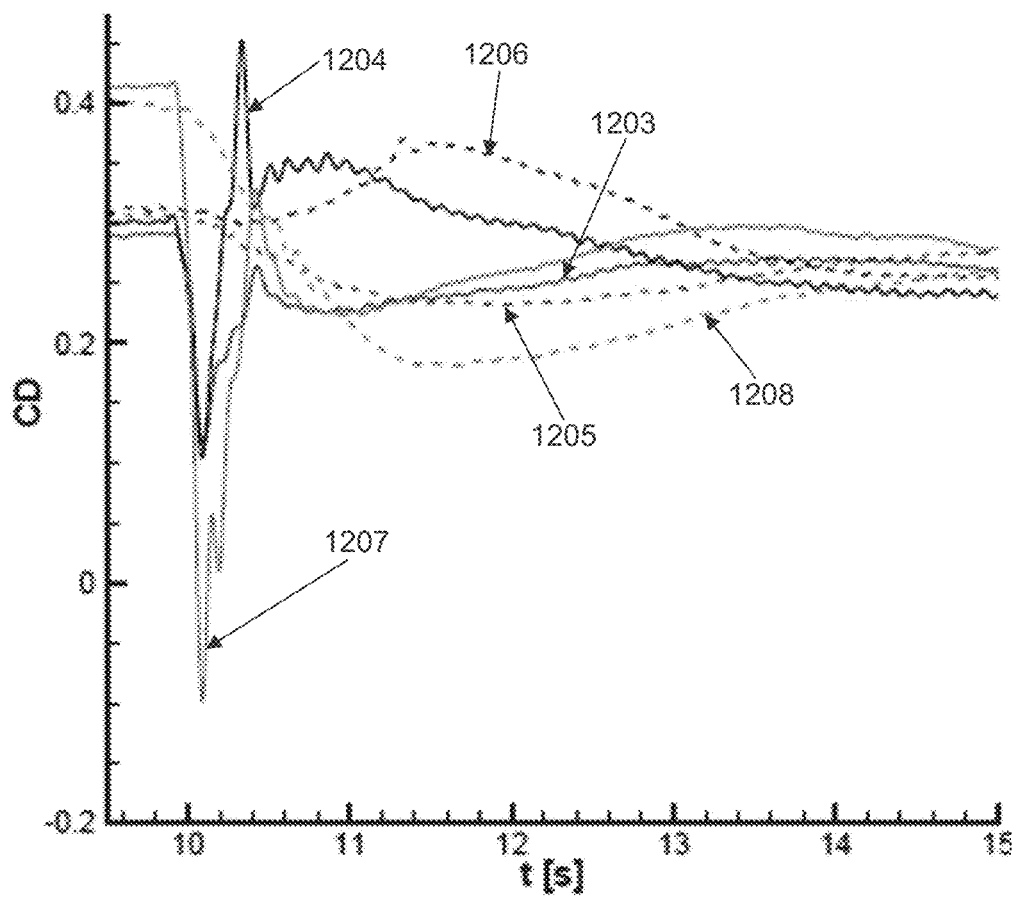

FIG. 19C shows the pitching moment coefficient, and FIG. 19D shows the drag coefficient. In FIG. 19C, solid line (197) indicates the pitching moment (CM) for flap deflection from 10° to 0° at 1 Hz, solid line (198) indicates the pitching moment for flap deflection from −20° to 0° at 1 Hz, solid line (1201) indicates the pitching moment for flap deflection from 20° to 0° at 1 Hz, dashed line (199) indicates the pitching moment for flap deflection from 10° to 0° at 0.25 Hz, dashed line (1200) indicates the pitching moment for flap deflection from −20° to 0° at 0.25 Hz, and dashed line (1202) indicates the pitching moment for flap deflection from 20° to 0° at 0.25 Hz. In FIG. 19D, solid line (1203) indicates the drag coefficient (CD) for flap deflection from 10° to 0° at 1 Hz, solid line (1204) indicates the drag coefficient for flap deflection from −20° to 0° at 1 Hz, solid line (1207) indicates the drag coefficient for flap deflection from 20° to 0° at 1 Hz, dashed line (1205) indicates the drag coefficient for flap deflection from 10° to 0° at 0.25 Hz, dashed line (1206) indicates the drag coefficient for flap deflection from −20° to 0° at 0.25 Hz, and dashed line (1208) indicates the drag coefficient for flap deflection from 20° to 0° at 0.25 Hz.

The aforementioned lift-spikes P, P1, P2, P3, P4 ubiquitous for 1 Hz (or faster) motions, are seen to be present also for pitching-moment coefficient and drag coefficient in FIGS. 19 C and 19D. Spike amplitude was roughly proportional to the amplitude of flap motion. The sign of the lift and drag spikes are in the same direction (FIGS. 19A, 19B, and 19D), but the sign for the pitching moment is in the opposite direction (FIG. 19C). After about three convective times (3 tU/c), the 1 Hz and 0.25 Hz cases converged. For the 20° to 0° 1 Hz case (FIG. 19D (1207)), the drag was momentarily negative indicating the moving flap was acting like a flapping-propulsor.

Figure 20A:
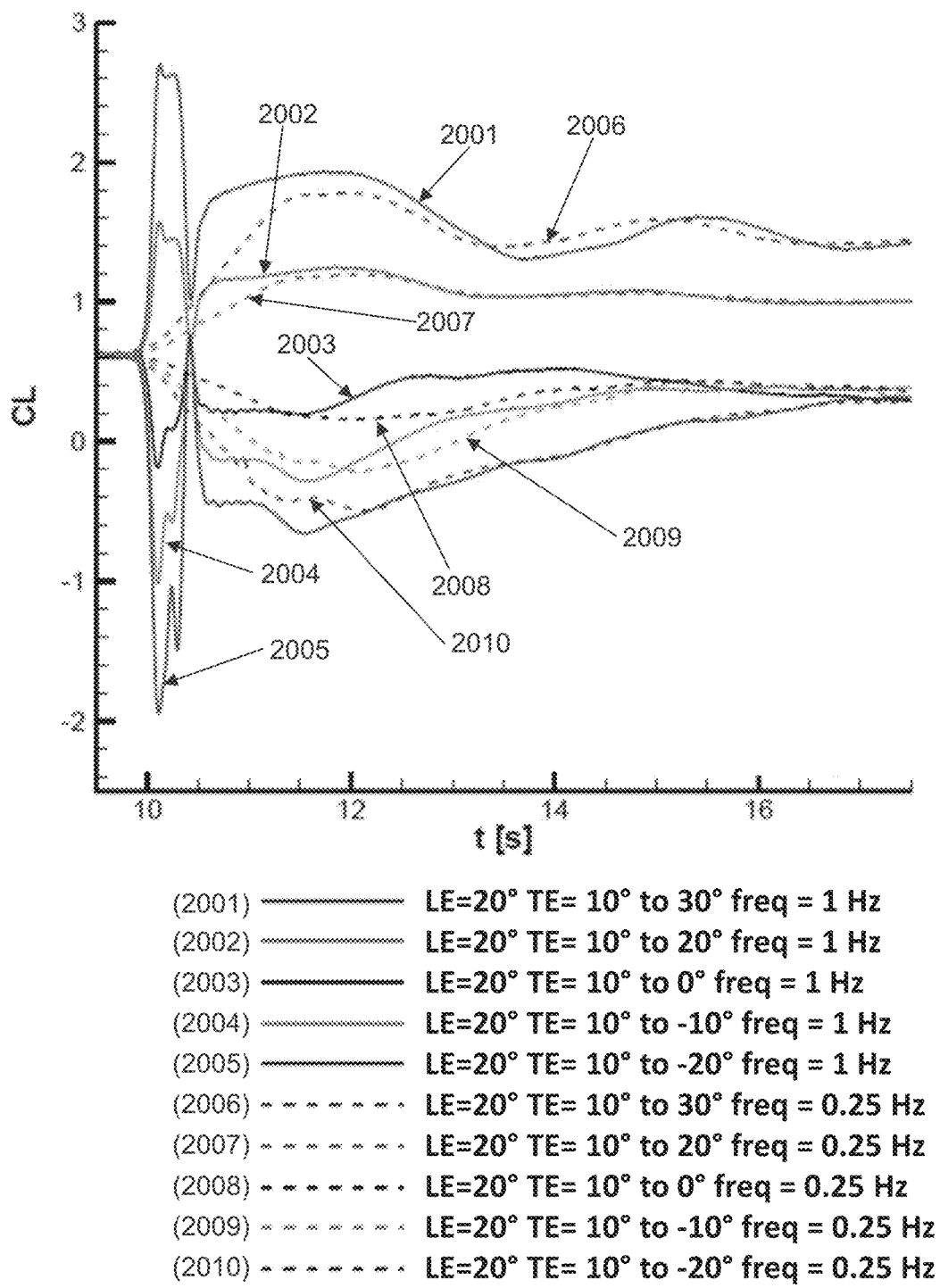
FIG. 20A shows lift coefficient history having flap deflections starting at 10° deflection and proceeding to various values.
Figure 20B:
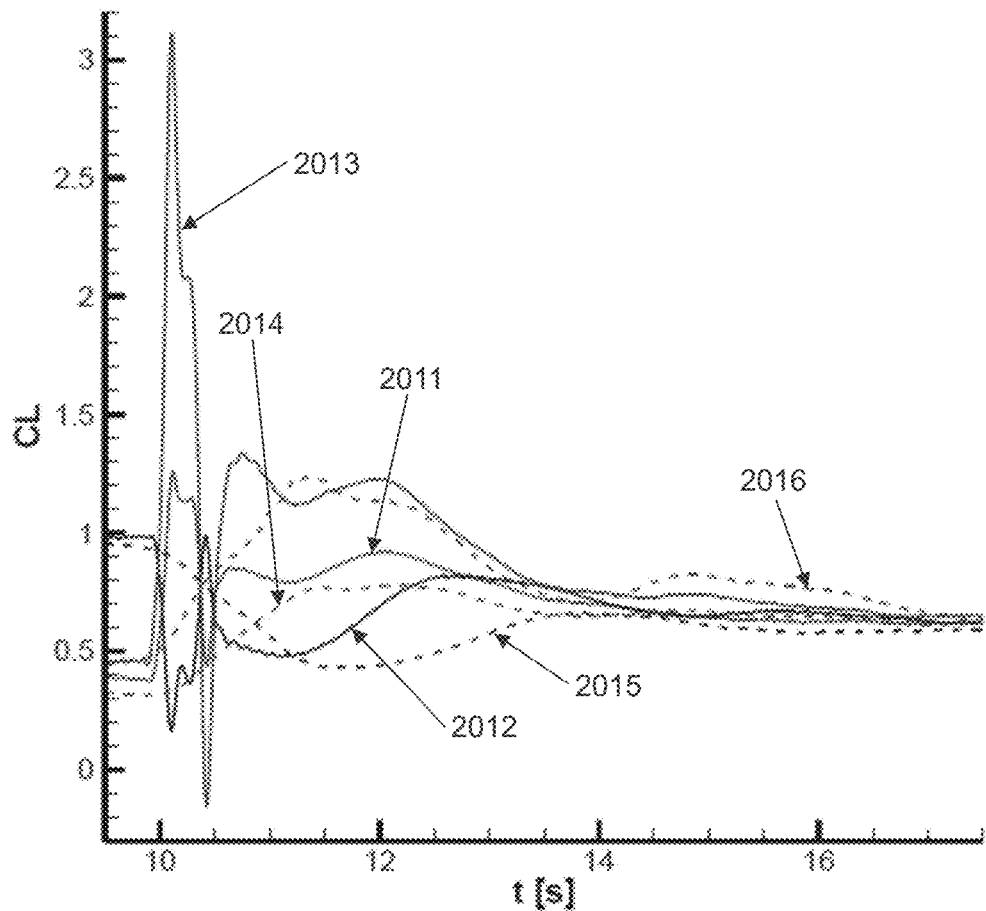
FIG. 20B shows lift coefficient history having flap deflection starting at various values and concluding at 10° deflection according to embodiments herein.

FIG. 20A shows graphical data plots of lift coefficient history flap deflections starting at 10° deflection and proceeding to various values, and FIG. 20B shows graphical data plots of lift coefficient history having flap deflection starting at various values and concluding at 10° deflection. The fore-element was also at 20° incidence (LE=20°) in FIGS. 20A and 20B. In FIG. 20A, the lift coefficient history is indicated for the flap deflection started at 10° deflection and proceeded to 30° by (2001), to 20° by (2002), to 0° by (2003), to −10° by (2004), and to −20° by (2005) at a frequency of 1 Hz (indicated by solid lines). In FIG. 20A, the lift coefficient history is indicated for the flap deflection started at 10° deflection and proceeded to 30° by (2006), to 20° by (2007), to 0° by (2008), −10° by (2009), and −20° by (2010) at a frequency of 0.25 Hz (indicated by dashed lines). In FIG. 20B, the lift coefficient history is indicated for the flap deflection from 0° to 10° by (2011), from 20° to 10° by (2012), and from −20° to 0° by (2013) at a frequency of 1 Hz (indicated by solid lines). In FIG. 20B, the lift coefficient history is indicated for the flap deflection from 0° to 10° by (2014), from 20° to 10° by (2015), from −20° to 10° by (2016) at a frequency of 0.25 Hz (indicated by dashed lines). The trends shown in FIGS. 20A and 20B follow those for when the flap starts and ends, respectively, at 0° (FIGS. 8A-9C having LE=) 0°.

Figure 21A:
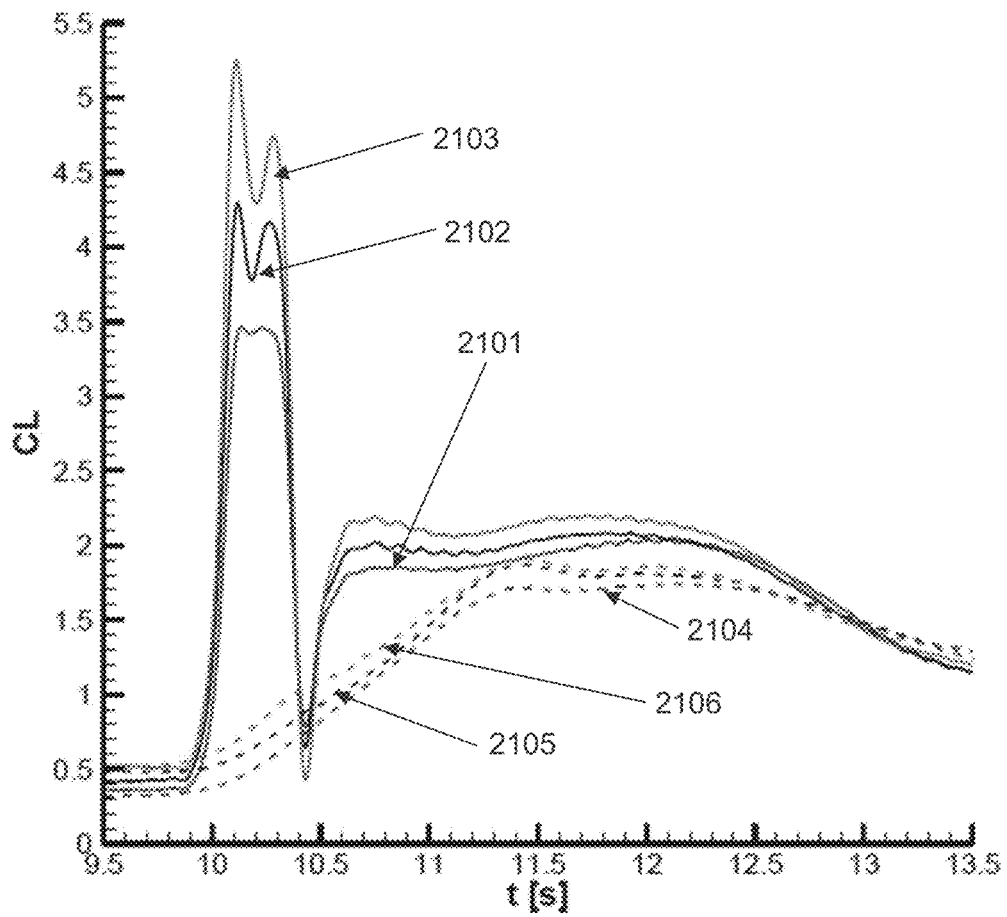
FIGS. 21A and 21B present graphical data plots of lift coefficient and pitching moment coefficient, respectively, where the flap angle ends at 30 degrees according to embodiments herein.
Figure 21B:
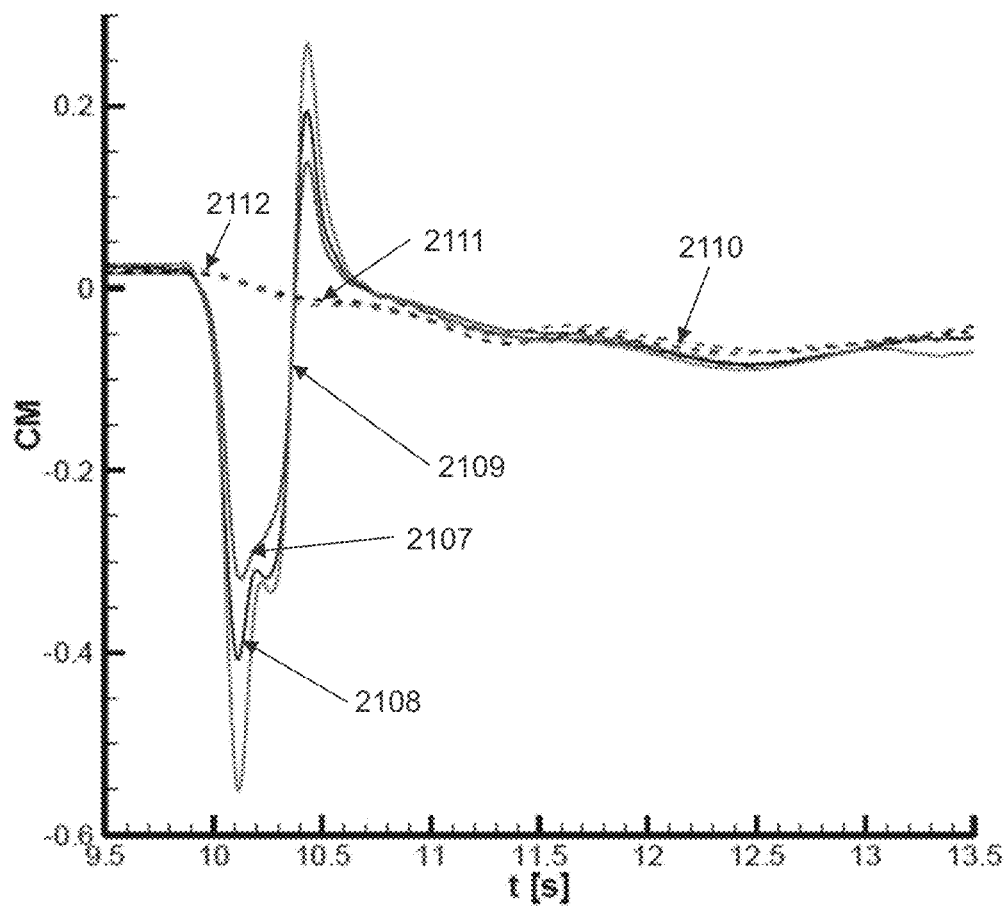

FIGS. 21A and 21B present graphical data plots of lift coefficient (CL) and pitching moment (CM) coefficient, respectively, where the flap angle ends at 30 degrees where the fore-element was also at 20° incidence (LE=20°). In FIG. 21A, the lift coefficient history is indicated for the flap deflection from 0° deflection to 30° by (2101), from −10° to 30° by (2102), and from −20° to 30° by (2103) at a frequency of 1 Hz (indicated by solid lines). In FIG. 21A, the lift coefficient history is indicated for the flap deflection started at 0° deflection and proceeded to 30° by (2104), from −10° to 30° by (2105), and from −20° to 30° by (2106) at a frequency of 0.25 Hz (indicated by dashed lines). In FIG. 21B, the pitching moment is indicated for the flap deflection from 0° deflection to 30° by (2107), from −10° to 30° by (2108), and from −20° to 30° by (2109) at a frequency of 1 Hz (indicated by solid lines). In FIG. 21A, the pitching moment is indicated for the flap deflection started at 0° deflection and proceeded to 30° by (2110), from −10° to 30° by (2111), and from −20° to 30° by (2112) at a frequency of 0.25 Hz (indicated by dashed lines). The slow cases, of 0.25 Hz motion-rate, are nearly quasi-steady, particularly in pitching moment. The fast cases, at 1 Hz motion rate, evince discernible peaks.

In all cases the lift response began immediately as the flap started moving, and the direction of lift response (increase or decrease) was in the direction of flap motion (to higher or lower incidence). The amplitude of peak-lift generally correlates for 1 Hz cases with the amplitude, A, of flap deflection. For the 0.25 Hz cases, there was no such discernible correlation. The pitching-moment spike followed the same trend (but in the opposite direction) for the 1 Hz cases, whereas for the 0.25 Hz cases there was no discernible pitching-moment transient at all.

Figure 22A:
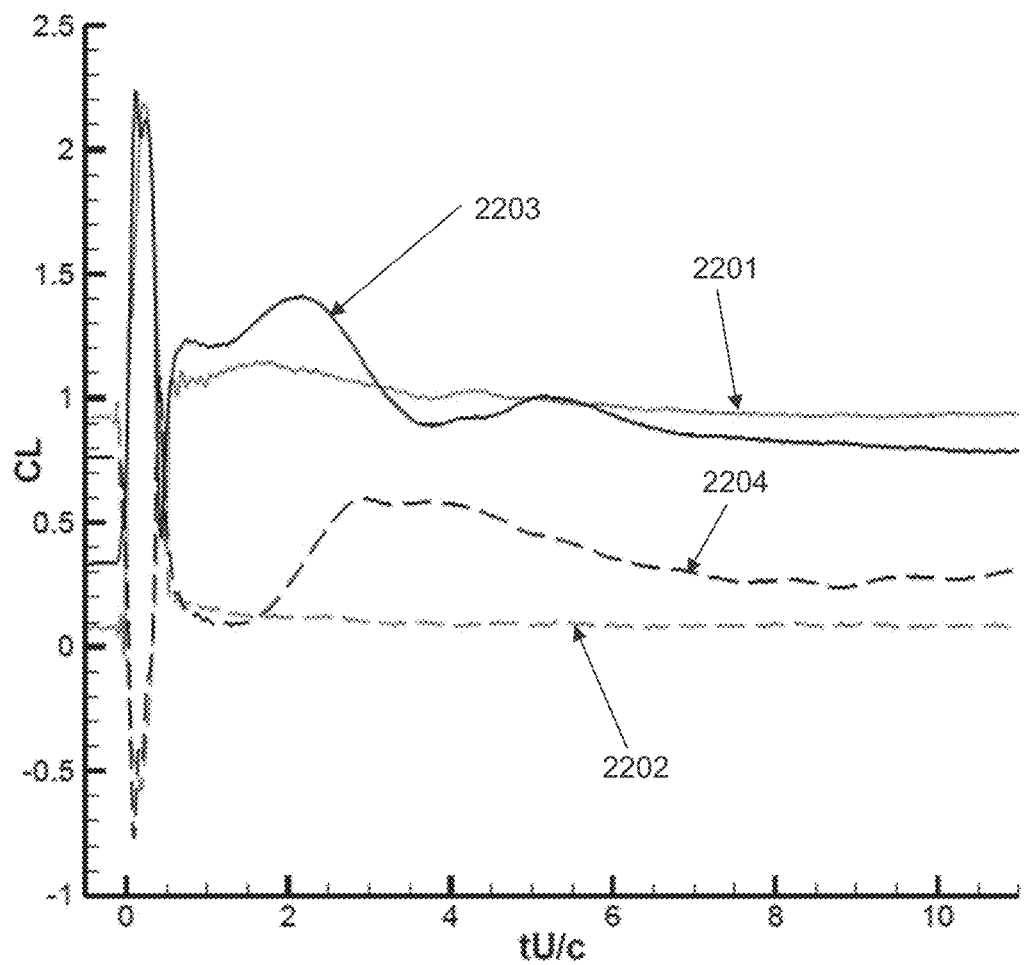
FIGS. 22A and 22B show four variants of 1 Hz motion, including fore-element at 0 or 20 degrees, and flap deflection from 0° to 20° and 20° to 0° according to embodiments herein.
Figure 22B:
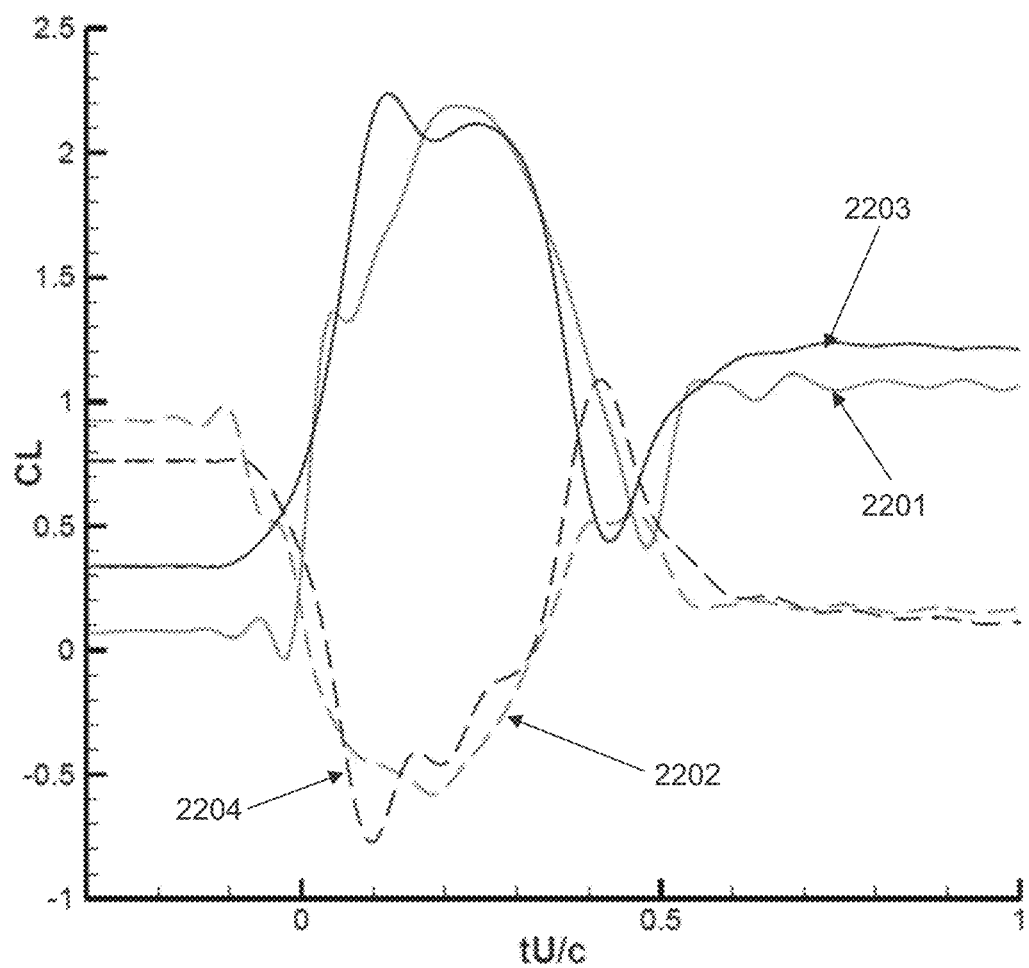

Four variants of 1 Hz motion, including fore-element at 0 or 20 degrees (LE=0° or LE=20°, rescpectively), flap deflection from 0° to 20° (TE=0° to 20°) and 20° to 0° (TE=20° to 0°) are compared in the graphical data plots of FIGS. 22A and 22B. The lift coefficient for the fore-element at 0° is shown by lines (2201), (2202) and for the fore-element at 20° by the lines (2203), (2204). The 1 Hz flap deflection of 0° to 20° is shown by the solid lines (2201), (2203) and the 1 Hz flap deflection of 20° to 0° is shown by the dashed lines (2202), (2204). FIG. 22A shows the overall history with relaxation to steady-state, and FIG. 22B shows a zoomed in view of the lift spikes. The abscissa is shifted in the plots to show that motion begins at tU/c=0. The symmetry in lift-spikes is evident, with peak amplitude independent of fore-element incidence. For all cases except the one with 0 degree fore-element and 0 degree final flap position, relaxation to steady-state required at least 10 convective times.

According to exemplary embodiments of the disclosure as shown in these results, rapid deflection/acceleration of a rigid lifting surface strongly mediates the effects of separated flow. The water tunnel allowed for high dimensionless-rate deflection, for exploring limiting cases. A conventional large-chord (approximately 50%) trailing edge flap, with the present implementation having flap motions over intervals as short as 0.25 convective time, was deflected in a parameter-study covering flap motions from 0.25 to 10 convective times, the latter approaching quasi-steady response. It was found that the lift response did not appreciably lag the flap motion, in particular with deadband or other deleterious effects upon initiation of flap actuation, when the main element (fore-element) of the wing was at large incidence, or when the flap began its motion from a high deflection angle. Through direct measurement of lift coefficient history, with one load cell embedded in the fore-element and another in the flap (aft wing element), it was shown that the total lift coefficient (as well as pitching moment coefficient and drag coefficient) responds immediately upon initiation of flap motion. Transients in lift ensued after the flap motion concluded. For the fastest motions, with fore-element incidence of 20 degrees and flap concluding incidence also of 20 degrees, it took about 10 convective times to relax to the steady-state. According to exemplary embodiments of the disclosure, a simple analytical model for lift, combining quasi-steady, pitch-rate (or virtual camber) and added-mass terms (not presented further herein), was also found to be reasonably accurate in approximating the measured lift history, especially for the fastest flap motion rates. These faster motions evince a sharp overshoot beyond the quasi-steady inviscid response, even in separated flow, owing to both pitch-rate and added-mass effects, which were of comparable amplitude.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Those skilled in the art will recognize that the embodiments herein can be practiced with modification within the spirit and scope of the appended claims.

What is claimed is:

1. A system comprising:
   a sensor configured to detect an input and generate an input signal based on said input, wherein said input is at least one of a fluid medium flow disturbance at a wing and a wing maneuver command;
   a controller configured to receive said input signal and deflect a span-wise flap of the wing by a predetermined deflection angle in a predetermined time period of less than or equal to two convective periods based on said received input signal to produce high lift on said wing, wherein one convective period corresponds to a time it takes for said fluid medium to flow from a leading edge of said wing to a trailing edge of said wing, wherein said high lift lasts for a time of less than 10 convective periods and is greater than a nominal lift, wherein said nominal lift is established on said wing 10 convective periods or more after deflecting said span-wise flap, and wherein said high lift and said nominal lift are at a lift angle to said relative motion of said fluid medium flow to said wing chord length, wherein said predetermined deflection angle is greater than 5 degrees.

2. The system of claim 1, wherein said high lift is equal to or greater than 1.5 times said nominal lift.

3. The system of claim 1, wherein said predetermined time is less than or equal to one convective period.

4. A system comprising:
a sensor configured to detect an input and generate an input signal based on said input, wherein said input is at least one of a fluid medium flow disturbance at a wing and a wing maneuver command;

a controller configured to receive said input signal and deflect a span-wise flap of the wing by a predetermined deflection angle in a predetermined time period of less than or equal to two convective periods based on said received input signal to produce high lift on said wing, wherein one convective period corresponds to a time it takes for said fluid medium to flow from a leading edge of said wing to a trailing edge of said wing, wherein said high lift lasts for a time of less than 10 convective periods and is greater than a nominal lift, wherein said nominal lift is established on said wing 10 convective periods or more after deflecting said span-wise flap, and wherein said high lift and said nominal lift are at a lift angle to said relative motion of said fluid medium flow to said wing chord length, wherein said high lift is equal to or greater than 1.5 times said nominal lift.

5. The system of claim 4, wherein said predetermined deflection angle is greater than 5 degrees.

6. The system of claim 4, wherein said predetermined time is less than or equal to one convective period.

* * * * *